US012544395B2

(12) United States Patent
Burns et al.

(10) Patent No.: US 12,544,395 B2
(45) Date of Patent: Feb. 10, 2026

(54) COMBINATION COMPOSITIONS COMPRISING A BETA-LACTAMASE INHIBITOR AND USES THEREOF

(71) Applicant: VenatoRx Pharmaceuticals, Inc., Malvern, PA (US)

(72) Inventors: Christopher J. Burns, Malvern, PA (US); Denis Daigle, Street, MD (US); Jodie Hamrick, New Holland, PA (US); Daniel C. Pevear, Downingtown, PA (US); Robert E. Lee Trout, Collegeville, PA (US); Luigi Xerri, Wayne, PA (US); Timothy Henkel, Malvern, PA (US); Cullen L. Myers, Exton, PA (US); Stephen M. Condon, Glenmoore, PA (US); Anthony Drager, Thorndale, PA (US); Lawrence Rosen, Wayne, PA (US)

(73) Assignee: VENATORX PHARMACEUTICALS, INC., Malvern, PA (US)

( * ) Notice: Subject to any disclaimer, the term of this patent is extended or adjusted under 35 U.S.C. 154(b) by 1000 days.

(21) Appl. No.: 17/296,371

(22) PCT Filed: Nov. 22, 2019

(86) PCT No.: PCT/US2019/062798
§ 371 (c)(1),
(2) Date: May 24, 2021

(87) PCT Pub. No.: WO2020/112542
PCT Pub. Date: Jun. 4, 2020

(65) Prior Publication Data
US 2022/0125812 A1   Apr. 28, 2022

Related U.S. Application Data

(60) Provisional application No. 62/773,063, filed on Nov. 29, 2018, provisional application No. 62/796,524, (Continued)

(51) Int. Cl.
*A61K 31/69*   (2006.01)
*A61K 31/545*   (2006.01)

(52) U.S. Cl.
CPC ............ *A61K 31/69* (2013.01); *A61K 31/545* (2013.01)

(58) Field of Classification Search
CPC .. A61K 2300/00; A61K 31/69; A61K 31/545; A61K 31/546; A61K 31/5383;
(Continued)

(56) References Cited

U.S. PATENT DOCUMENTS

| 4,427,690 A | 1/1984 | Cole et al. |
| 7,271,186 B1 | 9/2007 | Shoichet et al. |

(Continued)

FOREIGN PATENT DOCUMENTS

| CN | 1965838 A | 5/2007 |
| CN | 105801610 A | 7/2016 |

(Continued)

OTHER PUBLICATIONS

Baratam et al., A promising approach to enhance solubility and bioavailability by self emulsifying drug delivery system: a brief review, Innoriginal International Journal of Sciences, vol. 5, No. 4, 7-12, Jul.-Aug. 2018 (Year: 2018).*
(Continued)

*Primary Examiner* — Sarah Pihonak
*Assistant Examiner* — Padmaja S Rao
(74) *Attorney, Agent, or Firm* — WILSON SONSINI GOODRICH & ROSATI

(57) ABSTRACT

The present invention relates to pharmaceutical compositions containing boron-containing compounds and their use
(Continued)

as inhibitors of beta-lactamase enzymes and as antibacterial agents in combination with a beta-lactam antibiotic.

34 Claims, 17 Drawing Sheets

Related U.S. Application Data filed on Jan. 24, 2019, provisional application No. 62/828,354, filed on Apr. 2, 2019, provisional application No. 62/832,118, filed on Apr. 10, 2019, provisional application No. 62/777,643, filed on Dec. 10, 2018.

(58) Field of Classification Search
CPC ........ A61K 31/43; A61K 47/10; A61K 47/14; A61K 47/22; A61K 47/24; A61K 47/26; A61K 9/0053; A61K 9/10; A61K 9/08; A61K 9/1075; A61K 47/44; A61K 9/2004; A61P 31/04; C07F 5/02
See application file for complete search history.

(56) References Cited

U.S. PATENT DOCUMENTS

| | | | |
|---|---|---|---|
| 7,714,159 B2 | 5/2010 | Pickersgill et al. | |
| 8,283,467 B2 | 10/2012 | Ammoscato et al. | |
| 8,912,169 B2 | 12/2014 | Burns et al. | |
| 9,040,504 B2 | 5/2015 | Burns et al. | |
| 9,101,638 B2 | 8/2015 | Reddy et al. | |
| 9,376,454 B2 | 6/2016 | Burns et al. | |
| 9,403,850 B2 | 8/2016 | Burns et al. | |
| 9,422,314 B2 | 8/2016 | Burns et al. | |
| 9,511,142 B2 | 12/2016 | Burns et al. | |
| 9,637,504 B2 | 5/2017 | Burns et al. | |
| 9,642,869 B2 | 5/2017 | Reddy et al. | |
| 9,771,382 B2 | 9/2017 | Burns et al. | |
| 9,783,555 B2 | 10/2017 | Burns et al. | |
| 9,802,966 B2 | 10/2017 | Burns et al. | |
| 9,828,391 B2 | 11/2017 | Burns et al. | |
| 9,926,336 B2 | 3/2018 | Burns et al. | |
| 9,944,658 B2 | 4/2018 | Burns et al. | |
| 9,963,467 B2 | 5/2018 | Reddy et al. | |
| 10,125,152 B2 | 11/2018 | Burns et al. | |
| 10,206,937 B2 | 2/2019 | Reddy et al. | |
| 10,214,547 B2 | 2/2019 | Burns et al. | |
| 10,294,247 B2 | 5/2019 | Burns et al. | |
| 10,294,248 B2 | 5/2019 | Burns et al. | |
| 10,399,996 B2 | 9/2019 | Burns et al. | |
| 10,464,952 B2 | 11/2019 | Burns et al. | |
| 10,479,805 B2 | 11/2019 | Wu et al. | |
| 10,669,290 B2 | 6/2020 | Burns et al. | |
| 10,889,600 B2 | 1/2021 | Amann et al. | |
| 11,008,356 B2 | 5/2021 | Denarie et al. | |
| 11,046,716 B2 | 6/2021 | Burns et al. | |
| 11,091,505 B2 | 8/2021 | Burns et al. | |
| 11,267,826 B2 | 3/2022 | Burns et al. | |
| 2009/0156518 A1 | 6/2009 | Zhang | |
| 2010/0056478 A1 | 3/2010 | Desarbre et al. | |
| 2010/0120715 A1 | 5/2010 | Burns et al. | |
| 2010/0286092 A1 | 11/2010 | Burns et al. | |
| 2010/0292185 A1 | 11/2010 | Burns et al. | |
| 2010/0317621 A1 | 12/2010 | Burns et al. | |
| 2011/0294777 A1 | 12/2011 | Blizzard et al. | |
| 2012/0040932 A1 | 2/2012 | Hirst et al. | |
| 2014/0171390 A1 | 6/2014 | Burns et al. | |
| 2014/0194386 A1 | 7/2014 | Burns et al. | |
| 2015/0094472 A1 | 4/2015 | Hecker et al. | |
| 2015/0291630 A1 | 10/2015 | Burns et al. | |
| 2015/0361107 A1 | 12/2015 | Trout | |
| 2015/0361108 A1 | 12/2015 | Burns et al. | |
| 2017/0088561 A1* | 3/2017 | Reddy | A61P 31/04 |
| 2017/0145037 A1 | 5/2017 | Burns et al. | |
| 2017/0226135 A1* | 8/2017 | Burns | A61K 45/06 |
| 2017/0281639 A1 | 10/2017 | Kawasaki et al. | |
| 2017/0342092 A1 | 11/2017 | Burns et al. | |
| 2018/0002351 A1 | 1/2018 | Hecker et al. | |
| 2020/0095217 A1 | 3/2020 | Dowdell et al. | |
| 2020/0317698 A1 | 10/2020 | Burns et al. | |
| 2021/0163506 A1 | 6/2021 | Amann et al. | |
| 2022/0002322 A1 | 1/2022 | Burns et al. | |
| 2022/0054513 A1 | 2/2022 | Hamrick et al. | |
| 2022/0194964 A1 | 6/2022 | Burns et al. | |

FOREIGN PATENT DOCUMENTS

| | | |
|---|---|---|
| CN | 106946924 A | 7/2017 |
| JP | 2015508801 A | 3/2015 |
| JP | 6346904 B2 | 6/2018 |
| KR | 20130064004 A | 6/2013 |
| RU | 2445314 C9 | 4/2013 |
| RU | 2012107163 A | 9/2013 |
| WO | WO-2005004799 A2 | 1/2005 |
| WO | WO-2009064413 A1 | 5/2009 |
| WO | WO-2009064414 A1 | 5/2009 |
| WO | WO-2010056827 A1 | 5/2010 |
| WO | WO-2010130708 A1 | 11/2010 |
| WO | WO-2012021455 A1 | 2/2012 |
| WO | WO-2013014497 A1 | 1/2013 |
| WO | WO-2013053372 A1 | 4/2013 |
| WO | WO-2013056163 A1 | 4/2013 |
| WO | WO-2013092979 A1 | 6/2013 |
| WO | WO-2013122888 A2 | 8/2013 |
| WO | WO-2014086664 A1 | 6/2014 |
| WO | WO-2014089365 A1 | 6/2014 |
| WO | WO-2014107535 A1 | 7/2014 |
| WO | WO-2014107536 A1 | 7/2014 |
| WO | WO-2014110442 A1 | 7/2014 |
| WO | WO-2014151958 A1 | 9/2014 |
| WO | WO-2015157618 A1 | 10/2015 |
| WO | WO-2015171398 A1 | 11/2015 |
| WO | WO-2015171430 A1 | 11/2015 |
| WO | WO-2015179308 A1 | 11/2015 |
| WO | WO-2015191907 A1 | 12/2015 |
| WO | WO-2016003929 A1 | 1/2016 |
| WO | WO-2016100043 A1 | 6/2016 |
| WO | WO-2017044828 A1 | 3/2017 |
| WO | WO-2017100537 A1 | 6/2017 |
| WO | WO-2018027062 A1 | 2/2018 |
| WO | WO-2018165048 A1 | 9/2018 |
| WO | WO-2020056048 A1 | 3/2020 |
| WO | WO-2020112542 A1 | 6/2020 |
| WO | WO-2020205932 A1 | 10/2020 |
| WO | WO-2022076070 A1 | 4/2022 |

OTHER PUBLICATIONS

VenatoRx Pharmaceuticals, Malvern, PA, Jul. 25, 2017 (Year: 2017).*
Jones et al. Antimicrobial activity, spectrum, and recommendations for disk diffusion susceptibility testing of ceftibuten (7432-S; SCH 39720), a new orally administered cephalosporin. Antimicrob Agents Chemother 32(10):1576-1582 (1988).
PCT/US2020/026114 International Search Report and Written Opinion dated Jul. 23, 2020.
PCT/US2021/044808 International Search Report and Written Opinion dated Nov. 10, 2021.
U.S. Appl. No. 16/864,634 Office Action dated Oct. 7, 2021.
Burns et al. CAPLUS AN 2014-1130723 (1 pg.) (2014).
Contreras-Martel et al. Structure-guided design of cell wall biosynthesis inhibitors that overcome β-lactam resistance in *Staphylococcus aureus* (MRSA). ACS Chem Biol 6(7):943-951 (2011).
Dudley et al. CAPLUS 2013:1302853 (WO2013/122888).
Eidam et al. Design, synthesis, crystal structures, and antimicrobial activity of sulfonamide boronic acids as β-lactamase inhibitors. J. Med. Chem. 53(21):7852-7863 (2010).
Ishikawa et al. Synthesis and antimicrobial activity of 2,3-bis(bromomethyl)quinoxaline derivatives. Bioorg Chem 41-42:1-5 (2012).

(56) References Cited

OTHER PUBLICATIONS

Katsube et al. Cefiderocol, a Siderophore Cephalosporin for Gram-Negative Bacterial Infections: Pharmacokinetics and Safety in Subjects With Renal Impairment. J Clin Pharmacol 57(5):584-591 (2017).
Morandi et al. Structure-based optimization of cephalothin-analogue boronic acids as β-lactamase inhibitors. Bioorg. Med. Chem. 16(3):1195-1205 (2008) (Epub: Nov. 7, 2007).
Ness et al. Structure-based design guides the improved efficacy of deacylation transition state analogue inhibitors of TEM-1 β-lactamase. Biochemistry 39(18):5312-5321 (2000).
PCT/US2013/073428 International Search Report and Written Opinion dated Apr. 25, 2014.
PCT/US2014/011144 International Search Report and Written Opinion dated May 12, 2014.
PCT/US2014/026727 International Search Report and Written Opinion dated Jul. 25, 2014.
PCT/US2015/035407 International Search Report and Written Opinion dated Oct. 20, 2015.
PCT/US2016/051076 International Search Report and Written Opinion dated Jan. 17, 2017.
PCT/US2016/065771 International Search Report and Written Opinion dated Apr. 21, 2017.
PCT/US2017/045347 International Search Report and Written Opinion dated Nov. 8, 2017.
PCT/US2018/020968 International Search Report and Written Opinion dated Jun. 29, 2018.
PCT/US2019/050682 International Search Report and Written Opinion dated Jan. 3, 2020.
PCT/US2019/062798 International Search Report and Written Opinion dated Jan. 27, 2020.
PCT/US2020/026114 Invitation to Pay Additional Fees dated May 22, 2020.
Powers et al. Structure-based approach for binding site identification on AmpC β-lactamase. J. Med. Chem. 45(15):3222-3234 (2002).
Powers et al. Structures of ceftazidime and its transition-state analogue in complex with AmpC β-lactamase: implications for resistance mutations and inhibitor design. Biochemistry 40(31):9207-9214 (2001).
Pub Chem Substance Record for SID 197433672. https://pubchem.ncbi.nim.nih/substance/197433672. Created Aug. 18, 2014. Retrieved Jan. 10, 2017 ( 5 pgs).
Reddy et al. Caplus 2014:1118372 (2014) (2 pgs.).
U.S. Appl. No. 14/152,916 Office Action dated Aug. 29, 2014.
U.S. Appl. No. 14/649,527 Office Action dated Nov. 9, 2015.
U.S. Appl. No. 14/693,318 Office Action dated Sep. 1, 2015.
U.S. Appl. No. 14/736,921 Office Action dated Jun. 23, 2017.
U.S. Appl. No. 14/736,921 Office Action dated Oct. 18, 2017.
U.S. Appl. No. 14/736,921 Restriction Requirement dated Sep. 30, 2016.
U.S. Appl. No. 14/737,156 Office Action dated Jun. 1, 2016.
U.S. Appl. No. 14/759,853 Office Action dated Dec. 11, 2015.
U.S. Appl. No. 14/773,717 Office Action dated Feb. 27, 2017.
U.S. Appl. No. 14/773,717 Office Action dated Jun. 8, 2017.
U.S. Appl. No. 15/162,395 Office Action dated Oct. 5, 2016.
U.S. Appl. No. 15/194,433 Office Action dated Feb. 9, 2017.
U.S. Appl. No. 15/212,959 Office Action dated Mar. 23, 2017.
U.S. Appl. No. 15/261,359 Office Action dated Feb. 1, 2018.
U.S. Appl. No. 15/261,359 Office Action dated Jan. 9, 2019.
U.S. Appl. No. 15/261,359 Office Action dated Jul. 13, 2017.
U.S. Appl. No. 15/261,359 Office Action dated Jul. 13, 2018.
U.S. Appl. No. 15/366,769 Office Action dated Oct. 24, 2017.
U.S. Appl. No. 15/675,253 Office Action dated Oct. 4, 2017.
U.S. Appl. No. 15/675,262 Office Action dated Jan. 24, 2018.
U.S. Appl. No. 15/675,262 Office Action dated Sep. 18, 2017.
U.S. Appl. No. 15/797,224 Office Action dated Aug. 13, 2018.
U.S. Appl. No. 15/922,376 Office Action dated Jul. 27, 2018.
U.S. Appl. No. 16/002,363 Office Action dated Dec. 14, 2018.
U.S. Appl. No. 16/238,363 Office Action dated Sep. 10, 2019.
U.S. Appl. No. 16/491,116 Office Action dated Dec. 14, 2020.
U.S. Appl. No. 16/491,116 Office Action dated Mar. 25, 2021.
U.S. Appl. No. 16/514,904 Office Action dated Aug. 18, 2020.
U.S. Appl. No. 16/798,032 Office Action dated Sep. 21, 2020.
U.S. Appl. No. 16/864,634 Office Action dated Apr. 1, 2021.
U.S. Appl. No. 90/013,866 Ex Parte Reexam Office Action dated Apr. 20, 2017.
Watkins et al. Novel β-lactamase inhibitors: a therapeutic hope against the scourge of multi-drug resistance. © Dec. 24, 2013. Accessed Jul. 7, 2018. (18 pgs) (2013).
Weston et al. Structure-based enhancement of boronic acid-based inhibitors of AmpC β-lactamase. J. Med. Chem. 41(23):4577-4586 (1998).
Burns et al. , Accession No. 2014:955904. STN International CAPLUS database, (Columbus, Ohio) (2014).
Georgiou et al. VNRX-5133, a novel broad-spectrum beta-lactamase inhibitor, enhances the activity of cefepime against resistant Enterobacteriaceae and P. aeruginosa isolates in a neutropenic mouse-thigh infection model. European Congress of Clinical Microbiology and Infectious Diseases, Apr. 24, 2018 (Apr. 24, 2018 Retrieved from the Internet: URL:https://www.escmid.org/escmid_publications/escmid_elibrary/.
Higgins et al. In Vitro Activities of the –Lactamase Inhibitors Clavulanic Acid, Sulbactam, and Tazobactam Alone or in Combination with –Lactams against Epidemiologically Characterized Multidrug-Resistant Acinetobacter baumannii Strains. Antimicron Agents Chemother 48(5):1586-1592 (2004).
U.S. Appl. No. 17/115,514 Office Action dated Apr. 28, 2022.
Trout, Robert E. et al. Discovery of VNRX-7145 (VNRX-5236 etzadroxil): an orally bioavailable ß-lactamase inhibitor for Enterobacterales expressing Ambler class A, C, and D enzymes. Journal of medicinal chemistry 64(14):10155-10166 (2021).

* cited by examiner

▬▬ CTI/Compound 2 = ceftibuten + Compound 2 fixed at 4 mg/L
⋯⋯ CTI = ceftibuten
▬▬ CTV = ceftazidime-avibactam
⋯⋯ MEV = meropenem-vaborbactam
⋯⋯ PIT = piperacillin-tazobactam
⋯⋯ TOB = tobramycin
⋯⋯ TIG = tigecycline

FIG. 5A

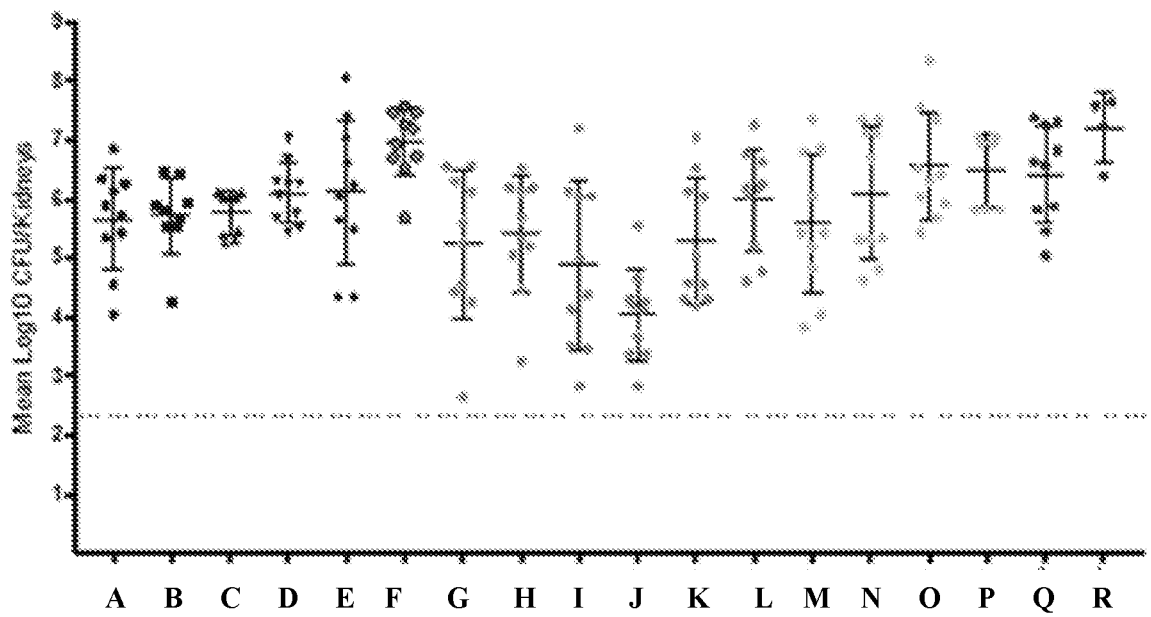

A = Ceftibuten – 300 mg/kg

B = Ceftibuten – 100 mg/kg

C = Ceftibuten – 30 mg/kg

D = Ceftibuten – 10 mg/kg

E = Ceftibuten – 3 mg/kg

F = Ceftibuten – 1 mg/kg

G = Ceftibuten:Compound 2, 1:1 (300 mg/kg:300 mg/kg)

H = Ceftibuten:Compound 2, 1:1 (100 mg/kg:100 mg/kg)

I = Ceftibuten:Compound 2, 1:1 (30 mg/kg:30 mg/kg)

J = Ceftibuten:Compound 2, 1:1 (10 mg/kg:10 mg/kg)

K = Ceftibuten:Compound 2, 1:1 (3 mg/kg:3 mg/kg)

L = Ceftibuten:Compound 2, 1:1 (1 mg/kg:1 mg/kg)

M = Amoxicillin:Clavulanate, 2:1 (300 mg/kg:150 mg/kg)

N = Amoxicillin:Clavulanate, 2:1 (100 mg/kg:50 mg/kg)

O = Amoxicillin:Clavulanate, 2:1 (30 mg/kg:15 mg/kg)

P = Amoxicillin:Clavulanate, 2:1 (10 mg/kg:5 mg/kg)

Q = 7 day control

R = 4 day control

FIG. 5B

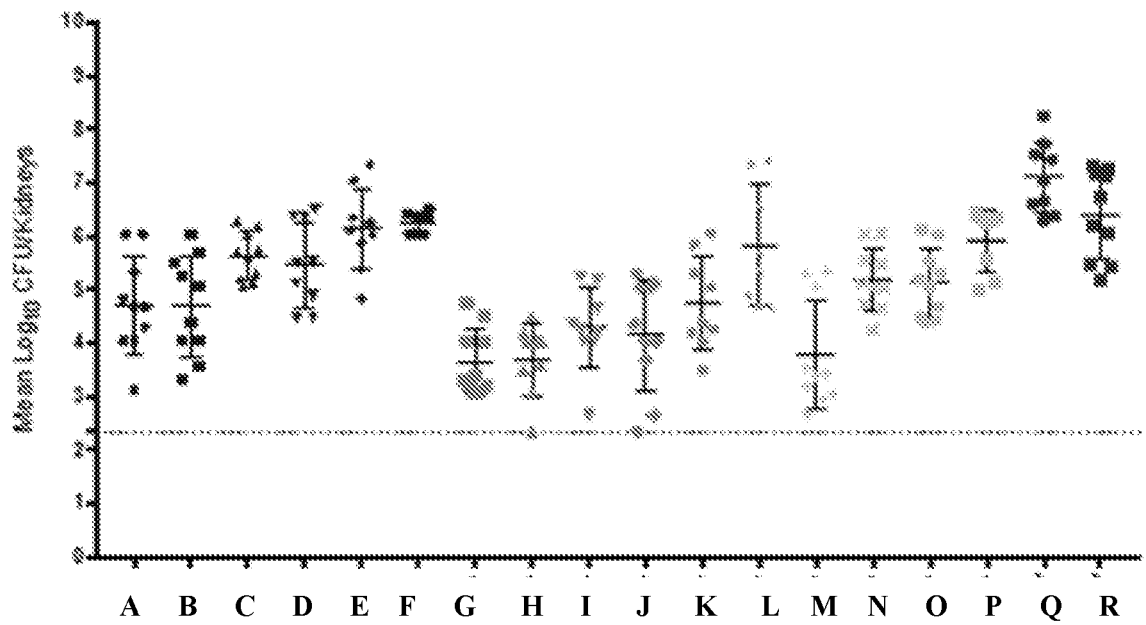

A = Ceftibuten – 300 mg/kg

B = Ceftibuten – 100 mg/kg

C = Ceftibuten – 30 mg/kg

D = Ceftibuten – 10 mg/kg

E = Ceftibuten – 3 mg/kg

F = Ceftibuten – 1 mg/kg

G = Ceftibuten:Compound 2, 1:1 (300 mg/kg:300 mg/kg)

H = Ceftibuten:Compound 2, 1:1 (100 mg/kg:100 mg/kg)

I = Ceftibuten:Compound 2, 1:1 (30 mg/kg:30 mg/kg)

J = Ceftibuten:Compound 2, 1:1 (10 mg/kg:10 mg/kg)

K = Ceftibuten:Compound 2, 1:1 (3 mg/kg:3 mg/kg)

L = Ceftibuten:Compound 2, 1:1 (1 mg/kg:1 mg/kg)

M = Amoxicillin:Clavulanate, 2:1 (300 mg/kg:150 mg/kg)

N = Amoxicillin:Clavulanate, 2:1 (100 mg/kg:50 mg/kg)

O = Amoxicillin:Clavulanate, 2:1 (30 mg/kg:15 mg/kg)

P = Amoxicillin:Clavulanate, 2:1 (10 mg/kg:5 mg/kg)

Q = 7 day control

R = 4 day control

FIG. 5C

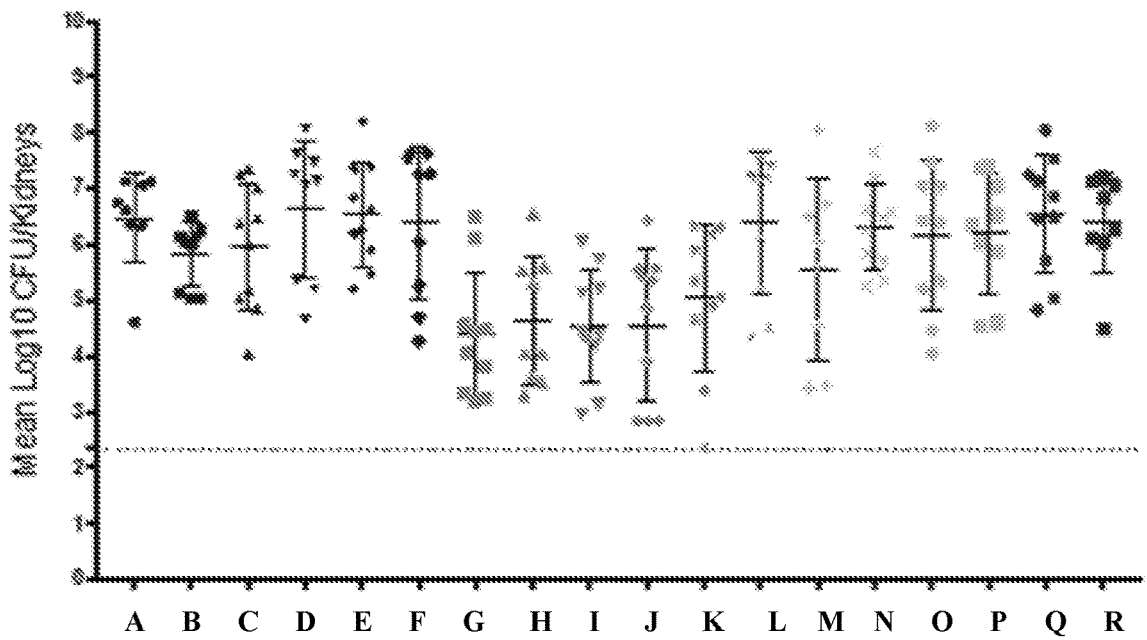

A = Ceftibuten – 300 mg/kg
B = Ceftibuten – 100 mg/kg
C = Ceftibuten – 30 mg/kg
D = Ceftibuten – 10 mg/kg
E = Ceftibuten – 3 mg/kg
F = Ceftibuten – 1 mg/kg
G = Ceftibuten:Compound 2, 1:1 (300 mg/kg:300 mg/kg)
H = Ceftibuten:Compound 2, 1:1 (100 mg/kg:100 mg/kg)
I = Ceftibuten:Compound 2, 1:1 (30 mg/kg:30 mg/kg)
J = Ceftibuten:Compound 2, 1:1 (10 mg/kg:10 mg/kg)
K = Ceftibuten:Compound 2, 1:1 (3 mg/kg:3 mg/kg)
L = Ceftibuten:Compound 2, 1:1 (1 mg/kg:1 mg/kg)
M = Amoxicillin:Clavulanate, 2:1 (300 mg/kg:150 mg/kg)
N = Amoxicillin:Clavulanate, 2:1 (100 mg/kg:50 mg/kg)
O = Amoxicillin:Clavulanate, 2:1 (30 mg/kg:15 mg/kg)
P = Amoxicillin:Clavulanate, 2:1 (10 mg/kg:5 mg/kg)
Q = 7 day control
R = 4 day control

FIG. 6A

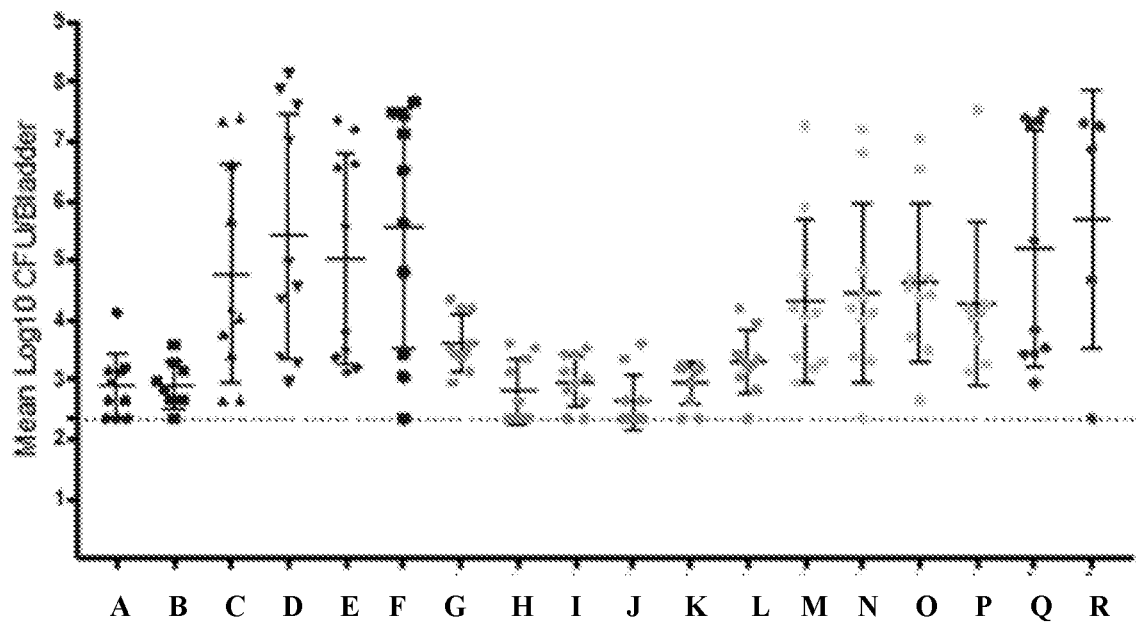

A = Ceftibuten – 300 mg/kg

B = Ceftibuten – 100 mg/kg

C = Ceftibuten – 30 mg/kg

D = Ceftibuten – 10 mg/kg

E = Ceftibuten – 3 mg/kg

F = Ceftibuten – 1 mg/kg

G = Ceftibuten:Compound 2, 1:1 (300 mg/kg:300 mg/kg)

H = Ceftibuten:Compound 2, 1:1 (100 mg/kg:100 mg/kg)

I = Ceftibuten:Compound 2, 1:1 (30 mg/kg:30 mg/kg)

J = Ceftibuten:Compound 2, 1:1 (10 mg/kg:10 mg/kg)

K = Ceftibuten:Compound 2, 1:1 (3 mg/kg:3 mg/kg)

L = Ceftibuten:Compound 2, 1:1 (1 mg/kg:1 mg/kg)

M = Amoxicillin:Clavulanate, 2:1 (300 mg/kg:150 mg/kg)

N = Amoxicillin:Clavulanate, 2:1 (100 mg/kg:50 mg/kg)

O = Amoxicillin:Clavulanate, 2:1 (30 mg/kg:15 mg/kg)

P = Amoxicillin:Clavulanate, 2:1 (10 mg/kg:5 mg/kg)

Q = 7 day control

R = 4 day control

FIG. 6B

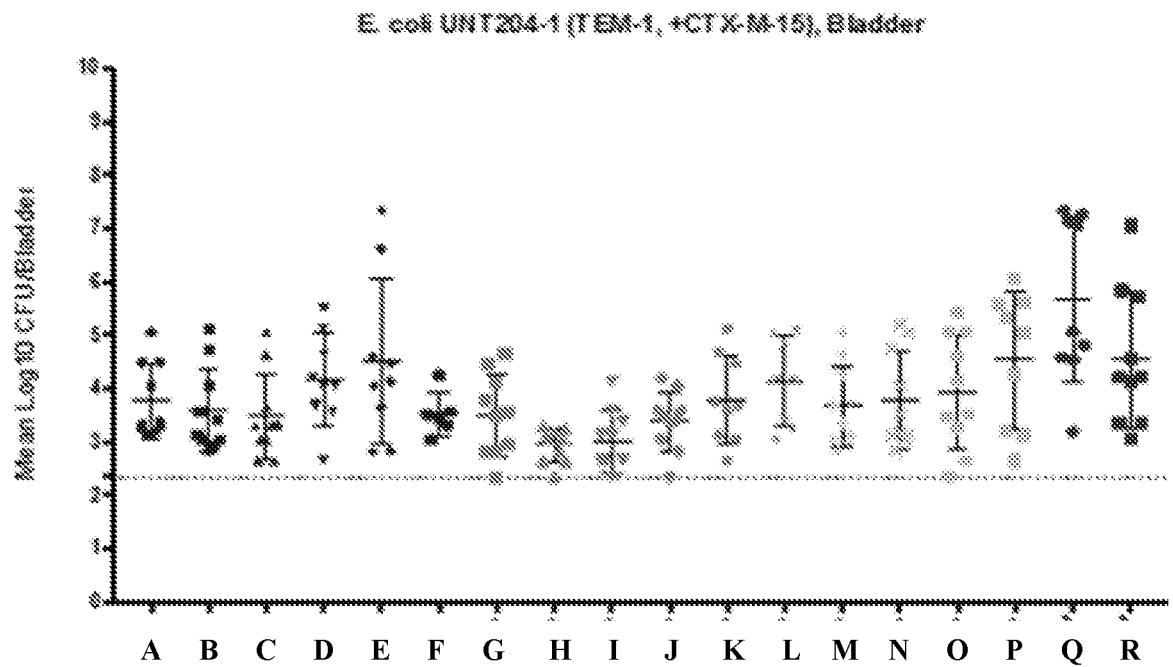

A = Ceftibuten – 300 mg/kg

B = Ceftibuten – 100 mg/kg

C = Ceftibuten – 30 mg/kg

D = Ceftibuten – 10 mg/kg

E = Ceftibuten – 3 mg/kg

F = Ceftibuten – 1 mg/kg

G = Ceftibuten:Compound 2, 1:1 (300 mg/kg:300 mg/kg)

H = Ceftibuten:Compound 2, 1:1 (100 mg/kg:100 mg/kg)

I = Ceftibuten:Compound 2, 1:1 (30 mg/kg:30 mg/kg)

J = Ceftibuten:Compound 2, 1:1 (10 mg/kg:10 mg/kg)

K = Ceftibuten:Compound 2, 1:1 (3 mg/kg:3 mg/kg)

L = Ceftibuten:Compound 2, 1:1 (1 mg/kg:1 mg/kg)

M = Amoxicillin:Clavulanate, 2:1 (300 mg/kg:150 mg/kg)

N = Amoxicillin:Clavulanate, 2:1 (100 mg/kg:50 mg/kg)

O = Amoxicillin:Clavulanate, 2:1 (30 mg/kg:15 mg/kg)

P = Amoxicillin:Clavulanate, 2:1 (10 mg/kg:5 mg/kg)

Q = 7 day control

R = 4 day control

FIG. 6C

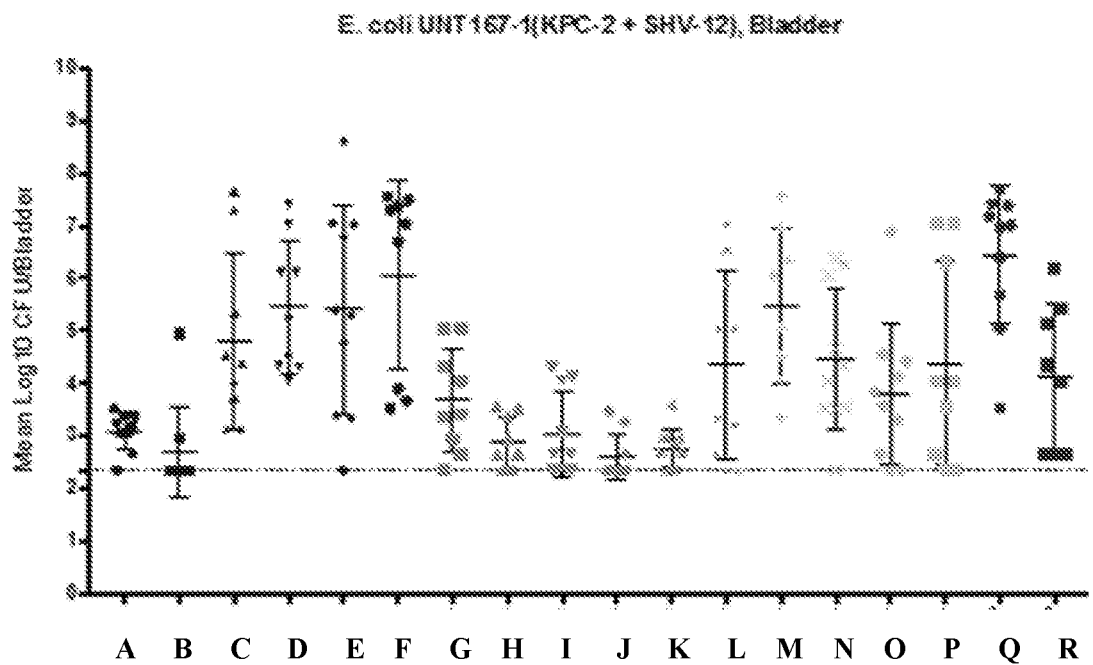

A = Ceftibuten – 300 mg/kg
B = Ceftibuten – 100 mg/kg
C = Ceftibuten – 30 mg/kg
D = Ceftibuten – 10 mg/kg
E = Ceftibuten – 3 mg/kg
F = Ceftibuten – 1 mg/kg
G = Ceftibuten:Compound 2, 1:1 (300 mg/kg:300 mg/kg)
H = Ceftibuten:Compound 2, 1:1 (100 mg/kg:100 mg/kg)
I = Ceftibuten:Compound 2, 1:1 (30 mg/kg:30 mg/kg)
J = Ceftibuten:Compound 2, 1:1 (10 mg/kg:10 mg/kg)
K = Ceftibuten:Compound 2, 1:1 (3 mg/kg:3 mg/kg)
L = Ceftibuten:Compound 2, 1:1 (1 mg/kg:1 mg/kg)
M = Amoxicillin:Clavulanate, 2:1 (300 mg/kg:150 mg/kg)
N = Amoxicillin:Clavulanate, 2:1 (100 mg/kg:50 mg/kg)
O = Amoxicillin:Clavulanate, 2:1 (30 mg/kg:15 mg/kg)
P = Amoxicillin:Clavulanate, 2:1 (10 mg/kg:5 mg/kg)
Q = 7 day control
R = 4 day control

FIG. 7A

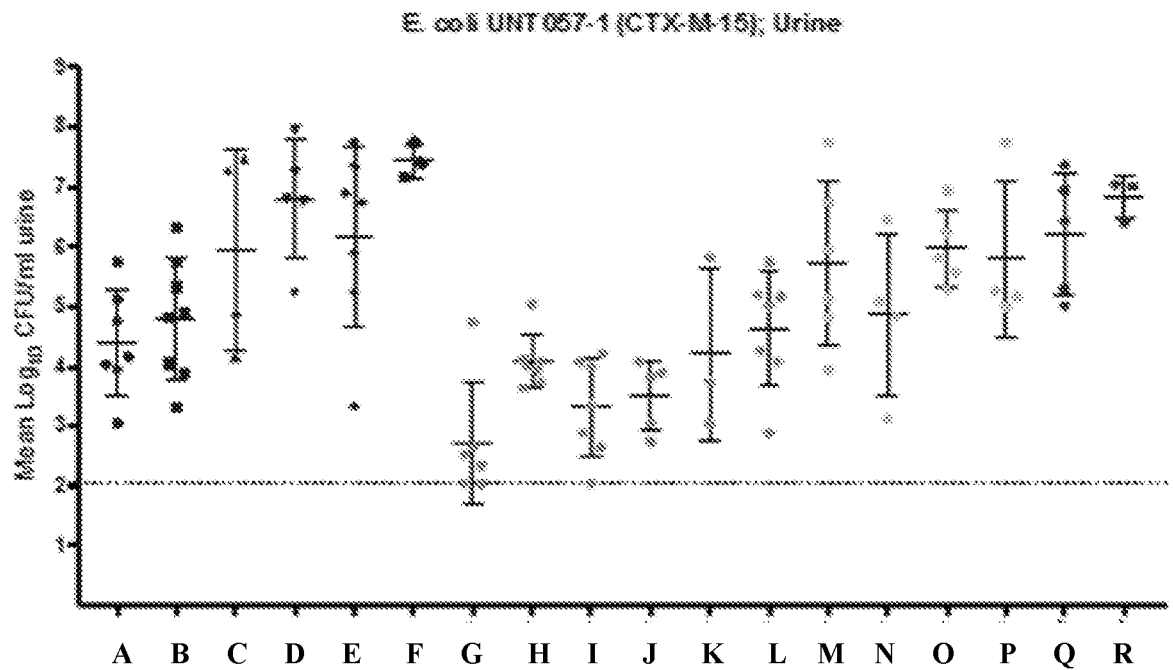

A = Ceftibuten – 300 mg/kg

B = Ceftibuten – 100 mg/kg

C = Ceftibuten – 30 mg/kg

D = Ceftibuten – 10 mg/kg

E = Ceftibuten – 3 mg/kg

F = Ceftibuten – 1 mg/kg

G = Ceftibuten:Compound 2, 1:1 (300 mg/kg:300 mg/kg)

H = Ceftibuten:Compound 2, 1:1 (100 mg/kg:100 mg/kg)

I = Ceftibuten:Compound 2, 1:1 (30 mg/kg:30 mg/kg)

J = Ceftibuten:Compound 2, 1:1 (10 mg/kg:10 mg/kg)

K = Ceftibuten:Compound 2, 1:1 (3 mg/kg:3 mg/kg)

L = Ceftibuten:Compound 2, 1:1 (1 mg/kg:1 mg/kg)

M = Amoxicillin:Clavulanate, 2:1 (300 mg/kg:150 mg/kg)

N = Amoxicillin:Clavulanate, 2:1 (100 mg/kg:50 mg/kg)

O = Amoxicillin:Clavulanate, 2:1 (30 mg/kg:15 mg/kg)

P = Amoxicillin:Clavulanate, 2:1 (10 mg/kg:5 mg/kg)

Q = 7 day control

R = 4 day control

FIG. 7B

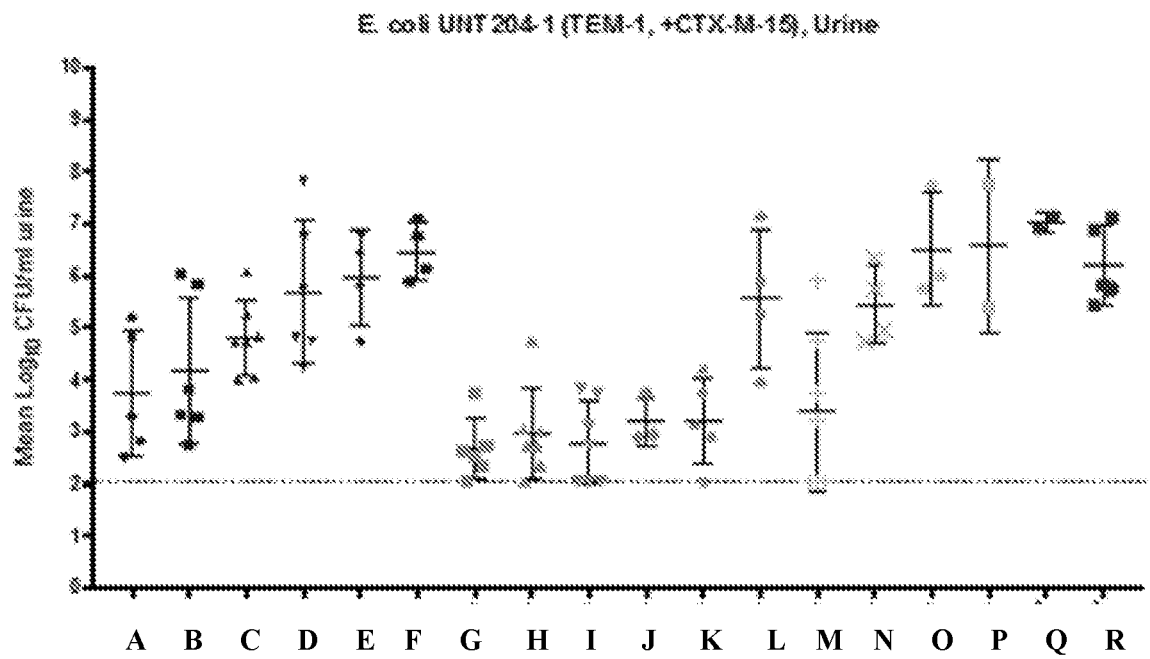

A = Ceftibuten – 300 mg/kg

B = Ceftibuten – 100 mg/kg

C = Ceftibuten – 30 mg/kg

D = Ceftibuten – 10 mg/kg

E = Ceftibuten – 3 mg/kg

F = Ceftibuten – 1 mg/kg

G = Ceftibuten:Compound 2, 1:1 (300 mg/kg:300 mg/kg)

H = Ceftibuten:Compound 2, 1:1 (100 mg/kg:100 mg/kg)

I = Ceftibuten:Compound 2, 1:1 (30 mg/kg:30 mg/kg)

J = Ceftibuten:Compound 2, 1:1 (10 mg/kg:10 mg/kg)

K = Ceftibuten:Compound 2, 1:1 (3 mg/kg:3 mg/kg)

L = Ceftibuten:Compound 2, 1:1 (1 mg/kg:1 mg/kg)

M = Amoxicillin:Clavulanate, 2:1 (300 mg/kg:150 mg/kg)

N = Amoxicillin:Clavulanate, 2:1 (100 mg/kg:50 mg/kg)

O = Amoxicillin:Clavulanate, 2:1 (30 mg/kg:15 mg/kg)

P = Amoxicillin:Clavulanate, 2:1 (10 mg/kg:5 mg/kg)

Q = 7 day control

R = 4 day control

FIG. 7C

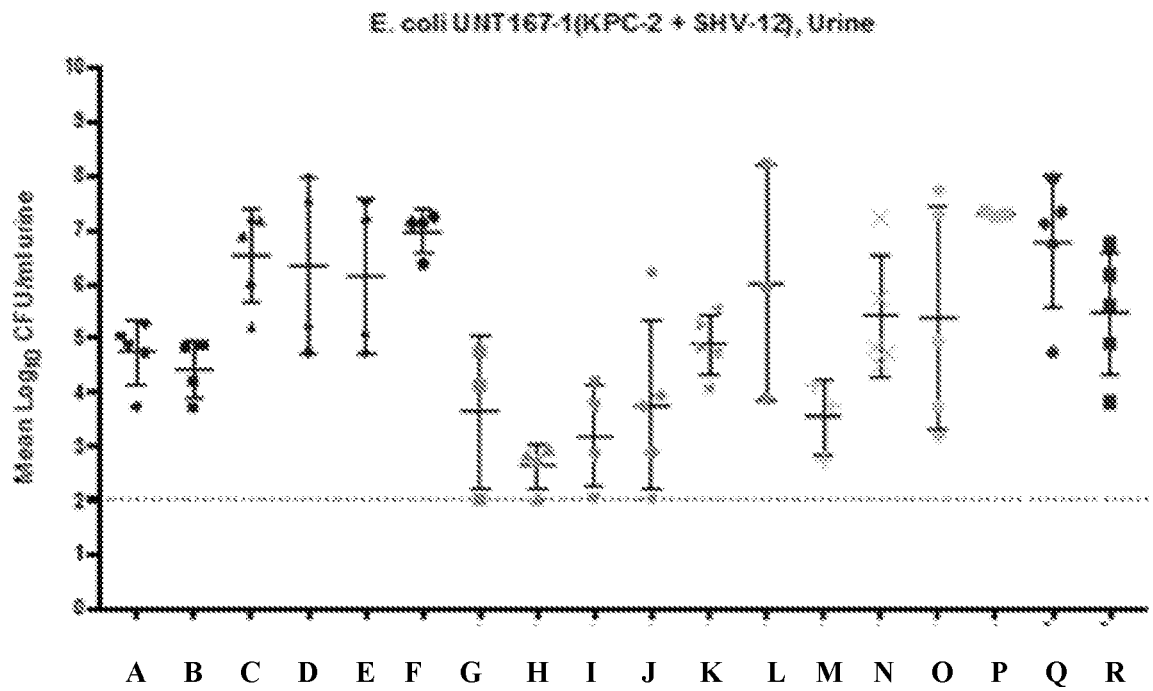

A = Ceftibuten – 300 mg/kg

B = Ceftibuten – 100 mg/kg

C = Ceftibuten – 30 mg/kg

D = Ceftibuten – 10 mg/kg

E = Ceftibuten – 3 mg/kg

F = Ceftibuten – 1 mg/kg

G = Ceftibuten:Compound 2, 1:1 (300 mg/kg:300 mg/kg)

H = Ceftibuten:Compound 2, 1:1 (100 mg/kg:100 mg/kg)

I = Ceftibuten:Compound 2, 1:1 (30 mg/kg:30 mg/kg)

J = Ceftibuten:Compound 2, 1:1 (10 mg/kg:10 mg/kg)

K = Ceftibuten:Compound 2, 1:1 (3 mg/kg:3 mg/kg)

L = Ceftibuten:Compound 2, 1:1 (1 mg/kg:1 mg/kg)

M = Amoxicillin:Clavulanate, 2:1 (300 mg/kg:150 mg/kg)

N = Amoxicillin:Clavulanate, 2:1 (100 mg/kg:50 mg/kg)

O = Amoxicillin:Clavulanate, 2:1 (30 mg/kg:15 mg/kg)

P = Amoxicillin:Clavulanate, 2:1 (10 mg/kg:5 mg/kg)

Q = 7 day control

R = 4 day control

COMBINATION COMPOSITIONS COMPRISING A BETA-LACTAMASE INHIBITOR AND USES THEREOF

CROSS-REFERENCE

This patent application is a national stage entry of PCT/US2019/062798, filed on Nov. 22, 2019, which claims the benefit of U.S. Provisional Application No. 62/773,063, filed Nov. 29, 2018; U.S. Provisional Application No. 62/777,643, filed Dec. 10, 2018; U.S. Provisional Application No. 62/796,524, filed Jan. 24, 2019; U.S. Provisional Application No. 62/828,354, filed Apr. 2, 2019; and U.S. Provisional Application No. 62/832,118, filed Apr. 10, 2019; each of which are incorporated herein by reference in their entirety.

STATEMENT AS TO FEDERALLY SPONSORED RESEARCH

This invention was made with government support under Grant No. R01AI111539, Grant No. R43AI109879, Grant No. R44AI109879, and Contract No. HHSN272201600029C, awarded by the National Institutes of Health (NIH). The government has certain rights in the invention.

FIELD OF INVENTION

The present invention relates to pharmaceutical compositions containing boron-containing compounds and their use as inhibitors of beta-lactamase enzymes and as antibacterial agents in combination with a beta-lactam antibiotic.

BACKGROUND OF THE INVENTION

Antibiotics are the most effective drugs for curing bacterial-infectious diseases clinically. They have a wide market due to their advantages of good antibacterial effect with limited side effects. Among them, the beta-lactam class of antibiotics (for example, penicillins, cephalosporins, and carbapenems) are widely used because they have a strong bactericidal effect and low toxicity.

To counter the efficacy of the various beta-lactams, bacteria have evolved to produce variants of beta-lactam deactivating enzymes called beta-lactamases, and in the ability to share this tool inter- and intra-species. These beta-lactamases are categorized as "serine" or "metallo" based, respectively, on presence of a key serine or zinc in the enzyme active site. The rapid spread of this mechanism of bacterial resistance can severely limit beta-lactam treatment options in the hospital and in the community.

There is a need for new orally-delivered antibacterial agents to treat resistant gram-negative infections in both the community and hospital setting.

SUMMARY OF THE INVENTION

Disclosed herein is a pharmaceutical composition comprising:
(i) a compound of formula (I) or (II); a pharmaceutically acceptable salt, a solvate, or a pharmaceutically acceptable salt and solvate thereof:

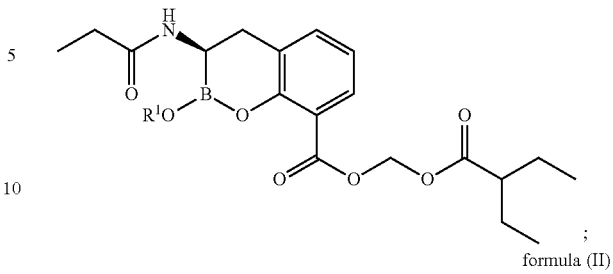
formula (I)

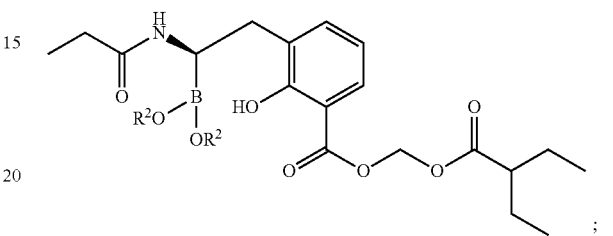
formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) ceftibuten.

In some embodiments of a pharmaceutical composition, the compound of formula (I) or (II), or a pharmaceutically acceptable salt, a solvate, or a pharmaceutically acceptable salt and solvate thereof is:

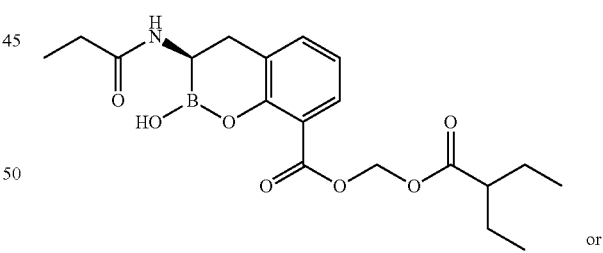

or

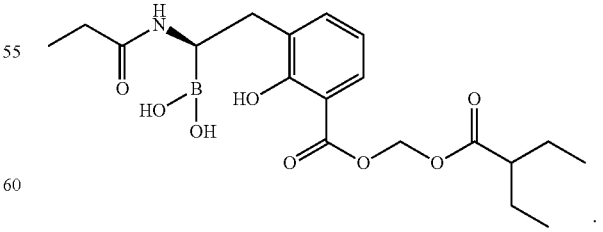

In some embodiments of a pharmaceutical composition, the compound of formula (I), or a pharmaceutically acceptable salt, a solvate, or a pharmaceutically acceptable salt and solvate thereof is:

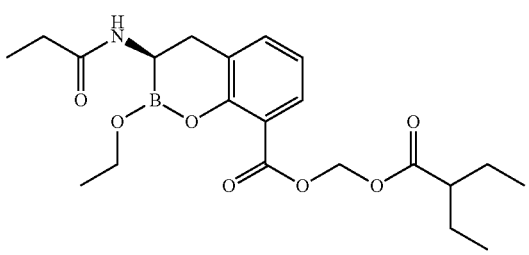

In some embodiments of a pharmaceutical composition, the pharmaceutical composition is formulated for oral administration. In some embodiments of a pharmaceutical composition, the pharmaceutical composition is formulated as an emulsion. In some embodiments of a pharmaceutical composition, the pharmaceutical composition is formulated as a microemulsion. In some embodiments of a pharmaceutical composition, the pharmaceutical composition is formulated as a Self-Emulsifying Drug Delivery System (SEDDS). In some embodiments of a pharmaceutical composition, the pharmaceutical composition further comprises a hydrophilic solubilizer. In some embodiments of a pharmaceutical composition, the hydrophilic solubilizer is a hydrophilic polymer. In some embodiments of a pharmaceutical composition, the hydrophilic polymer is a polyethylene glycol. In some embodiments of a pharmaceutical composition, the pharmaceutical composition further comprises a surfactant. In some embodiments of a pharmaceutical composition, the surfactant is a polyoxyethylene stearate. In some embodiments of a pharmaceutical composition, the pharmaceutical composition further comprises a pharmaceutically acceptable excipient. In some embodiments of a pharmaceutical composition, the pharmaceutical composition further comprises polyethylene glycol, caprylic/capric glycerides, and tocopheryl polyethylene glycol succinate. In some embodiments of a pharmaceutical composition, the pharmaceutical composition further comprises propylene glycol, polyethylene glycol, and tocopheryl polyethylene glycol succinate. In some embodiments of a pharmaceutical composition, the pharmaceutical composition is formulated as a tablet. In some embodiments of a pharmaceutical composition, the pharmaceutical composition is formulated as a capsule. In some embodiments of a pharmaceutical composition, the pharmaceutical composition is formulated as a powder for reconstitution. In some embodiments of a pharmaceutical composition, the pharmaceutical composition is formulated as a solution.

In some embodiments of a pharmaceutical composition, the powder for reconstitution is reconstituted with a liquid carrier to form an oral suspension.

Also disclosed herein is a pharmaceutical composition comprising:
  (i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
  (ii) ceftibuten.

Also disclosed herein is a method of treating a bacterial infection in a subject in need thereof, the method comprising administering to the subject:
  (i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
  (ii) ceftibuten.

Also disclosed herein is a method of treating a bacterial infection in a subject in need thereof, the method comprising delivering to the subject:
  (i) (R)-2-hydroxy-3-propionamido-3,4-dihydro-2H-benzo[e][1,2]oxaborinine-8-carboxylic acid or ((R)-3-(2-borono-2-propionamidoethyl)-2-hydroxybenzoic acid; and
  (ii) ceftibuten.

In some embodiments of a method of treating a bacterial infection, the bacterial infection is caused by carbapenem-resistant Enterobacteriaceae (CRE) or extended-spectrum beta-lactamase (ESBL) producing gram-negative bacteria.

In some embodiments of a method of treating a bacterial infection, the method comprises administering to the subject in need thereof:
  (i) a compound of formula (I) or (II); a pharmaceutically acceptable salt, a solvate, or a pharmaceutically acceptable salt and solvate thereof:

formula (I)

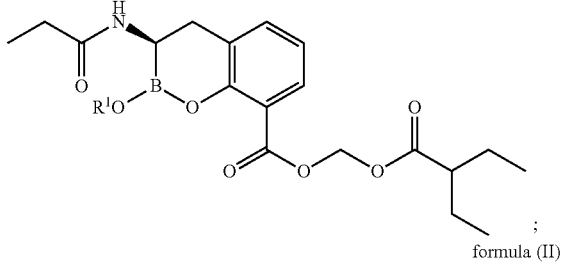

formula (II)

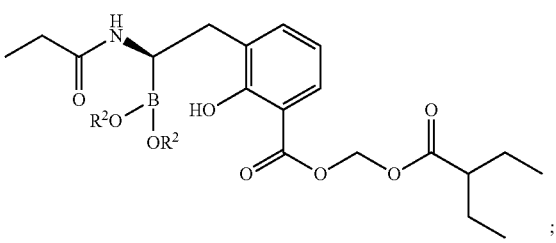

wherein:
  each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-C$_6$ alkyl, —N($C_1$-$C_6$ alkyl)$_2$, —COOH, or —COO($C_1$-$C_6$ alkyl);
  or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-C$_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
  (ii) ceftibuten.

In some embodiments of a method of treating a bacterial infection, the compound of formula (I) or (II), or a pharmaceutically acceptable salt, a solvate, or a pharmaceutically acceptable salt and solvate thereof is:

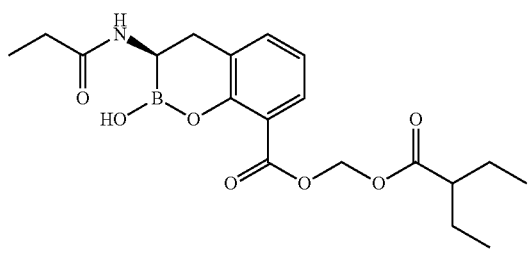

or

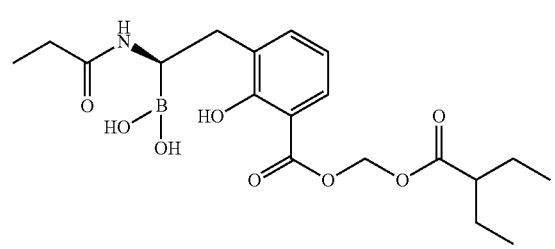

In some embodiments of a method of treating a bacterial infection, the compound of formula (I), or a pharmaceutically acceptable salt, a solvate, or a pharmaceutically acceptable salt and solvate thereof is:

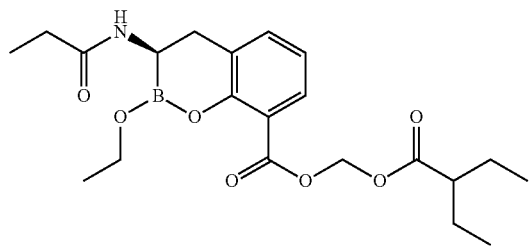

In some embodiments of a method of treating a bacterial infection, the compound of formula (I) or (II); a pharmaceutically acceptable salt, a solvate, or a pharmaceutically acceptable salt and solvate thereof, and ceftibuten are formulated for oral administration. In some embodiments of a method of treating a bacterial infection, the compound of formula (I) or (II); a pharmaceutically acceptable salt, a solvate, or a pharmaceutically acceptable salt and solvate thereof, and ceftibuten are administered sequentially. In some embodiments of a method of treating a bacterial infection, the compound of formula (I) or (II); a pharmaceutically acceptable salt, a solvate, or a pharmaceutically acceptable salt and solvate thereof; and ceftibuten are administered concurrently.

Also disclosed herein is a method of treating a bacterial infection in a subject in need thereof, the method comprising administering to the subject:

(i) a compound of formula (I) or (II); a pharmaceutically acceptable salt, a solvate, or a pharmaceutically acceptable salt and solvate thereof:

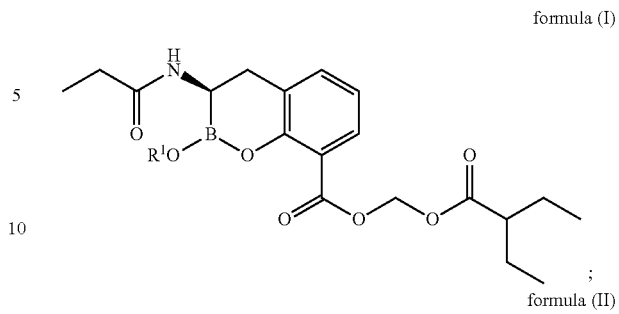

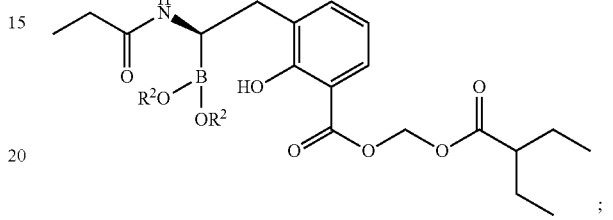

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) ceftibuten.

In some embodiments of a method of treating a bacterial infection, the compound of formula (I) or (II), or a pharmaceutically acceptable salt, a solvate, or a pharmaceutically acceptable salt and solvate thereof is:

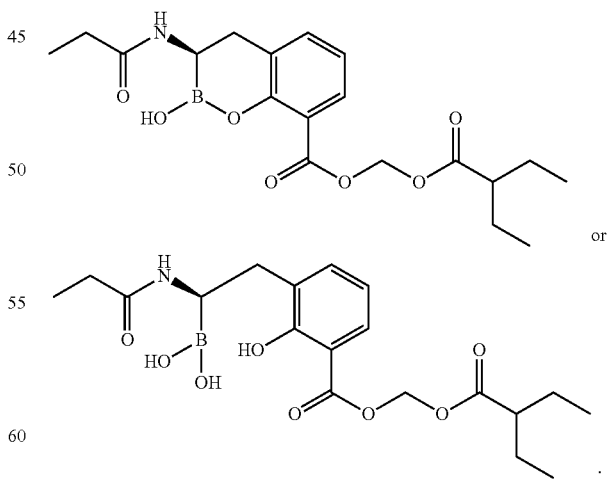

In some embodiments of a method of treating a bacterial infection, the compound of formula (I), or a pharmaceutically acceptable salt, a solvate, or a pharmaceutically acceptable salt and solvate thereof is:

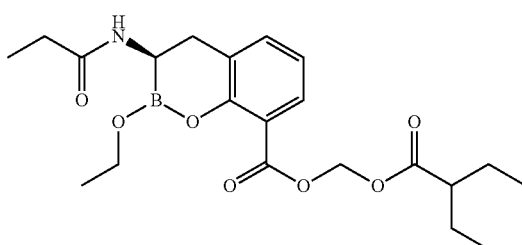

In some embodiments of a method of treating a bacterial infection, the bacterial infection is caused by carbapenem-resistant Enterobacteriaceae (CRE) or extended-spectrum beta-lactamase (ESBL) producing gram-negative bacteria. In some embodiments of a method of treating a bacterial infection, the compound of formula (I) or (II); a pharmaceutically acceptable salt, a solvate, or a pharmaceutically acceptable salt and solvate thereof, and ceftibuten are formulated for oral administration. In some embodiments of a method of treating a bacterial infection, the compound of formula (I) or (II); a pharmaceutically acceptable salt, a solvate, or a pharmaceutically acceptable salt and solvate thereof and ceftibuten are administered sequentially. In some embodiments of a method of treating a bacterial infection, the compound of formula (I) or (II); a pharmaceutically acceptable salt, a solvate, or a pharmaceutically acceptable salt and solvate thereof and ceftibuten are administered concurrently.

Also disclosed herein is a pharmaceutical composition comprising:

(i) a compound of formula (I) or (II); a pharmaceutically acceptable salt, a solvate, or a pharmaceutically acceptable salt and solvate thereof:

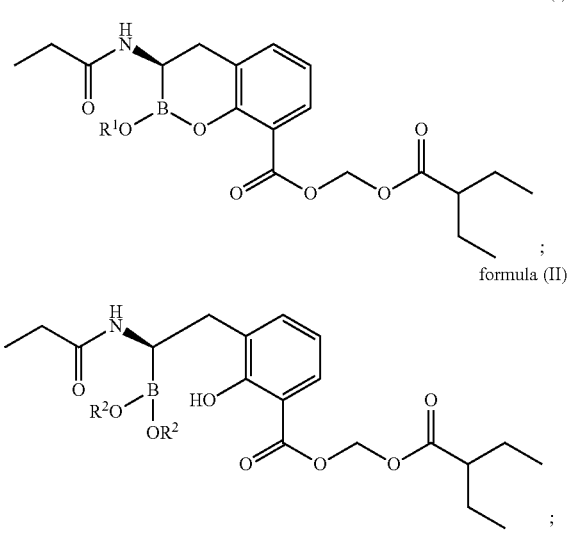

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-$C_6$ alkyl, —N($C_1$-$C_6$ alkyl)$_2$, —COOH, or —COO($C_1$-$C_6$ alkyl);
or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) cefixime.

In some embodiments of a pharmaceutical composition, the compound of formula (I) or (II), or a pharmaceutically acceptable salt, a solvate, or a pharmaceutically acceptable salt and solvate thereof is:

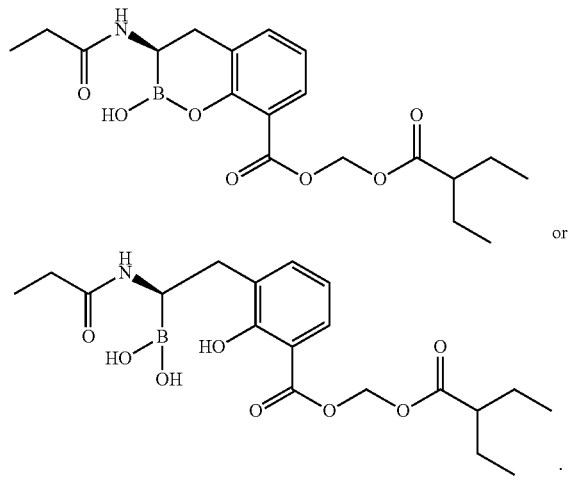

In some embodiments of a pharmaceutical composition, the compound of formula (I), or a pharmaceutically acceptable salt, a solvate, or a pharmaceutically acceptable salt and solvate thereof is:

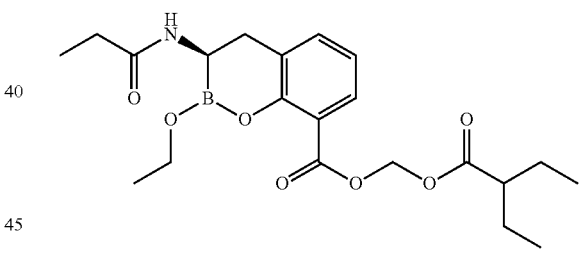

In some embodiments of a pharmaceutical composition, the pharmaceutical composition is formulated for oral administration. In some embodiments of a pharmaceutical composition, the pharmaceutical composition is formulated as an emulsion. In some embodiments of a pharmaceutical composition, the pharmaceutical composition is formulated as a microemulsion. In some embodiments of a pharmaceutical composition, the pharmaceutical composition is formulated as a Self-Emulsifying Drug Delivery System (SEDDS). In some embodiments of a pharmaceutical composition, the pharmaceutical composition further comprises a hydrophilic solubilizer. In some embodiments of a pharmaceutical composition, the hydrophilic solubilizer is a hydrophilic polymer. In some embodiments of a pharmaceutical composition, the hydrophilic polymer is a polyethylene glycol. In some embodiments of a pharmaceutical composition, the pharmaceutical composition further comprises a surfactant. In some embodiments of a pharmaceutical composition, the surfactant is a polyoxyethylene stearate. In some embodiments of a pharmaceutical composition, the pharmaceutical composition further comprises a pharmaceutically acceptable excipient. In some embodiments of a pharmaceutical composition, the pharmaceutical composition further comprises polyethylene glycol, caprylic/capric glycerides, and tocopheryl polyethylene glycol succinate. In some embodiments of a pharmaceutical composition, the pharmaceutical composition further comprises propylene glycol, polyethylene glycol, and tocopheryl polyethylene glycol succinate. In some embodiments of a pharmaceutical composition, the pharmaceutical composition is formulated as a capsule. In some embodiments of a pharmaceutical composition, the pharmaceutical composition is formulated as a tablet. In some embodiments of a pharmaceutical composition, the pharmaceutical composition is formulated as a powder for reconstitution. In some embodiments of a pharmaceutical composition, the pharmaceutical composition is formulated as a solution.

In some embodiments of a pharmaceutical composition, the powder for reconstitution is reconstituted with a liquid carrier to form an oral suspension.

Also disclosed herein is a pharmaceutical composition comprising:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
(ii) cefixime.

Also disclosed herein is a method of treating a bacterial infection in a subject in need thereof, the method comprising administering to the subject:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
(ii) cefixime.

Also disclosed herein is a method of treating a bacterial infection in a subject in need thereof, the method comprising delivering to the subject:
(i) (R)-2-hydroxy-3-propionamido-3,4-dihydro-2H-benzo[e][1,2]oxaborinine-8-carboxylic acid or ((R)-3-(2-borono-2-propionamidoethyl)-2-hydroxybenzoic acid; and
(ii) cefixime.

In some embodiments of a method of treating a bacterial infection, the bacterial infection is caused by carbapenem-resistant Enterobacteriaceae (CRE) or extended-spectrum beta-lactamase (ESBL) producing gram-negative bacteria.

In some embodiments of a method of treating a bacterial infection, the method comprises administering to the subject in need thereof:
(i) a compound of formula (I) or (II); a pharmaceutically acceptable salt, a solvate, or a pharmaceutically acceptable salt and solvate thereof:

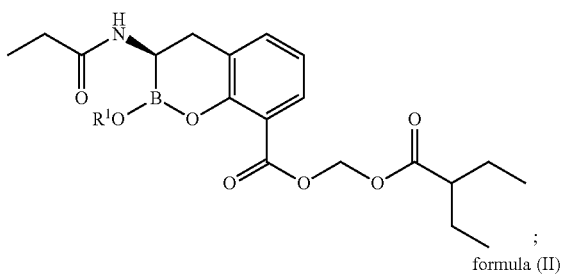

formula (I)

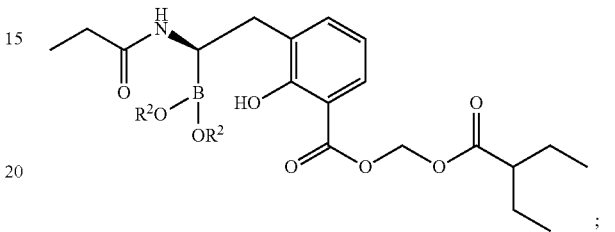

formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-C$_6$ alkyl, —N(C$_1$-C$_6$ alkyl)$_2$, —COOH, or —COO(C$_1$-C$_6$ alkyl);
or two $R^2$ are taken together to form a 4- to 8-membered heterocycloalkyl optionally substituted with oxo, halogen, —OH, C$_1$-C$_6$ alkyl, —O(C$_1$-C$_6$ alkyl), —NH$_2$, —NHC$_1$-C$_6$ alkyl, —N(C$_1$-C$_6$ alkyl)$_2$, —COOH, —COO(C$_1$-C$_6$ alkyl), —(C$_1$-C$_6$ alkylene)COOH, or —(C$_1$-C$_6$ alkylene)COO(C$_1$-C$_6$ alkyl); and
(ii) cefixime.

In some embodiments of a method of treating a bacterial infection, the compound of formula (I) or (II), or a pharmaceutically acceptable salt, a solvate, or a pharmaceutically acceptable salt and solvate thereof is:

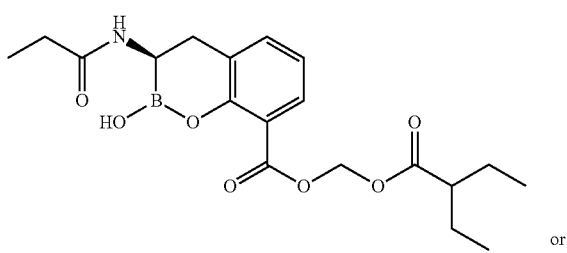

or

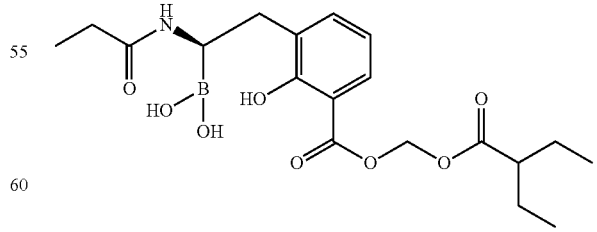

In some embodiments of a method of treating a bacterial infection, the compound of formula (I), or a pharmaceutically acceptable salt, a solvate, or a pharmaceutically acceptable salt and solvate thereof is:

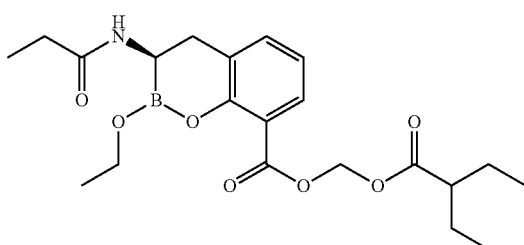

In some embodiments of a method of treating a bacterial infection, the compound of formula (I) or (II); a pharmaceutically acceptable salt, a solvate, or a pharmaceutically acceptable salt and solvate thereof, and cefixime are formulated for oral administration. In some embodiments of a method of treating a bacterial infection, the compound of formula (I) or (II); a pharmaceutically acceptable salt, a solvate, or a pharmaceutically acceptable salt and solvate thereof, and cefixime are administered sequentially. In some embodiments of a method of treating a bacterial infection, the compound of formula (I) or (II); a pharmaceutically acceptable salt, a solvate, or a pharmaceutically acceptable salt and solvate thereof; and cefixime are administered concurrently.

A method of treating a bacterial infection in a subject in need thereof, the method comprising administering to the subject:
(i) a compound of formula (I) or (II); a pharmaceutically acceptable salt, a solvate, or a pharmaceutically acceptable salt and solvate thereof:

formula (I)

formula (II)

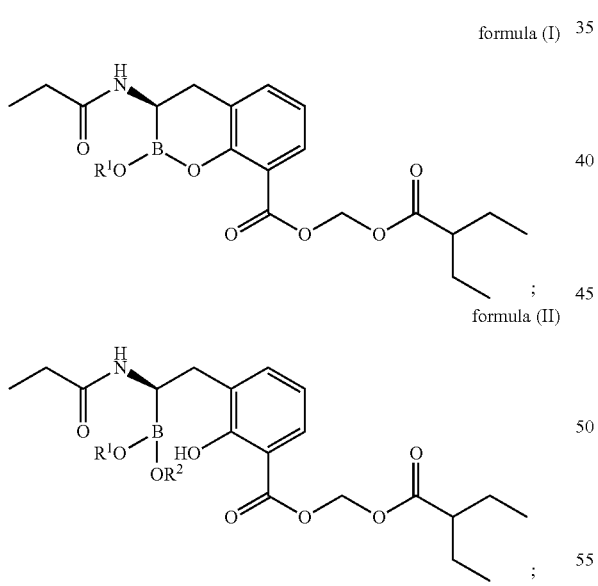

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —$N(C_1$-$C_6$ alkyl$)_2$, —COOH, or —COO($C_1$-$C_6$ alkyl);
or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —$N(C_1$-$C_6$ alkyl$)_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
(ii) cefixime.

In some embodiments of a method of treating a bacterial infection, the compound of formula (I) or (II), or a pharmaceutically acceptable salt, a solvate, or a pharmaceutically acceptable salt and solvate thereof is:

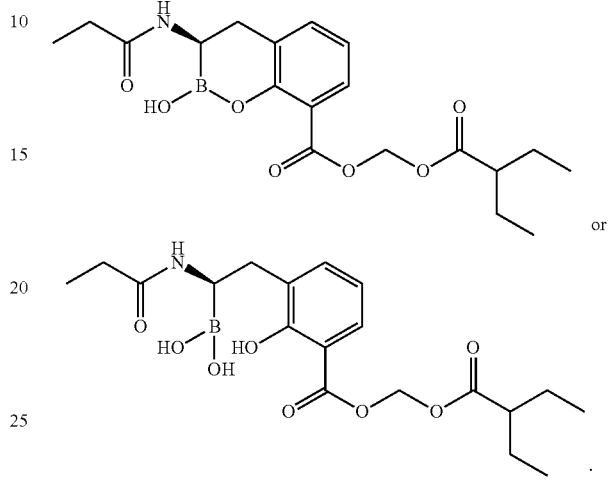

or

In some embodiments of a method of treating a bacterial infection, the compound of formula (I), or a pharmaceutically acceptable salt, or a pharmaceutically acceptable salt and solvate thereof is:

In some embodiments of a method of treating a bacterial infection, the bacterial infection is caused by carbapenem-resistant Enterobacteriaceae (CRE) or extended-spectrum beta-lactamase (ESBL) producing gram-negative bacteria. In some embodiments of a method of treating a bacterial infection, the compound of formula (I) or (II); a pharmaceutically acceptable salt, a solvate, or a pharmaceutically acceptable salt and solvate thereof, and cefixime are formulated for oral administration. In some embodiments of a method of treating a bacterial infection, the compound of formula (I) or (II); a pharmaceutically acceptable salt, a solvate, or a pharmaceutically acceptable salt and solvate thereof and cefixime are administered sequentially. In some embodiments of a method of treating a bacterial infection, the compound of formula (I) or (II); a pharmaceutically acceptable salt, a solvate, or a pharmaceutically acceptable salt and solvate thereof and cefixime are administered concurrently.

Disclosed herein is a pharmaceutical composition comprising:
(i) a compound of formula (I) or (II); a pharmaceutically acceptable salt, a solvate, or a pharmaceutically acceptable salt and solvate thereof:

formula (I)

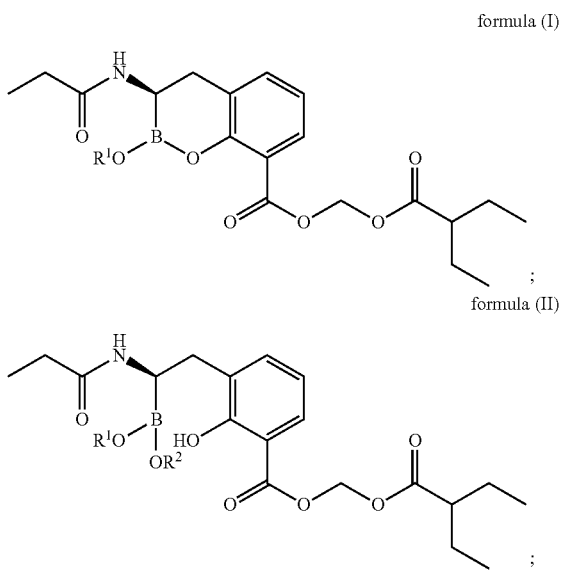

formula (II)

wherein:
each R¹ and R² is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NH$C_1$-$C_6$ alkyl, —N($C_1$-$C_6$ alkyl)$_2$, —COOH, or —COO($C_1$-$C_6$ alkyl);
or two R² are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NH$C_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
(ii) cefditoren pivoxil.

In some embodiments of a pharmaceutical composition, the compound of formula (I) or (II), or a pharmaceutically acceptable salt, a solvate, or a pharmaceutically acceptable salt and solvate thereof is:

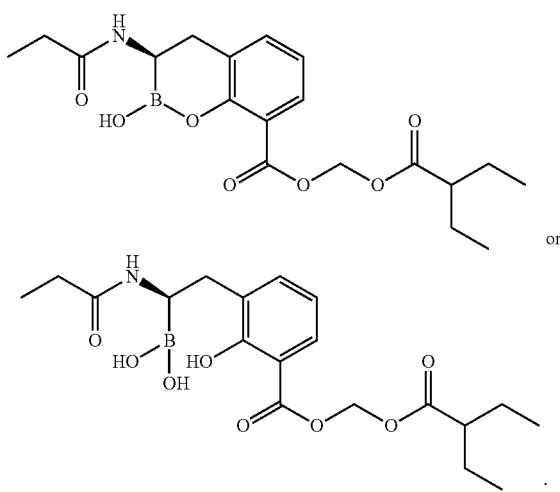

In some embodiments of a pharmaceutical composition, the compound of formula (I), or a pharmaceutically acceptable salt, a solvate, or a pharmaceutically acceptable salt and solvate thereof is:

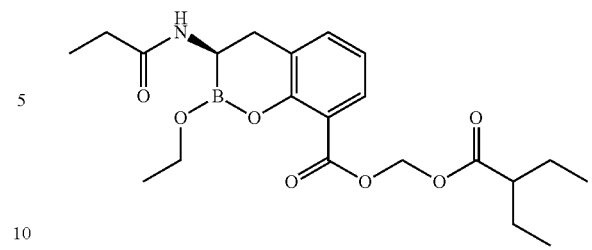

In some embodiments of a pharmaceutical composition, the pharmaceutical composition is formulated for oral administration. In some embodiments of a pharmaceutical composition, the pharmaceutical composition is formulated as an emulsion. In some embodiments of a pharmaceutical composition, the pharmaceutical composition is formulated as a microemulsion. In some embodiments of a pharmaceutical composition, the pharmaceutical composition is formulated as a Self-Emulsifying Drug Delivery System (SEDDS). In some embodiments of a pharmaceutical composition, the pharmaceutical composition further comprises a hydrophilic solubilizer. In some embodiments of a pharmaceutical composition, the hydrophilic solubilizer is a hydrophilic polymer. In some embodiments of a pharmaceutical composition, the hydrophilic polymer is a polyethylene glycol. In some embodiments of a pharmaceutical composition, the pharmaceutical composition further comprises a surfactant. In some embodiments of a pharmaceutical composition, the surfactant is a polyoxyethylene stearate. In some embodiments of a pharmaceutical composition, the pharmaceutical composition further comprises a pharmaceutically acceptable excipient. In some embodiments of a pharmaceutical composition, the pharmaceutical composition further comprises polyethylene glycol, caprylic/capric glycerides, and tocopheryl polyethylene glycol succinate. In some embodiments of a pharmaceutical composition, the pharmaceutical composition further comprises propylene glycol, polyethylene glycol, and tocopheryl polyethylene glycol succinate. In some embodiments of a pharmaceutical composition, the pharmaceutical composition is formulated as a tablet. In some embodiments of a pharmaceutical composition, the pharmaceutical composition is formulated as a capsule. In some embodiments of a pharmaceutical composition, the pharmaceutical composition is formulated as a powder for reconstitution. In some embodiments of a pharmaceutical composition, the pharmaceutical composition is formulated as a solution.

In some embodiments of a pharmaceutical composition, the powder for reconstitution is reconstituted with a liquid carrier to form an oral suspension.

Also disclosed herein is a pharmaceutical composition comprising:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
(ii) cefditoren pivoxil.

Also disclosed herein is a method of treating a bacterial infection in a subject in need thereof, the method comprising administering to the subject:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and (ii) cefditoren pivoxil.

Also disclosed herein is a method of treating a bacterial infection in a subject in need thereof, the method comprising delivering to the subject:

(i) (R)-2-hydroxy-3-propionamido-3,4-dihydro-2H-benzo[e][1,2]oxaborinine-8-carboxylic acid or ((R)-3-(2-borono-2-propionamidoethyl)-2-hydroxybenzoic acid; and (ii) cefditoren pivoxil.

In some embodiments of a method of treating a bacterial infection, the bacterial infection is caused by carbapenem-resistant Enterobacteriaceae (CRE) or extended-spectrum beta-lactamase (ESBL) producing gram-negative bacteria.

In some embodiments of a method of treating a bacterial infection, the method comprises administering to the subject in need thereof:

(i) a compound of formula (I) or (II); a pharmaceutically acceptable salt, a solvate, or a pharmaceutically acceptable salt and solvate thereof:

formula (I)

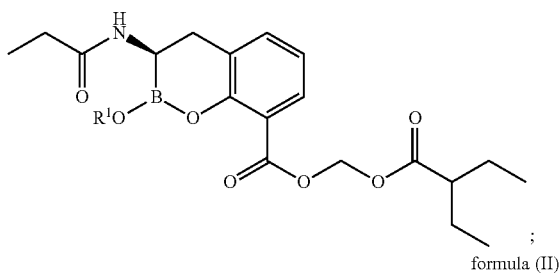

formula (II)

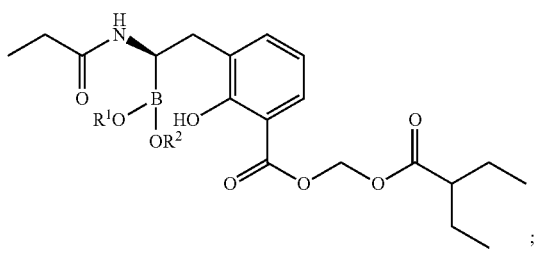

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) cefditoren pivoxil.

In some embodiments of a method of treating a bacterial infection, the compound of formula (I) or (II), or a pharmaceutically acceptable salt, a solvate, or a pharmaceutically acceptable salt and solvate thereof is:

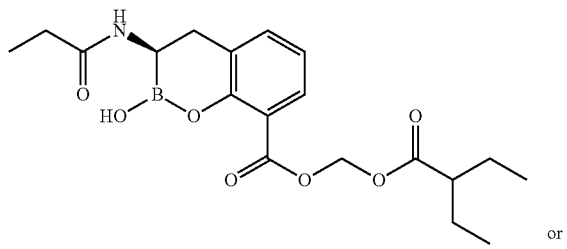

or

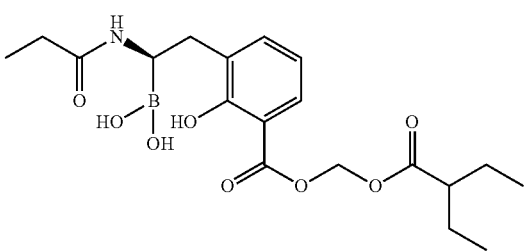

In some embodiments of a method of treating a bacterial infection, the compound of formula (I), or a pharmaceutically acceptable salt, a solvate, or a pharmaceutically acceptable salt and solvate thereof is:

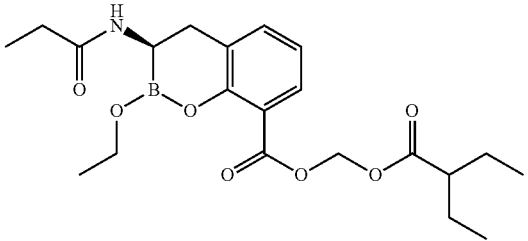

In some embodiments of a method of treating a bacterial infection, the compound of formula (I) or (II); a pharmaceutically acceptable salt, a solvate, or a pharmaceutically acceptable salt and solvate thereof, and cefditoren pivoxil are formulated for oral administration. In some embodiments of a method of treating a bacterial infection, the compound of formula (I) or (II); a pharmaceutically acceptable salt, a solvate, or a pharmaceutically acceptable salt and solvate thereof, and cefditoren pivoxil are administered sequentially. In some embodiments of a method of treating a bacterial infection, the compound of formula (I) or (II); a pharmaceutically acceptable salt, a solvate, or a pharmaceutically acceptable salt and solvate thereof; and cefditoren pivoxil are administered concurrently.

Also disclosed herein is a method of treating a bacterial infection in a subject in need thereof, the method comprising administering to the subject:

(i) a compound of formula (I) or (II); a pharmaceutically acceptable salt, a solvate, or a pharmaceutically acceptable salt and solvate thereof:

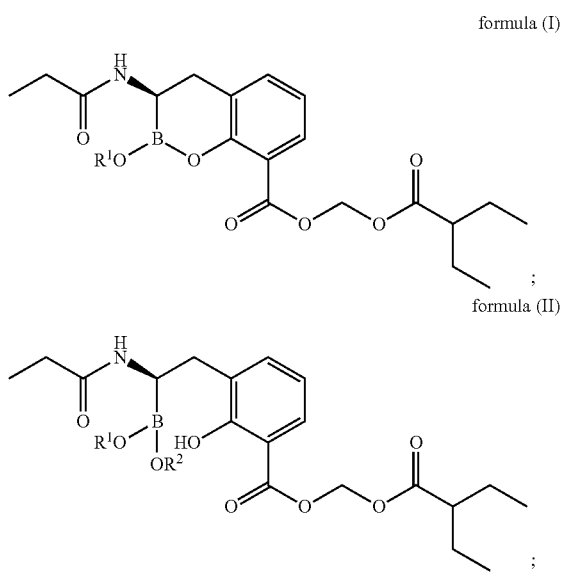

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);
or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
(ii) cefditoren pivoxil.

In some embodiments of a method of treating a bacterial infection, the compound of formula (I) or (II), or a pharmaceutically acceptable salt, a solvate, or a pharmaceutically acceptable salt and solvate thereof is:

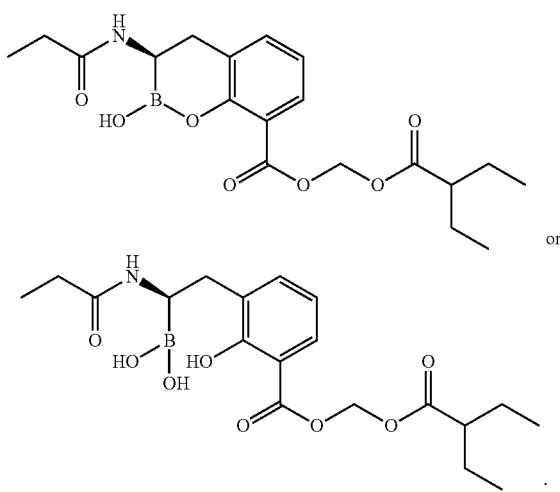

In some embodiments of a method of treating a bacterial infection, the compound of formula (I), or a pharmaceutically acceptable salt, a solvate, or a pharmaceutically acceptable salt and solvate thereof is:

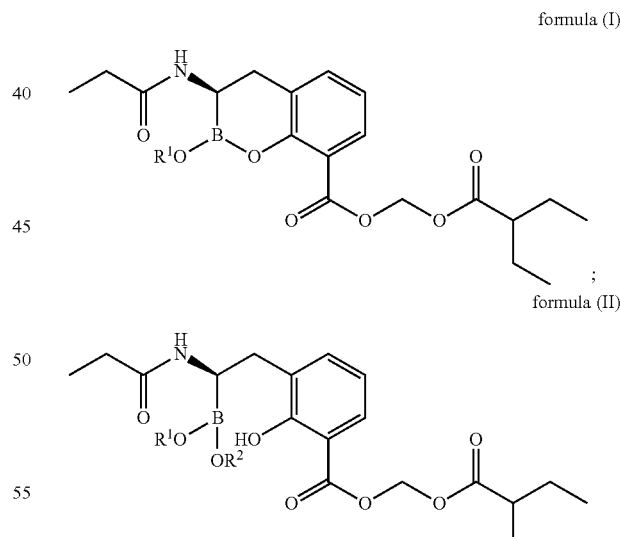

In some embodiments of a method of treating a bacterial infection, the bacterial infection is caused by carbapenem-resistant Enterobacteriaceae (CRE) or extended-spectrum beta-lactamase (ESBL) producing gram-negative bacteria. In some embodiments of a method of treating a bacterial infection, the compound of formula (I) or (II); a pharmaceutically acceptable salt, a solvate, or a pharmaceutically acceptable salt and solvate thereof, and cefditoren pivoxil are formulated for oral administration. In some embodiments of a method of treating a bacterial infection, the compound of formula (I) or (II); a pharmaceutically acceptable salt, a solvate, or a pharmaceutically acceptable salt and solvate thereof and cefditoren pivoxil are administered sequentially. In some embodiments of a method of treating a bacterial infection, the compound of formula (I) or (II); a pharmaceutically acceptable salt, a solvate, or a pharmaceutically acceptable salt and solvate thereof and cefditoren pivoxil are administered concurrently.

Disclosed herein is a pharmaceutical composition comprising:
(i) a compound of formula (I) or (II); a pharmaceutically acceptable salt, a solvate, or a pharmaceutically acceptable salt and solvate thereof:

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);
or two $R^2$ are taken together to form a 4- to 8-membered heterocycloalkyl optionally substituted with oxo, halogen, —OH, C$_1$-C$_6$ alkyl, —O(C$_1$-C$_6$ alkyl), —NH$_2$, —NHC$_1$-C$_6$ alkyl, —N(C$_1$-C$_6$ alkyl)$_2$, —COOH, —COO(C$_1$-C$_6$ alkyl), —(C$_1$-C$_6$ alkylene)COOH, or —(C$_1$-C$_6$ alkylene)COO(C$_1$-C$_6$ alkyl); and (ii) cefpodoxime proxetil.

In some embodiments of a pharmaceutical composition, the compound of formula (I) or (II), or a pharmaceutically acceptable salt, a solvate, or a pharmaceutically acceptable salt and solvate thereof is:

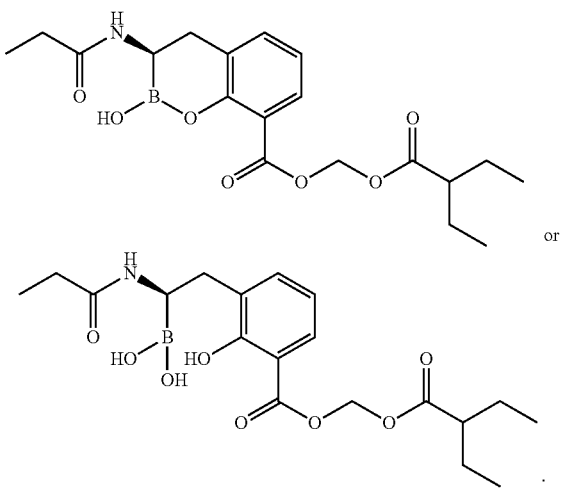

In some embodiments of a pharmaceutical composition, the compound of formula (I), or a pharmaceutically acceptable salt, a solvate, or a pharmaceutically acceptable salt and solvate thereof is:

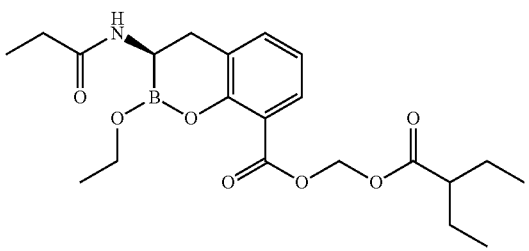

In some embodiments of a pharmaceutical composition, the pharmaceutical composition is formulated for oral administration. In some embodiments of a pharmaceutical composition, the pharmaceutical composition is formulated as an emulsion. In some embodiments of a pharmaceutical composition, the pharmaceutical composition is formulated as a microemulsion. In some embodiments of a pharmaceutical composition, the pharmaceutical composition is formulated as a Self-Emulsifying Drug Delivery System (SEDDS). In some embodiments of a pharmaceutical composition, the pharmaceutical composition further comprises a hydrophilic solubilizer. In some embodiments of a pharmaceutical composition, the hydrophilic solubilizer is a hydrophilic polymer. In some embodiments of a pharmaceutical composition, the hydrophilic polymer is a polyethylene glycol. In some embodiments of a pharmaceutical composition, the pharmaceutical composition further comprises a surfactant. In some embodiments of a pharmaceutical composition, the surfactant is a polyoxyethylene stearate. In some embodiments of a pharmaceutical composition, the pharmaceutical composition further comprises a pharmaceutically acceptable excipient. In some embodiments of a pharmaceutical composition, the pharmaceutical composition further comprises polyethylene glycol, caprylic/capric glycerides, and tocopheryl polyethylene glycol succinate. In some embodiments of a pharmaceutical composition, the pharmaceutical composition further comprises propylene glycol, polyethylene glycol, and tocopheryl polyethylene glycol succinate. In some embodiments of a pharmaceutical composition, the pharmaceutical composition is formulated as a tablet. In some embodiments of a pharmaceutical composition, the pharmaceutical composition is formulated as a capsule. In some embodiments of a pharmaceutical composition, the pharmaceutical composition is formulated as a powder for reconstitution. In some embodiments of a pharmaceutical composition, the pharmaceutical composition is formulated as a solution. In some embodiments of a pharmaceutical composition, the powder for reconstitution is reconstituted with a liquid carrier to form an oral suspension.

Also disclosed herein is a pharmaceutical composition comprising:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
(ii) cefpodoxime proxetil.

Also disclosed herein is a method of treating a bacterial infection in a subject in need thereof, the method comprising administering to the subject:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
(ii) cefpodoxime proxetil.

Also disclosed herein is a method of treating a bacterial infection in a subject in need thereof, the method comprising delivering to the subject:
(i) (R)-2-hydroxy-3-propionamido-3,4-dihydro-2H-benzo[e][1,2]oxaborinine-8-carboxylic acid or ((R)-3-(2-borono-2-propionamidoethyl)-2-hydroxybenzoic acid; and
(ii) cefpodoxime proxetil.

In some embodiments of a method of treating a bacterial infection, the bacterial infection is caused by carbapenem-resistant Enterobacteriaceae (CRE) or extended-spectrum beta-lactamase (ESBL) producing gram-negative bacteria.

In some embodiments of a method of treating a bacterial infection, the method comprises administering to the subject in need thereof:
(i) a compound of formula (I) or (II); a pharmaceutically acceptable salt, a solvate, or a pharmaceutically acceptable salt and solvate thereof:

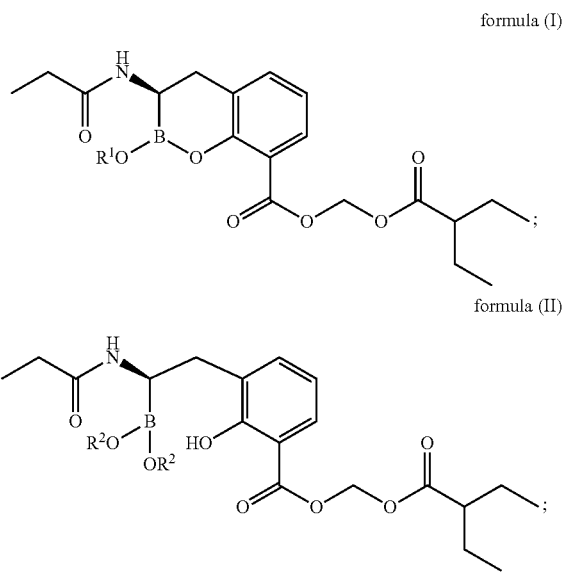

formula (I)

formula (II)

wherein:
  each R¹ and R² is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —NH$C_1$-$C_6$ alkyl, —N($C_1$-$C_6$ alkyl)$_2$, —COOH, or —COO($C_1$-$C_6$ alkyl);
  or two R² are taken together to form a 4- to 8-membered heterocycloalkyl optionally substituted with oxo, halogen, —OH, $C_1$-$C_6$ alkyl, —O($C_1$-$C_6$ alkyl), —$NH_2$, —NH$C_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
  (ii) cefpodoxime proxetil.

In some embodiments of a method of treating a bacterial infection, the compound of formula (I) or (II), or a pharmaceutically acceptable salt, a solvate, or a pharmaceutically acceptable salt and solvate thereof is:

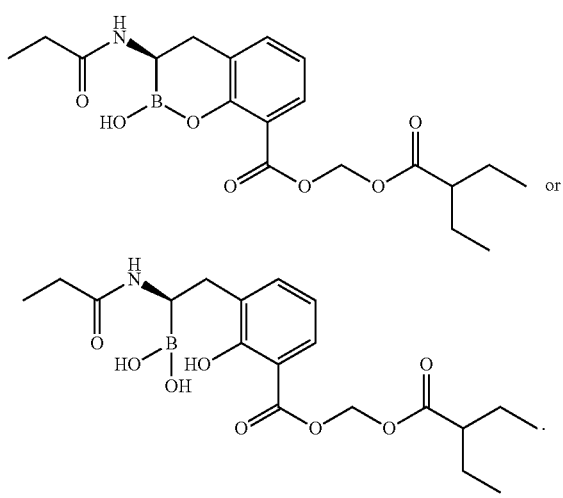

or

In some embodiments of a method of treating a bacterial infection, the compound of formula (I), or a pharmaceutically acceptable salt, a solvate, or a pharmaceutically acceptable salt and solvate thereof is:

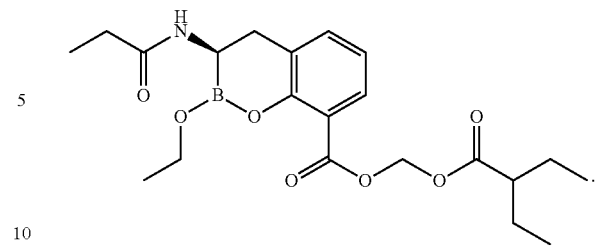

In some embodiments of a method of treating a bacterial infection, the compound of formula (I) or (II); a pharmaceutically acceptable salt, a solvate, or a pharmaceutically acceptable salt and solvate thereof, and cefpodoxime proxetil are formulated for oral administration. In some embodiments of a method of treating a bacterial infection, the compound of formula (I) or (II); a pharmaceutically acceptable salt, a solvate, or a pharmaceutically acceptable salt and solvate thereof, and cefpodoxime proxetil are administered sequentially. In some embodiments of a method of treating a bacterial infection, the compound of formula (I) or (II); a pharmaceutically acceptable salt, a solvate, or a pharmaceutically acceptable salt and solvate thereof; and cefpodoxime proxetil are administered concurrently.

Also disclosed herein is a method of treating a bacterial infection in a subject in need thereof, the method comprising administering to the subject:
  (i) a compound of formula (I) or (II); a pharmaceutically acceptable salt, a solvate, or a pharmaceutically acceptable salt and solvate thereof:

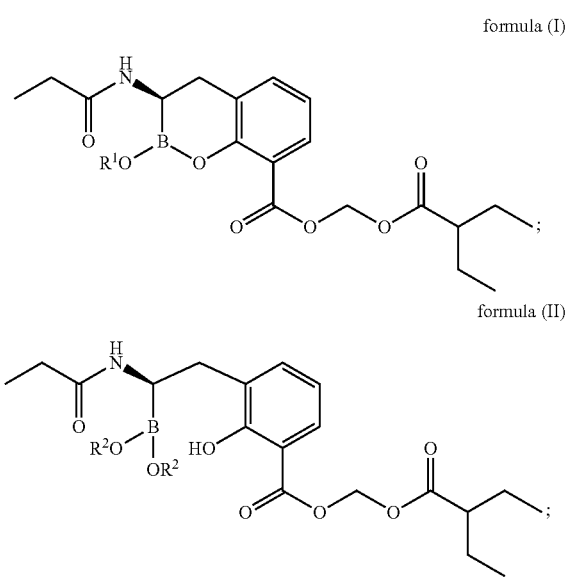

formula (I)

formula (II)

wherein:
  each R¹ and R² is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —NH$C_1$-$C_6$ alkyl, —N($C_1$-$C_6$ alkyl)$_2$, —COOH, or —COO($C_1$-$C_6$ alkyl);
  or two R² are taken together to form a 4- to 8-membered heterocycloalkyl optionally substituted with oxo, halogen, —OH, $C_1$-$C_6$ alkyl, —O($C_1$-$C_6$ alkyl), —$NH_2$, —NHC$_1$-C$_6$ alkyl, —N(C$_1$-C$_6$ alkyl)$_2$, —COOH, —COO(C$_1$-C$_6$ alkyl), —(C$_1$-C$_6$ alkylene)COOH, or —(C$_1$-C$_6$ alkylene)COO(C$_1$-C$_6$ alkyl); and (ii) cefpodoxime proxetil.

In some embodiments of a method of treating a bacterial infection, the compound of formula (I) or (II), or a pharmaceutically acceptable salt, a solvate, or a pharmaceutically acceptable salt and solvate thereof is:

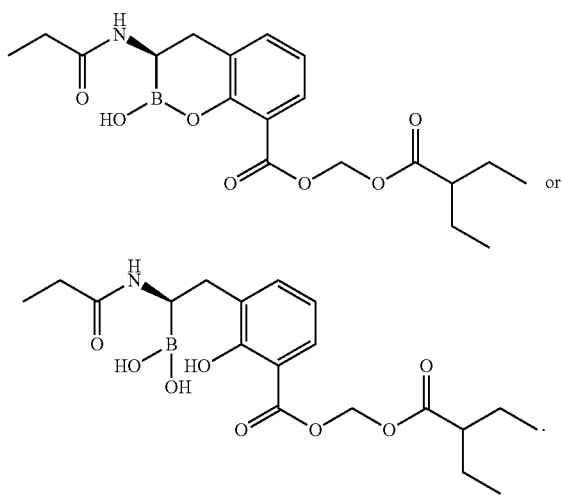

In some embodiments of a method of treating a bacterial infection, the compound of formula (I), or a pharmaceutically acceptable salt, a solvate, or a pharmaceutically acceptable salt and solvate thereof is:

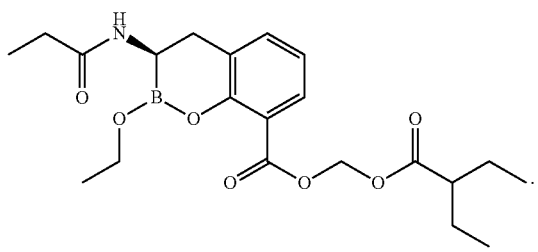 [SMILES: CCOB1Oc2c(cccc2C(=O)OCOC(=O)C(CC)CC)C[C@@H]1NC(=O)CC]

In some embodiments of a method of treating a bacterial infection, the bacterial infection is caused by carbapenem-resistant Enterobacteriaceae (CRE) or extended-spectrum beta-lactamase (ESBL) producing gram-negative bacteria. In some embodiments of a method of treating a bacterial infection, the compound of formula (I) or (II); a pharmaceutically acceptable salt, a solvate, or a pharmaceutically acceptable salt and solvate thereof, and cefpodoxime proxetil are formulated for oral administration. In some embodiments of a method of treating a bacterial infection, the compound of formula (I) or (II); a pharmaceutically acceptable salt, a solvate, or a pharmaceutically acceptable salt and solvate thereof and cefpodoxime proxetil are administered sequentially. In some embodiments of a method of treating a bacterial infection, the compound of formula (I) or (II); a pharmaceutically acceptable salt, a solvate, or a pharmaceutically acceptable salt and solvate thereof and cefpodoxime proxetil are administered concurrently.

BRIEF DESCRIPTION OF THE DRAWINGS

FIG. 5A Log CFU of Bacteria in Kidneys Following Administration of Ceftibuten, Ceftibuten/Compound 2 (1:1), and Amoxicillin/Clavulanate (2:1)—E. coli expressing CTX-M-15.

FIG. 5B Log CFU of Bacteria in Kidneys Following Administration of Ceftibuten, Ceftibuten/Compound 2 (1:1), and Amoxicillin/Clavulanate (2:1)—E. coli expressing TEM-1+CTX-M-15.

FIG. 5C Log CFU of Bacteria in Kidneys Following Administration of Ceftibuten, Ceftibuten/Compound 2 (1:1), and Amoxicillin/Clavulanate (2:1)—E. coli expressing KPC-2+SHV-12.

FIG. 6A Log CFU of Bacteria in Bladders Following Administration of Ceftibuten, Ceftibuten/Compound 2 (1:1), and Amoxicillin/Clavulanate (2:1)—E. coli expressing CTX-M-15.

FIG. 6B Log CFU of Bacteria in Bladders Following Administration of Ceftibuten, Ceftibuten/Compound 2 (1:1), and Amoxicillin/Clavulanate (2:1)—E. coli expressing TEM-1+CTX-M-15.

FIG. 6C Log CFU of Bacteria in Bladders Following Administration of Ceftibuten, Ceftibuten/Compound 2 (1:1), and Amoxicillin/Clavulanate (2:1)—E. coli expressing KPC-2+SHV-12.

FIG. 7A Log CFU of Bacteria in Urine Following Administration of Ceftibuten, Ceftibuten/Compound 2 (1:1), and Amoxicillin/Clavulanate (2:1)—E. coli expressing CTX-M-15.

FIG. 7B Log CFU of Bacteria in Urine Following Administration of Ceftibuten, Ceftibuten/Compound 2 (1:1), and Amoxicillin/Clavulanate (2:1)—E. coli expressing TEM-1+CTX-M-15.

FIG. 7C Log CFU of Bacteria in Urine Following Administration of Ceftibuten, Ceftibuten/Compound 2 (1:1), and Amoxicillin/Clavulanate (2:1)—E. coli expressing KPC-2+SHV-12.

DETAILED DESCRIPTION

Compounds

Figure 1A:
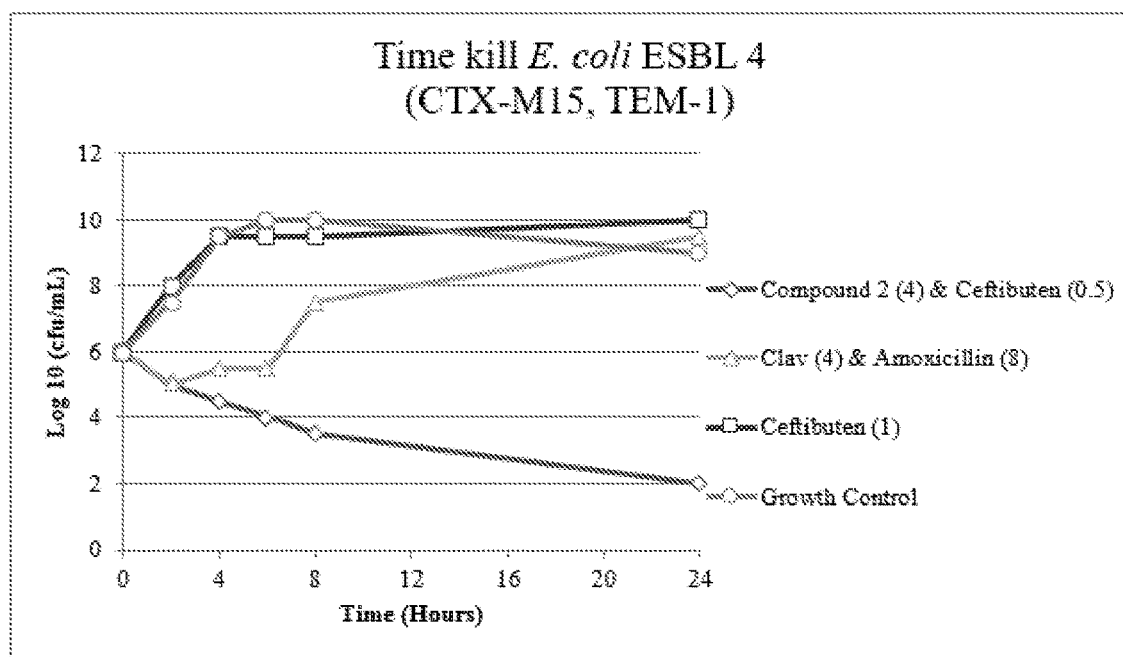
FIG. 1A shows kill curves over 24 h for ceftibuten alone or in combination with Compound 2, vs. comparators in E. coli ESBL4 (CTX-M-15, TEM-1 producing).
Figure 1B:
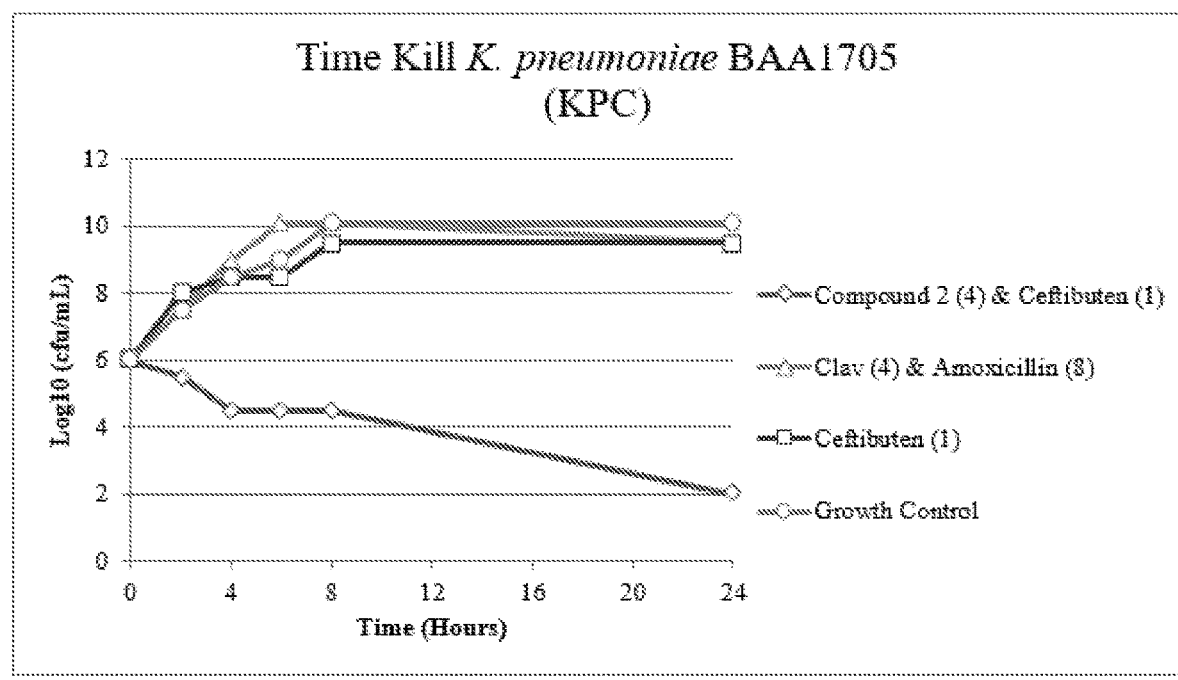
FIG. 1B shows kill curves over 24 h for ceftibuten alone or in combination with Compound 2, vs. comparators in K. pneumoniae BAA 1705 (KPC-producing).
Figure 1C:
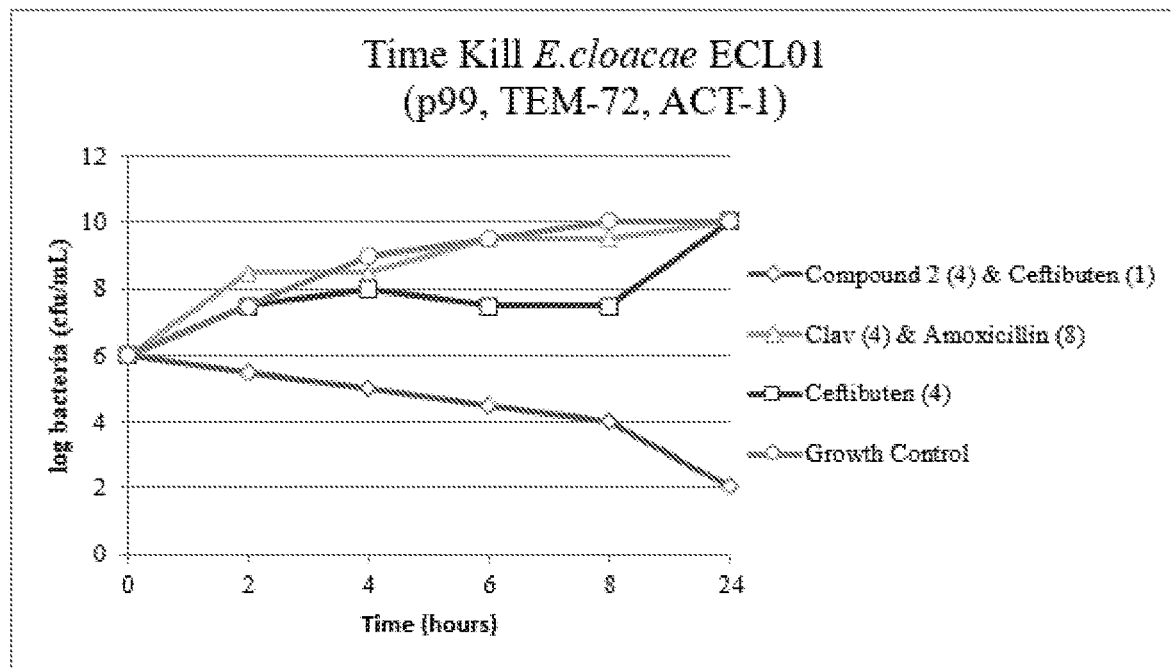
FIG. 1C shows kill curves over 24 h for ceftibuten alone or in combination with Compound 2, vs. comparators E. cloacae ECL01 (p99, TEM-1, ACT-1 producing).
Figure 1D:
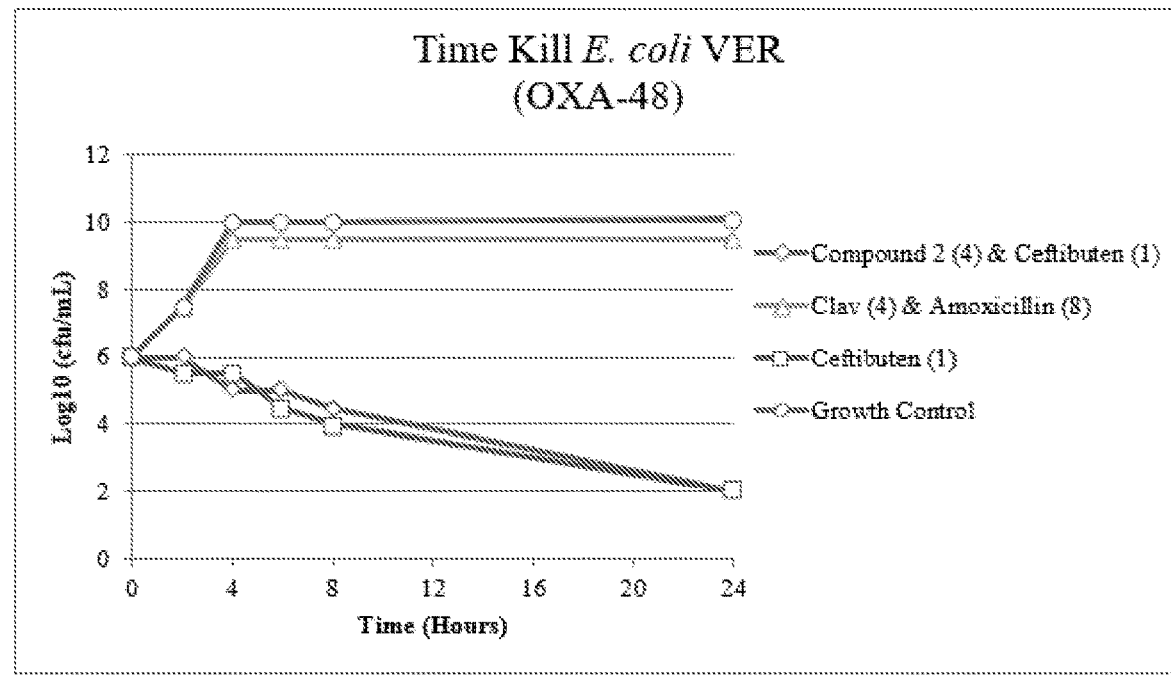
FIG. 1D shows kill curves over 24 h for ceftibuten alone or in combination with Compound 2, vs. comparators in E. coli VER (OXA-48 producing).

Disclosed herein are compounds of formula (I) or (II); a pharmaceutically acceptable salt, a solvate, or a pharmaceutically acceptable salt and solvate thereof:

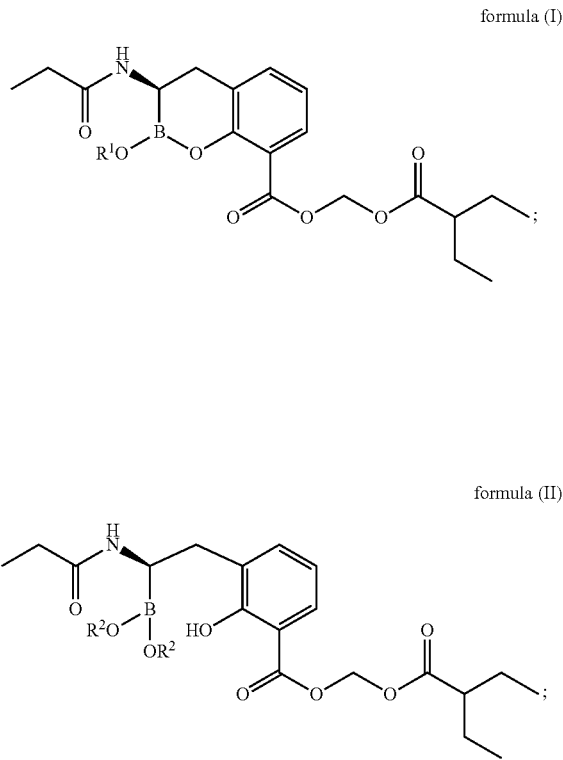

formula (I)

formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-$C_6$ alkyl, —N($C_1$-$C_6$ alkyl)$_2$, —COOH, or —COO($C_1$-$C_6$ alkyl);
or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl).

In some embodiments of a compound of formula (I), $R^1$ is hydrogen, $C_1$-$C_6$ alkyl, or —CO($C_1$-$C_6$ alkyl). In some embodiments of a compound of formula (I), $R^1$ is hydrogen or $C_1$-$C_6$ alkyl. In some embodiments of a compound of formula (I), $R^1$ is hydrogen. In some embodiments of a compound of formula (I), $R^1$ is $C_1$-$C_6$ alkyl. In some embodiments of a compound of formula (I), $R^1$ is —CO($C_1$-$C_6$ alkyl).

In some embodiments of a compound of formula (II), each $R^2$ is independently hydrogen, $C_1$-$C_6$ alkyl, or —CO($C_1$-$C_6$ alkyl). In some embodiments of a compound of formula (II), each $R^2$ is independently hydrogen or $C_1$-$C_6$ alkyl. In some embodiments of a compound of formula (II), each $R^2$ is independently hydrogen. In some embodiments of a compound of formula (II), each $R^2$ is independently $C_1$-$C_6$ alkyl. In some embodiments of a compound of formula (II), each $R^2$ is independently —CO($C_1$-$C_6$ alkyl).

In some embodiments of a compound of formula (II), two $R^2$ are taken together to form a 4- to 8-membered heterocycloalkyl optionally substituted with oxo, —OH, —COOH, or —($C_1$-$C_6$ alkylene)COOH. In some embodiments of a compound of formula (II), two $R^2$ are taken together to form a 4- to 8-membered heterocycloalkyl optionally substituted with oxo, —COOH, or —($C_1$-$C_6$ alkylene)COOH. In some embodiments of a compound of formula (II), two $R^2$ are taken together to form a 5- or 6-membered heterocycloalkyl optionally substituted with oxo, —COOH, or —($C_1$-$C_6$ alkylene)COOH. In some embodiments of a compound of formula (II), two $R^2$ are taken together to form a 4- to 8-membered heterocycloalkyl optionally substituted with oxo, —OH, $C_1$-$C_6$ alkyl, —O($C_1$-$C_6$ alkyl), —COOH, or —COO($C_1$-$C_6$ alkyl). In some embodiments of a compound of formula (II), two $R^2$ are taken together to form a 4- to 8-membered heterocycloalkyl optionally substituted with oxo, —OH, or —COOH. In some embodiments of a compound of formula (II), the 4- to 8-membered heterocycloalkyl formed when two $R^2$ are taken together contains 1 to 4 heteroatoms selected form oxygen and boron. In some embodiments of a compound of formula (II), the 5- or 6-membered heterocycloalkyl formed when two $R^2$ are taken together contains 1 to 4 heteroatoms selected form oxygen and boron.

In some embodiments of a compound of formula (II), two $R^2$ are taken together to form a moiety derived from an alpha-hydroxy carboxylic acid or a beta-hydroxy carboxylic acid. In some embodiments of a compound of formula (II), two $R^2$ are taken together to form a moiety derived from an alpha-hydroxy carboxylic acid. In some embodiments of a compound of formula (II), two $R^2$ are taken together to form a moiety derived from a beta-hydroxy carboxylic acid.

Compound 1

((2-Ethylbutanoyl)oxy)methyl (R)-2-hydroxy-3-propionamido-3,4-dihydro-2H-benzo[e][1,2]oxaborinine-8-carboxylate is as shown in the structure below:

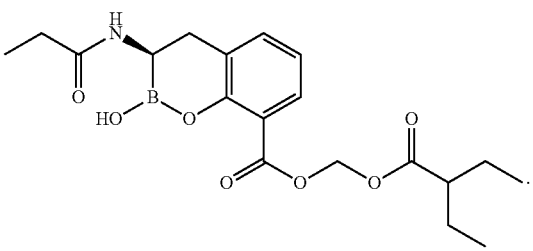 [SMILES: CCC(=O)N[C@H]1Cc2cccc(C(=O)OCOC(=O)C(CC)CC)c2OB1O]

In some embodiments, ((2-ethylbutanoyl)oxy)methyl (R)-2-hydroxy-3-propionamido-3,4-dihydro-2H-benzo[e][1,2]oxaborinine-8-carboxylate is also referred to as Compound 1. In some embodiments, Compound 1 exists in equilibrium as shown below:

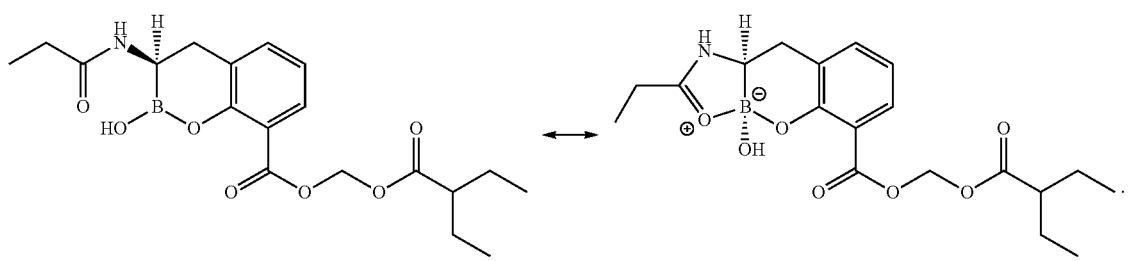 [SMILES: CCC(=O)N[C@H]1Cc2cccc(C(=O)OCOC(=O)C(CC)CC)c2OB1O ; CCC1=[O+][B@-]2(O)Oc3c(cccc3C(=O)OCOC(=O)C(CC)CC)C[C@@H]2N1 ; "."]

In some embodiments, Compound 1 exists in an equilibrium between the "closed" cyclic form (as shown above) and the "open" acyclic form:

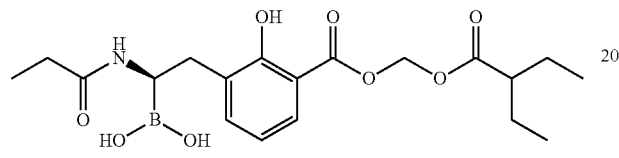

((R)-(2-(3-((((2-ethylbutanoyl)oxy)methoxy)carbonyl)-2-hydroxyphenyl)-1-propionamidoethyl)boronic acid) which exists in an equilibrium with

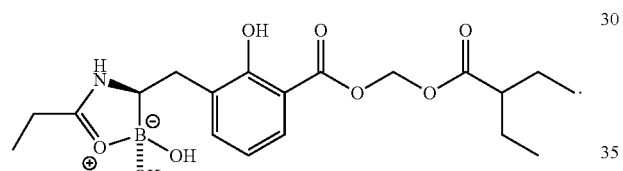

In some embodiments, Compound 1 associates into intramolecular dimers, trimers, and any combinations thereof. In some embodiments, Compound 1 is in the form of a pharmaceutically acceptable salt. In some embodiments, Compound 1 is in the form of a pharmaceutically acceptable solvate. In general, the solvated forms are considered equivalent to the unsolvated forms for the purposes of the compounds and methods provided herein. In some embodiments, Compound 1 is in the form of a pharmaceutically acceptable salt and solvate. In some embodiments, Compound 1 is converted in vivo to release Compound 2.

Compound 1-ethanolate

In some embodiments, Compound 1 exists in solid form as a covalently bound solvate. In some embodiments, Compound 1 exists in solid form as a covalently bound ethanolate. In some embodiments, Compound 1 in solid form is:

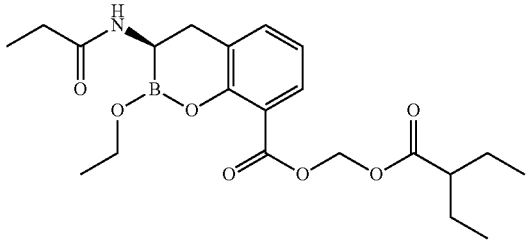 [SMILES: CCOB1Oc2c(cccc2C(=O)OCOC(=O)C(CC)CC)C[C@@H]1NC(=O)CC]

((2-ethylbutanoyl)oxy)methyl (R)-2-ethoxy-3-propionamido-3,4-dihydro-2H-benzo[e][1,2]oxaborinine-8-carboxylate. In some embodiments, Compound 1-ethanolate exists in equilibrium as shown below:

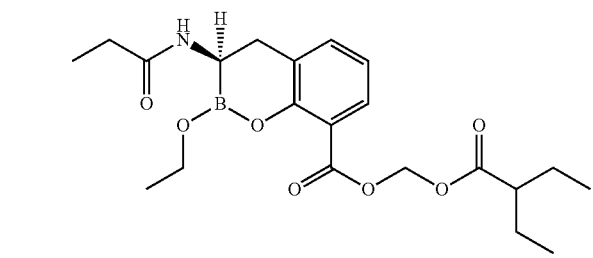

In some embodiments, the Compound 1-ethanolate converts to Compound 1 in contact with water:

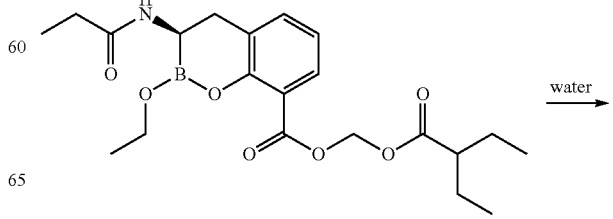

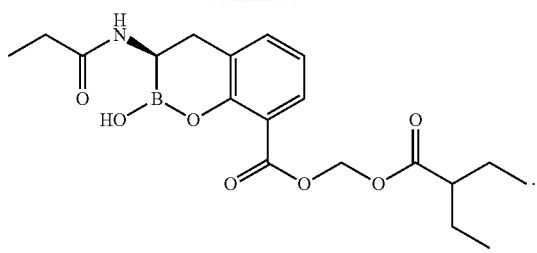

Compound 2

(R)-2-hydroxy-3-propionamido-3,4-dihydro-2H-benzo[e][1,2]oxaborinine-8-carboxylic acid is as shown in the structure below:

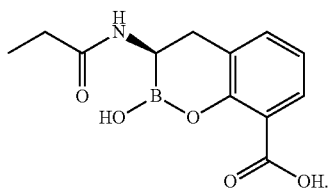 [SMILES: CCC(=O)N[C@H]1Cc2cccc(C(=O)O)c2OB1O]

In some embodiments, (R)-2-hydroxy-3-propionamido-3,4-dihydro-2H-benzo[e][1,2]oxaborinine-8-carboxylic acid is also referred to as Compound 2. In some embodiments, Compound 2 exists in an equilibrium between the "closed" cyclic form (as shown above) and the "open" acyclic form:

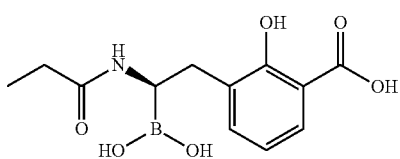 [SMILES: CCC(=O)N[C@@H](Cc1cccc(C(=O)O)c1O)B(O)O]

((R)-3-(2-borono-2-propionamidoethyl)-2-hydroxybenzoic acid). In some embodiments, Compound 2 associates into intramolecular dimers, trimers, and any combinations thereof.

Pharmaceutical Compositions

Disclosed herein are pharmaceutical compositions comprising:
(i) a compound of formula (I) or (II); a pharmaceutically acceptable salt, a solvate, or a pharmaceutically acceptable salt and solvate thereof:

formula (I)

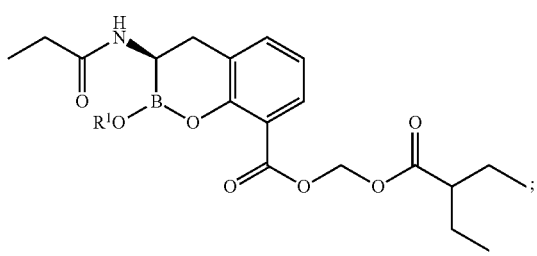

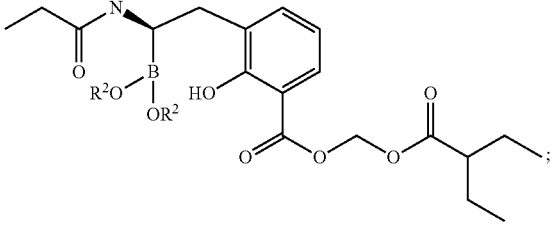

formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —NH$C_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —NH$C_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) ceftibuten, cefexime, cefditoren pivoxil, cefpodoxime proxetil, amoxicillin, cefaclor, cephalexin, cefdinir, or cefuroxime.

Disclosed herein is a pharmaceutical composition comprising:
(i) a compound of formula (I) or (II); a pharmaceutically acceptable salt, a solvate, or a pharmaceutically acceptable salt and solvate thereof:

formula (I)

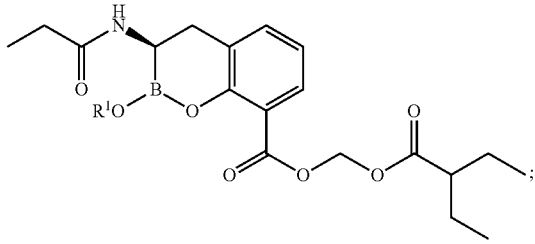

formula (II)

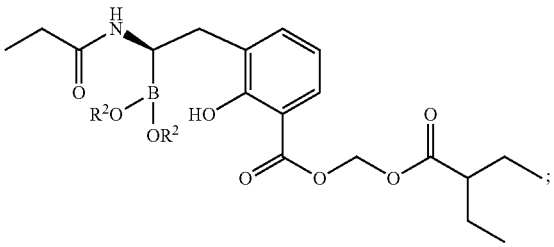

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —NH$C_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —NHC$_1$-C$_6$ alkyl, —N(C$_1$-C$_6$ alkyl)$_2$, —COOH, —COO(C$_1$-C$_6$ alkyl), —(C$_1$-C$_6$ alkylene)COOH, or —(C$_1$-C$_6$ alkylene)COO(C$_1$-C$_6$ alkyl); and (ii) ceftibuten.

Disclosed herein is a pharmaceutical composition comprising:

(i) a compound of formula (I) or (II); a pharmaceutically acceptable salt, a solvate, or a pharmaceutically acceptable salt and solvate thereof:

formula (I)

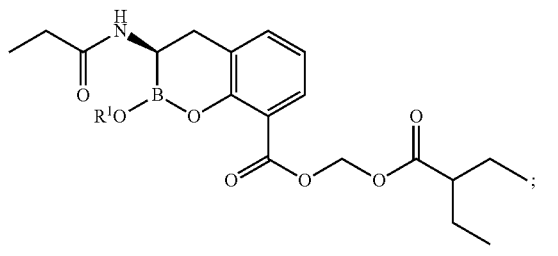

formula (II)

wherein:
each R$^1$ and R$^2$ is independently hydrogen, C$_1$-C$_6$ alkyl, or —CO(C$_1$-C$_6$ alkyl); each alkyl being optionally substituted with halogen, —OH, —O(C$_1$-C$_6$ alkyl), —NH$_2$, —NHC$_1$-C$_6$ alkyl, —N(C$_1$-C$_6$ alkyl)$_2$, —COOH, or —COO(C$_1$-C$_6$ alkyl);

or two R$^2$ are taken together to form a 4- to 8-membered heterocycloalkyl optionally substituted with oxo, halogen, —OH, C$_1$-C$_6$ alkyl, —O(C$_1$-C$_6$ alkyl), —NH$_2$, —NHC$_1$-C$_6$ alkyl, —N(C$_1$-C$_6$ alkyl)$_2$, —COOH, —COO(C$_1$-C$_6$ alkyl), —(C$_1$-C$_6$ alkylene)COOH, or —(C$_1$-C$_6$ alkylene)COO(C$_1$-C$_6$ alkyl); and (ii) cefixime.

Disclosed herein is a pharmaceutical composition comprising:

(i) a compound of formula (I) or (II); a pharmaceutically acceptable salt, a solvate, or a pharmaceutically acceptable salt and solvate thereof:

formula (I)

formula (II)

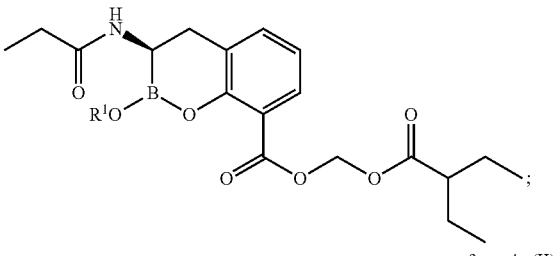

wherein:
each R$^1$ and R$^2$ is independently hydrogen, C$_1$-C$_6$ alkyl, or —CO(C$_1$-C$_6$ alkyl); each alkyl being optionally substituted with halogen, —OH, —O(C$_1$-C$_6$ alkyl), —NH$_2$, —NHC$_1$-C$_6$ alkyl, —N(C$_1$-C$_6$ alkyl)$_2$, —COOH, or —COO(C$_1$-C$_6$ alkyl);

or two R$^2$ are taken together to form a 4- to 8-membered heterocycloalkyl optionally substituted with oxo, halogen, —OH, C$_1$-C$_6$ alkyl, —O(C$_1$-C$_6$ alkyl), —NH$_2$, —NHC$_1$-C$_6$ alkyl, —N(C$_1$-C$_6$ alkyl)$_2$, —COOH, —COO(C$_1$-C$_6$ alkyl), —(C$_1$-C$_6$ alkylene)COOH, or —(C$_1$-C$_6$ alkylene)COO(C$_1$-C$_6$ alkyl); and (ii) cefpodoxime proxetil.

Disclosed herein is a pharmaceutical composition comprising:

(i) a compound of formula (I) or (II); a pharmaceutically acceptable salt, a solvate, or a pharmaceutically acceptable salt and solvate thereof:

formula (I)

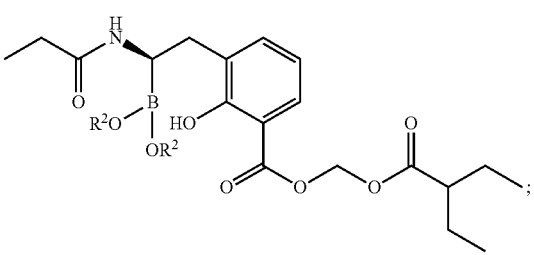

formula (II)

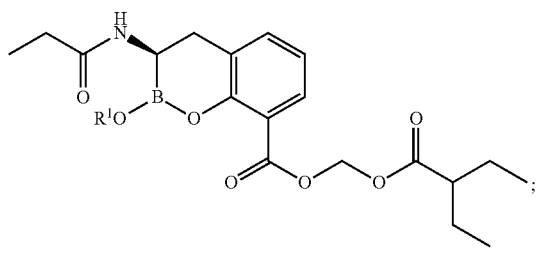

wherein:
each R$^1$ and R$^2$ is independently hydrogen, C$_1$-C$_6$ alkyl, or —CO(C$_1$-C$_6$ alkyl); each alkyl being optionally substituted with halogen, —OH, —O(C$_1$-C$_6$ alkyl), —NH$_2$, —NHC$_1$-C$_6$ alkyl, —N(C$_1$-C$_6$ alkyl)$_2$, —COOH, or —COO(C$_1$-C$_6$ alkyl);

or two R$^2$ are taken together to form a 4- to 8-membered heterocycloalkyl optionally substituted with oxo, halogen, —OH, C$_1$-C$_6$ alkyl, —O(C$_1$-C$_6$ alkyl), —NH$_2$, —NHC$_1$-C$_6$ alkyl, —N(C$_1$-C$_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) cefditoren pivoxil.

In some embodiments, the compound of formula (I) or (II); a pharmaceutically acceptable salt, a solvate, or a pharmaceutically acceptable salt and solvate thereof is:

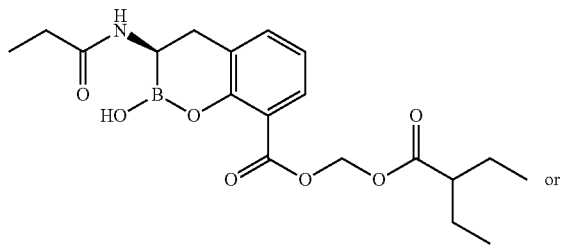

or

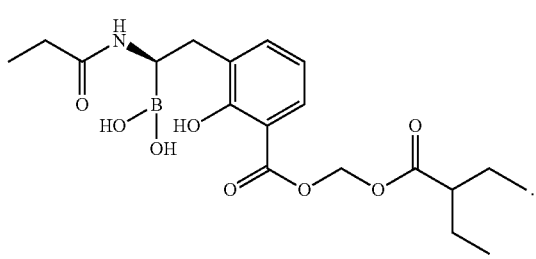

.

In some embodiments, the compound of formula (I); a pharmaceutically acceptable salt, a solvate, or a pharmaceutically acceptable salt and solvate thereof is:

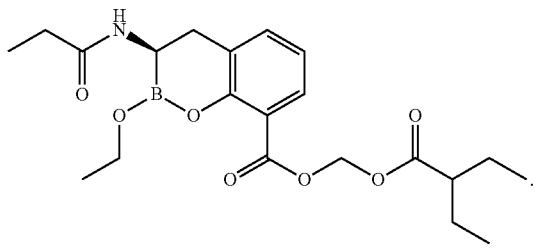 [SMILES: CCOB1Oc2c(cccc2C(=O)OCOC(=O)C(CC)CC)C[C@@H]1NC(=O)CC]

.

Disclosed herein is a pharmaceutical composition comprising:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof:

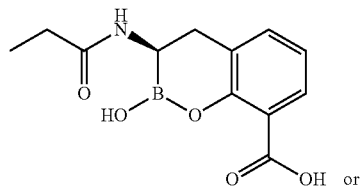

or

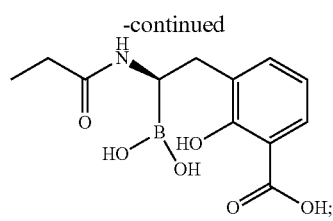

(ii) ceftibuten.

Disclosed herein is a pharmaceutical composition comprising:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof:

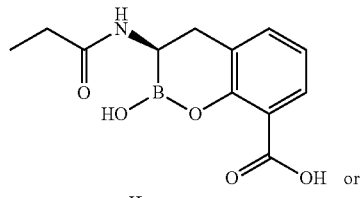

or

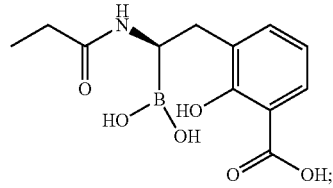

and
(ii) cefixime.

Disclosed herein is a pharmaceutical composition comprising:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof:

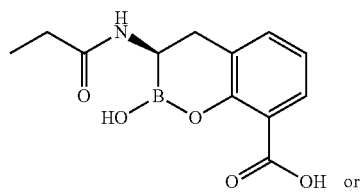

or

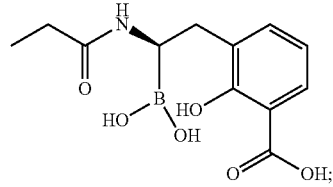

and
(ii) cefpodoxime proxetil.

Disclosed herein is a pharmaceutical composition comprising:
(i) (R)-2-hydroxy-3-propionamido-3,4-dihydro-2H-benzo[e][1,2]oxaborinine-8-carboxylic acid or (R)-3-

(2-borono-2-propionamidoethyl)-2-hydroxybenzoic acid, or a pharmaceutically acceptable salt, a solvate, or a pharmaceutically acceptable salt and solvate thereof:

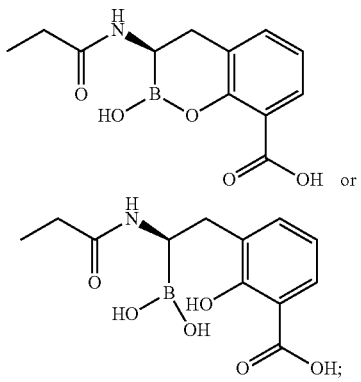

and (ii) cefditoren pivoxil.

In some embodiments, the compositions described herein are administered via any of the accepted modes of administration for agents that serve similar utilities including, but not limited to, orally, subcutaneously, intravenously, intranasally, topically, transdermally, intraperitoneally, intramuscularly, intrapulmonarilly, vaginally, rectally, or intraocularly. In some embodiments, the administration is oral administration. In some embodiments, the administration is intravenous administration. In some embodiments, the administration is intramuscular administration.

A summary of pharmaceutical compositions described herein can be found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Lieberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins1999), herein incorporated by reference for such disclosure.

In some embodiments, the pharmaceutical composition comprises a pharmaceutically acceptable excipient. The term "pharmaceutically acceptable excipient", as used herein, means one or more compatible solid or encapsulating substances, which are suitable for administration to a mammal. The term "compatible", as used herein, means that the components of the composition are capable of being commingled with the subject compound, and with each other, in a manner such that there is no interaction, which would substantially reduce the pharmaceutical efficacy of the composition under ordinary use situations. In some embodiments, the pharmaceutically acceptable excipient is of sufficiently high purity and sufficiently low toxicity to render them suitable for administration preferably to an animal, preferably mammal, being treated.

The pharmaceutical compositions described herein include, but are not limited to, dispersions, solutions, liquids, gels, syrups, elixirs, slurries, suspensions, self-emulsifying dispersions, Self-Emulsifying Drug Delivery System (SEDDS), liposomal dispersions, powders for reconstitution, powders, delayed release formulations, extended release formulations, pulsatile release formulations, immediate release formulations, controlled release formulations, fast melt formulations, tablets, capsules, pills, dragees, and effervescent formulations. In some embodiments, the pharmaceutical composition is formulated as a capsule. In some embodiments, the pharmaceutical composition is formulated as a tablet. In some embodiments, the pharmaceutical composition is formulated as liquid for injection.

Self-Emulsifying Drug Delivery System

Self-emulsifying drug delivery systems (SEDDS) are isotropic mixtures of oil (or lipid), surfactant (with or without co-surfactant) and optionally a co-solvent which spontaneously emulsify when exposed to an aqueous medium with gentle agitation. SEDDS have most commonly been studied to improve bioavailability of poorly water soluble drugs via oral administration.

Microemulsions arising from SMEDDS (self-microemulsifying drug delivery system) are thermodynamically stable while regular emulsions are kinetically stable. According to the lipid formulation classification system (LFCS), SMEDDS are characterized by a higher content of water-soluble components. These systems can achieve smaller-sized droplet dispersions and optical clarity, which is a desirable characteristic for improving currently existing ophthalmic emulsion formulations. SNEDDS (self-nanoemulsifying drug delivery system) and their resultant nanoemulsions share many of the advantageous characteristics of SMEDDS and microemulsions, but with the limitation of being only kinetically stable dispersions.

In some embodiments, the formulation does not comprise an oil. In some embodiments, the formulation comprises water-soluble surfactants and cosolvents. In some embodiments, the formulation is classified as a Type IV system by C. Pouton in *European Journal of Pharmaceutical Sciences*, 29 (2006), pp 278-287. (see table below).

The lipid formulation classification system:

| Formulation type | Material | Characteristics | Advantages |
|---|---|---|---|
| Type I | Oils without surfactants (e.g., tri-, di-, and monoglycerides) | Nondispersing requires digestion | Generally recognized as safe (GRAS) status; simple; and excellent capsule compatibility |
| Type II | Oils and water insoluble surfactants | SEDDS formed without water-soluble components | Unlikely to lose solvent capacity on dispersion |
| Type III | Oils, surfactants, and cosolvents (both water-insoluble and water-soluble excipients) | SEDDS/SMEDDS formed with water-soluble components | Clear or almost clear dispersion, drug absorption without digestion |
| Type IV | Water-soluble surfactants and cosolvents | Formulation disperses typically to form a micellar solution | Formulation has good solvent capacity for many drugs |

In some embodiments, the pharmaceutical composition is formulated as an emulsion. In some embodiments, the pharmaceutical composition is formulated as a microemulsion.

Hydrophilic Solubilizer

In some embodiments, the pharmaceutical composition comprises a hydrophilic solubilizer. In some embodiments, a suitable hydrophilic solubilizer is a hydrophilic polymer that include a variety of pharmaceutically acceptable hydrophilic agents that participate in the formation of the microemulsion, permit the accomplishment of the high levels of solubilized active ingredient, and are chemically compatible with the capsular material of the dosage form. In some embodiments, the hydrophilic solubilizer hydrophilic polymer.

In general, suitable hydrophilic polymers (i.e., two or more repeating monomer units) include, but are not limited to, pharmaceutically acceptable and water soluble polymers such as polyethylene glycols, methoxypolyethylene glycols, polyvinyl alcohols, polyvinyl pyrrolidones, and the like. The hydrophilic polymer can also include combinations or mixtures of pharmaceutically acceptable and water soluble polymers as well.

As used herein, "polyethylene glycol" or "PEG" means a liquid or solid polymer of the general formula $H(OCH_2CH_2)_nOH$, wherein n is at least 4. In certain embodiments, the hydrophilic polymer is a polyethylene glycol or a mixture of polyethylene glycols. Polyethylene glycols that can be used can include a wide range of molecular weights. In general, suitable polyethylene glycols that can be used with the invention include those from about PEG 400 to about PEG 8000, preferably PEG 400 to about PEG 1500, most preferably PEG 1000. Polyethylene glycols that can be used include, but are not limited to, PEG-400, PEG-600, PEG-1000, PEG-1450, PEG-1500, PEG-3350, or PEG-4600.

In some embodiments, the pharmaceutical composition includes one PEG or, alternatively, a mixture of two or more of the aforementioned polyethylene glycols. Representative mixtures include PEG-400/PEG-1000, PEG-400/PEG-1450, PEG-600/PEG-1000, PEG-600/PEG-1450.

The amount of hydrophilic polymer, e.g., polyethylene glycol to be used in the composition can vary provided a microemulsion is formed. In general, the amount of hydrophilic polymer is present in an amount from about 10% to about 95% per total composition.

Surfactants

In some embodiments, the pharmaceutical composition includes at least one surfactant. The use of a surfactant provides benefits in regard to dissolution or delivery stability. Suitable surfactants include, but are not limited to, nonionic, anionic and cationic surfactants, and combinations thereof.

Examples of suitable anionic surfactants that can be used, include, but are not limited to, sodium laurylsulfate or sodium dodecylsulfate. Examples of suitable cationic surfactants that can be used include, but are not limited to, cetyl trimethyl ammonium bromide (C-TAB). Examples of non-ionic surfactants that can be used include, but are not limited to, polyoxyethylene stearates, such as polyoxyl 40 stearate (e.g., MYRJ® 52).

In addition to the above suitable surfactants for use in pharmaceutical composition include, but are not limited to, polyoxyethylene stearates, polyoxyethylene castor oil, polyoxyethylene sorbitan fatty acid esters (sorbitans), saturated polyglycolized glycerides, fatty acid esters of polyethylene glycol, hydroxylated lecithins, medium chain monoglycerides, medium chain fatty acid esters, polyethylene/propylene glycol copolymers, polyethylene glycol stearate, d-α-tocopheryl polyethylene glycol succinate, poloxyl stearate (e.g., Myrj® 52) and poloxyl castor oil. Polyoxyethylene sorbitan fatty acid esters (polysorbates) are non-ionic surfactants (detergents) that may consist of a mixture of fatty acids. Commercially available examples are Tween® 20 (polyoxyethylene (20) sorbitan monolaurate), Tween® 40 (polyoxyethylene (20) sorbitan monopalmitate), and Tween® 80 (polyoxyethylene (20) sorbitan monooleate).

Examples of other useful surfactants are saturated polyglycolized glycerides consisting of mono-, di-, or triglycerides; di-fatty acid esters of polyethylene glycol, e.g., Gelucire® 44/14; hydroxylated lecithins, e.g., Centrolene® A; medium chain monoglycerides, e.g., glyceryl monocaprylate (Imwitor® 308, Capmul® MCM C-8); caprylic/capric glycerides (Imwitor® 742); medium chain monoglycerides and diglycerides, e.g., glyceryl caprylate/caprate (Capmul® MCM); polyethylene/propylene glycol copolymers; block copolymers of ethylene oxide and propylene oxide (e.g., Poloxamer 188, Pluronic® F-68); ethoxylated castor oil (e.g., Cremophor® EL); and ethoxylated hydroxystearic acid (e.g., Solutol® HS 15). Some surfactants are solid or semisolid at room temperature, e.g., Poloxamer 188, glyceryl monocaprylate, Gelucire® 44/14, and any combinations thereof. In some embodiments, the surfactant is macroglycerol ricinoleate (Kolliphor EL® or Cremophor EL®), caprylocaproyl polyoxyl-8 glyceride (Labrasol®), polyoxyethylene hydrogenated castor oil 60 (HCO-60), polysorbate 80 (Tween®-80), polyoxyethylene sorbitan trioleate (Tween®-85), polyoxyethyelene glyceryl trioleate (tagot-TO), or any combinations thereof. Additional surfactants are those found in The Handbook of Pharmaceutical Excipients, 2nd Ed., published by The Pharmaceutical Press, London and American Pharmaceutical Association (1994), a common text in the field, which is hereby incorporated by reference in its entirety.

In certain embodiments, the surfactant is a polyoxyl stearate. In a further embodiment, the polyoxyl stearate is polyoxyl 40 stearate (MYRJ® 52).

In some embodiments, the formulation comprises an emulsifier.

Exemplary Emulsifiers Used in Lipid-Based Formulations:

| Common name/type | Examples |
|---|---|
| Low HLB (<10) emulsifier | |
| Phosphatidylcholine and phosphatidylcholine/ solvent mixtures | Phosphatidylcholine, phosphatidylcholine in propylene glycol, phosphatidylcholine in medium chain triglycerides, and phosphatidylcholine in safflower oil/ethanol |
| Unsaturated polyglycolized glycerides | Oleoyl macrogolglycerides, linoleoyl macrogolglycerides |
| Sorbitan esters | Sorbitan monooleate, sorbitan monostearate, sorbitan monolaurate, and sorbitan monopalmitate |
| High HLB (>10) emulsifier | |
| Polyoxyethylene sorbitan esters | Polysorbate 20, polysorbate 40, polysorbate 60, and polysorbate 80 |
| Polyoxyl castor oil derivatives | Polyoxyl 35 castor oil, polyoxyl 40 hydrogenated castor oil |
| Polyoxyethylene polyoxypropylene block copolymer | Poloxamer 188, poloxamer 407 |
| Saturated polyglycolized glycerides | Lauroyl macrogolglycerides, stearoyl macrogolglycerides |
| PEG-8 caprylic/capric glycerides | Caprylocaproyl macrogolglycerides |
| Vitamin E derivative | Tocopherol PEG succinate |

The amount of surfactant used in the pharmaceutical composition, when present, varies provided the amount is sufficient to participate in the formation and/or stabilization of the microemulsion. In general, the amount of surfactant if used is present in an amount from about 0.1% to about 60%—depending upon the particular surfactant employed. In some embodiments, the surfactant is present in an amount from about 0.1% to about 50%. In some embodiments, the surfactant is present in an amount from about 10% to about 60%. In some embodiments, the surfactant is present in an amount from about 20% to about 60%. In some embodiments, the surfactant is present in an amount from about 30% to about 60%. In some embodiments, the surfactant is present in an amount from about 4000 to about 60%.

Lipid

In some embodiments, the pharmaceutical composition includes a lipid. In some embodiments, the lipid is a long- or medium-chain triglyceride oils with different degrees of saturation. In some embodiments, the lipid is a monoglyceride. In some embodiments, the lipid is a diglyceride. In some embodiments, the lipid is propylene glycol monocaprylate (Capryol®), caprylic acid, capric acid, lauric acid, myristic acid, palmitic acid, stearic acid, oleic acid, ethyl oleate, soybean oil, glyceryl caprylate/caprate (Campul®) glyceryl behenate (Compritol® 888 ATO), glyceryl palmitostearate (Precirol® ATO 5), glyceryl monostearate (Geleol™), glyceryl monolinoleate (Maisine™ 35-1), glyceryl monooleate, (Peceol™), medium-chain triglycerides (Labrafac™ Lipophile WL1349), propylene glycol monolaurate (Lauroglycol™ 90), oleoyl macrogol-6 glycerides (Labrafil® M1944CS), polyglyceryl-3 dioleate (Plurol Oleique® CC 497), diethylene glycol monoethyl ether (Transcutol® HP), or any combinations thereof.

The amount of lipid used in the pharmaceutical composition, when present, varies provided the amount is sufficient to participate in the formation and/or stabilization of the microemulsion. In general, the amount of lipid if used is present in an amount from about 0.1% to about 50%- depending upon the particular lipid employed.

Solvents

In some embodiments, the pharmaceutical composition includes a solvent and/or a co-solvent. In some embodiments, the solvent/co-solvent is an alcohol (such as ethanol, benzyl alcohol, alkane diols and triols, glycol ethers, propylene glycol (PG), glycerol, tetraglycol, or polyethylene glycols), pyrrolidine derivatives, 2-pyrrolidone, iriacetin, or any combination thereof.

Tablets

Pharmaceutical preparations for oral use are obtained by mixing one or more solid excipient with one or more of the compounds described herein, optionally grinding the resulting mixture, and processing the mixture of granules, after adding suitable auxiliaries, if desired, to obtain tablets or dragee cores. Suitable excipients include, for example, fillers such as sugars, including lactose, sucrose, mannitol, or sorbitol; cellulose preparations such as, for example, maize starch, wheat starch, rice starch, potato starch, gelatin, gum tragacanth, methylcellulose, microcrystalline cellulose, hydroxypropylmethylcellulose, sodium carboxymethylcellulose; or others such as: polyvinylpyrrolidone (PVP or povidone) or calcium phosphate. If desired, disintegrating agents are added, such as the cross-linked croscarmellose sodium, polyvinylpyrrolidone, agar, or alginic acid or a salt thereof such as sodium alginate. In some embodiments, dyestuffs or pigments are added to the tablets or dragee coatings for identification or to characterize different combinations of active compound doses.

Capsule

Pharmaceutical preparations that are administered orally include push-fit capsules made of gelatin, as well as soft, sealed capsules made of gelatin and a plasticizer, such as glycerol or sorbitol. The push-fit capsules contain the active ingredients in admixture with filler such as lactose, binders such as starches, and/or lubricants such as talc or magnesium stearate and, optionally, stabilizers. In soft capsules, the active compounds are dissolved or suspended in suitable liquids, such as fatty oils, liquid paraffin, or liquid polyethylene glycols. In some embodiments, stabilizers are added.

In some embodiments, the pharmaceutical composition is encapsulated. In some embodiments, the pharmaceutical composition is encapsulated into discrete units. In some embodiments, the pharmaceutical composition is enclosed in a capsule. In some embodiments, the capsule is formed using materials which include, but are not limited to, natural or synthetic gelatin, pectin, casein, collagen, protein, modified starch, polyvinylpyrrolidone, acrylic polymers, cellulose derivatives, or combinations thereof. In some embodiments, the capsule is coated. In some embodiments, the coating covering the capsule includes, but is not limited to, immediate release coatings, protective coatings, enteric or delayed release coatings, sustained release coatings, barrier coatings, seal coatings, or combinations thereof. In some embodiments, a capsule herein is hard or soft. In some embodiments, the capsule is seamless. In some embodiments, the shape and size of the capsule also vary. Examples of capsule shapes include, but are not limited to, round, oval, tubular, oblong, twist off, or a non-standard shape. The size of the capsule may vary according to the volume of the lipid-based formulation. In some embodiments, the size of the capsule is adjusted based on the volume of the lipid-based formulation. Hard or soft gelatin capsules may be manufactured in accordance with conventional methods as a single body unit comprising the standard capsule shape. A single-body soft gelatin capsule typically may be provided, for example, in sizes from 3 to 22 minims (1 minims being equal to 0.0616 ml) and in shapes of oval, oblong or others. The gelatin capsule may also be manufactured in accordance with conventional methods, for example, as a two-piece hard gelatin capsule, sealed or unsealed, typically in standard shape and various standard sizes, conventionally designated as (000), (00), (0), (1), (2), (3), (4), and (5). The largest number corresponds to the smallest size.

Powder for Reconstitution

In some embodiments, the pharmaceutical composition for oral administration is formulated as a powder for reconstitution. In some embodiments, the powder for reconstitution is reconstituted with a liquid carrier to form a liquid formulation suitable for oral administration. In some embodiments, the powder for reconstitution is reconstituted with a liquid carrier to form a suspension.

Liquid carrier suitable for the powder formulations to be reconstituted into an oral formulation described herein are selected for a particular oral liquid formulation (solution, suspension, etc.) as well as other qualities such as clarity, toxicity, viscosity, compatibility with excipients, chemical inertness, palatability, odor, color and economy. Exemplary liquid carrier include water, ethyl alcohol, glycerin, propylene glycol, syrup (sugar or other sweetener based, e.g., Ora-Sweet® SF sugar-free flavored syrup), juices (apple, grape, orange, cranberry, cherry, tomato and the like), other beverages (tea, coffee, soft drinks, milk and the like), oils (olive, soybean, corn, mineral, castor and the like), and combinations or mixtures thereof. Certain liquid vehicles, e.g., oil and water, can be combined together to form emulsions. In some embodiments, water is used for as a liquid carrier.

Buffering agents maintain the pH of the liquid formulation. Non-limiting examples of buffering agents include, but are not limited to sodium bicarbonate, potassium bicarbonate, magnesium hydroxide, magnesium lactate, magnesium gluconate, aluminum hydroxide, aluminum hydroxide/sodium bicarbonate co precipitate, mixture of an amino acid and a buffer, a mixture of aluminum glycinate and a buffer, a mixture of an acid salt of an amino acid and a buffer, and a mixture of an alkali salt of an amino acid and a buffer. Additional buffering agents include citric acid, sodium citrate, sodium tartarate, sodium acetate, sodium carbonate, sodium polyphosphate, potassium polyphosphate, sodium pyrophosphate, potassium pyrophosphate, disodium hydrogenphosphate, dipotassium hydrogenphosphate, trisodium phosphate, tripotassium phosphate, sodium acetate, potassium metaphosphate, magnesium oxide, magnesium hydroxide, magnesium carbonate, magnesium silicate, calcium acetate, calcium glycerophosphate, calcium chloride, calcium hydroxide, calcium lactate, calcium carbonate, calcium bicarbonate, and other calcium salts. Some buffering agents also impart effervescent qualities when a powder is reconstituted in a solution.

In further embodiments, the powder for reconstitution described herein comprises additional excipients including, but not limited to, glidants, flavoring agents, coloring agents and thickeners. Additional excipients such as bulking agents, tonicity agents and chelating agents are within the scope of the embodiments.

Glidants are substances that improve flowability of a powder. Suitable glidants include, but are not limited to, calcium phosphate tribasic, calcium silicate, cellulose (powdered), colloidal silicon dioxide, magnesium silicate, magnesium trisilicate, silicon dioxide, starch, talc and the like.

In another embodiment, the powder for reconstitution described herein comprises a flavoring agent or flavorant to enhance the taste or aroma of the formulation in liquid form. Suitable natural or synthetic flavoring agents can be selected from standard reference books, for example Fenaroli's Handbook of Flavor Ingredients, 3rd edition (1995). Non-limiting examples of suitable natural flavors, some of which can readily be simulated with synthetic agents or combinations thereof, include almond, anise, apple, apricot, bergamot, blackberry, blackcurrant, blueberry, cacao, caramel, cherry, cinnamon, clove, coffee, coriander, cranberry, cumin, dill, eucalyptus, fennel, fig, ginger, grape, grapefruit, guava, hop, lemon, licorice, lime, malt, mandarin, molasses, nutmeg, mixed berry, orange, peach, pear, peppermint, pineapple, raspberry, rose, spearmint, strawberry, tangerine, tea, vanilla, wintergreen, etc.

In further embodiments, the powder for reconstitution described herein comprises a coloring agent for identity and/or aesthetic purposes. Suitable coloring agents illustratively include FD&C Red No. 3, FD&C Red No. 20, FD&C Red No. 40, FD&C Yellow No. 6, FD&C Blue No. 2, D&C Green No. 5, D&C Orange No. 5, caramel, ferric oxide and mixtures thereof.

In further embodiments, the powder for reconstitution described herein comprises a thickener. Thickeners impart viscosity or weight to the resultant liquid forms from the formulation described herein. Exemplary thickeners include dextrin, cellulose derivatives (ethylcellulose, hydroxyethyl cellulose, methylcellulose, hypromellose, and the like) starches, pectin, polyethylene glycol, polyethylene oxide, trehalose and certain gums (xanthan gum, locust bean gum, etc.).

In certain embodiments, delivery systems for pharmaceutical compounds may be employed, such as, for example, liposomes and emulsions. In certain embodiments, compositions provided herein can also include an mucoadhesive polymer, selected from among, for example, carboxymethylcellulose, carbomer (acrylic acid polymer), poly(methylmethacrylate), polyacrylamide, polycarbophil, acrylic acid/butyl acrylate copolymer, sodium alginate and dextran.

In some embodiments, the pharmaceutical composition comprises dibasic calcium phosphate, hypromellose, lactose monohydrate, magnesium stearate, microcrystalline cellulose, polyethylene glycol, pregelatinized starch, titanium dioxide, and triacetin.

In some embodiments, the pharmaceutical composition comprises colloidal silicon dioxide, crospovidone, low substituted hydroxy propyl cellulose, magnesium stearate and mannitol. The capsule shell contains the following inactive ingredients: ferric oxide black, ferric oxide red, gelatin, potassium hydroxide, propylene glycol, shellac, sodium lauryl sulfate, and titanium dioxide.

In some embodiments, the pharmaceutical composition comprises magnesium stearate, microcrystalline cellulose, and sodium starch glycolate inside a capsule. In some embodiments, the capsule shell contains gelatin, sodium lauryl sulfate, titanium dioxide, and polysorbate 80. In some embodiments, the capsule shell contains benzyl alcohol, sodium propionate, edetate calcium disodium, butylparaben, propylparaben, and methylparaben.

In some embodiments, the pharmaceutical composition comprises colloidal silicon dioxide, strawberry flavor, sodium benzoate, sucrose, and xanthan gum.

In some embodiments, the pharmaceutical composition comprises cherry flavoring, polysorbate 80, silicon dioxide, simethicone, sodium benzoate, sucrose, titanium dioxide, and xanthan gum.

Additional excipients are contemplated in the powder for reconstitution described herein. These additional excipients are selected based on function and compatibility with the powder formulation described herein and may be found, for example in *Remington: The Science and Practice of Pharmacy*, Nineteenth Ed (Easton, PA: Mack Publishing Company, 1995); Hoover, John E., *Remington's Pharmaceutical Sciences*, (Easton, PA: Mack Publishing Co 1975); Lieberman, H. A. and Lachman, L., Eds., *Pharmaceutical Dosage Forms* (New York, NY: Marcel Decker 1980); and *Pharmaceutical Dosage Forms and Drug Delivery Systems*, Seventh Ed (Lippincott Williams & Wilkins 1999), herein incorporated by reference in their entirety.

In some embodiments, the pharmaceutically acceptable excipient is able to form a complex with the boron compounds such as alcohols (for example, but not limited to, ethanol, propylene glycol, benzyl alcohol, glycerin, fatty alcohol, sugars, alcohol polymers, cellulose based polymers, mono and diglycerides, or cyclodextrins), amines (meglumine, triethanolamine, eudragit, chitosan) and carboxylate/carboxy acids (acetic acid, organic acids, EDTA, polymer based acrylate polymers).

Boronic Ester Exchange

In some embodiments, the —$OR^1$ or —$OR^2$ in the compounds of Formula (I) or (II); a pharmaceutically acceptable salt, a solvate, or a pharmaceutically acceptable salt and solvate thereof react with an —OH containing excipient or —OH containing solvent present in the pharmaceutical composition to form a new boronic ester derived from the —OH containing excipient or —OH containing solvent.

In some embodiments, the —OH containing excipient or —OH containing solvent is a polymer (for example: polyvinyl alcohol), a monosaccharide (for example: glucose, galactose, fructose, or xylose), a disaccharide (for example: sucrose, lactose, maltose, or trehalose), a polyol (for example: sorbitol or mannitol), an oligosaccharide (for example: maltodextrin, raffinose, stachyose, or fructo-oligosaccharides), alcohols (for example: ethanol, propylene glycol, benzyl alcohol, glycerol, fatty alcohol, sugars, or alcohol polymers), cellulose based polymers, or cyclodextrins.

Method of Administration

In some embodiments, the pharmaceutical compositions described herein are administered orally.

In some embodiments, the pharmaceutical composition is administered once a day. In some embodiments, the pharmaceutical composition is administered twice a day. In some embodiments, the pharmaceutical composition is administered three times a day. In some embodiments, the pharmaceutical composition is administered four times a day.

In some embodiments, the pharmaceutical composition is administered once every 24 hours. In some embodiments, the pharmaceutical composition is administered once every 12 hours. In some embodiments, the pharmaceutical composition is administered once every 8 hours.

In some embodiments, the pharmaceutical composition is administered for about 1 to about 10 days. In some embodiments, the pharmaceutical composition is administered for about 5 to about 10 days. In some embodiments, the pharmaceutical composition is administered for about 5 days. In some embodiments, the pharmaceutical composition is administered for about 6 days. In some embodiments, the pharmaceutical composition is administered for about 7 days. In some embodiments, the pharmaceutical composition is administered for about 8 days. In some embodiments, the pharmaceutical composition is administered for about 9 days. In some embodiments, the pharmaceutical composition is administered for about 10 days.

In some embodiments, the pharmaceutical composition comprises about 50 mg to about 3200 mg of the compound of formula (I) or (II), a pharmaceutically acceptable salt, a solvate, or a pharmaceutically acceptable salt and solvate thereof. In some embodiments, the pharmaceutical composition comprises about 50 mg to about 800 mg of the compound of formula (I) or (II), a pharmaceutically acceptable salt, a solvate, or a pharmaceutically acceptable salt and solvate thereof. In some embodiments, the pharmaceutical composition comprises about 75 mg to about 1200 mg of the compound of formula (I) or (II), a pharmaceutically acceptable salt, a solvate, or a pharmaceutically acceptable salt and solvate thereof. In some embodiments, the pharmaceutical composition comprises about 100 mg to about 1600 mg of the compound of formula (I) or (II), a pharmaceutically acceptable salt, a solvate, or a pharmaceutically acceptable salt and solvate thereof. In some embodiments, the pharmaceutical composition comprises about 150 mg to about 2400 mg of the compound of formula (I) or (II), a pharmaceutically acceptable salt, a solvate, or a pharmaceutically acceptable salt and solvate thereof.

In some embodiments, the pharmaceutical composition comprises about 50 mg, about 75, mg, about 100 mg, about 125 mg, about 150 mg, about 175 mg, about 200 mg, about 225 mg, about 250 mg, about 275 mg, about 300 mg, about 325 mg, about 350 mg, about 375 mg, about 400 mg, about 425 mg, about 450 mg, about 475 mg, about 500 mg, about 525 mg, about 550 mg, about 575 mg, about 600 mg, about 625 mg, about 650 mg, about 675 mg, about 700 mg, about 725 mg, about 750 mg, about 775 mg, about 800 mg, about 825 mg, about 850 mg, about 875 mg, about 900 mg, about 925 mg, about 950 mg, about 975 mg, about 1000 mg, about 1100 mg, about 1200 mg, about 1300 mg, about 1400 mg, about 1500 mg, about 1600 mg, about 1700 mg, about 1800 mg, about 1900 mg, about 2000 mg, about 2100 mg, about 2200 mg, about 2300 mg, about 2400 mg, about 2500 mg, about 2600 mg, about 2700 mg, about 2800 mg, about 2900 mg, about 3000 mg, about 3100 mg, or about 3200 mg of the compound of formula (I) or (II), a pharmaceutically acceptable salt, a solvate, or a pharmaceutically acceptable salt and solvate thereof.

In some embodiments, the pharmaceutical composition comprises about 100 to about 1000 mg of ceftibuten. In some embodiments, the pharmaceutical composition comprises about 100 to about 500 mg of ceftibuten. In some embodiments, the pharmaceutical composition comprises about 100, about 200, about 250, about 300, about 350, about 400, about 450, about 500, about 550, about 600, about 650, about 700, about 750, about 800, about 850, about 900, about 950, or about 1000 mg of ceftibuten. In some embodiments, the pharmaceutical composition comprises about 100 mg of ceftibuten. In some embodiments, the pharmaceutical composition comprises about 200 mg of ceftibuten. In some embodiments, the pharmaceutical composition comprises about 400 mg of ceftibuten.

In some embodiments, the pharmaceutical composition comprises between about 4:1 and about 1:4 weight ratio of the compound of formula (I) or (II), a pharmaceutically acceptable salt, a solvate, or a pharmaceutically acceptable salt and solvate thereof to ceftibuten.

In some embodiments, the daily dose of ceftibuten is about 100 mg to about 1000 mg. In some embodiments, the daily dose of ceftibuten is about 100, about 200, about 250, about 300, about 350, about 400, about 450, about 500, about 550, about 600, about 650, about 700, about 750, about 800, about 850, about 900, about 950, or about 1000 mg. In some embodiments, the daily dose of ceftibuten is about 100 mg. In some embodiments, the daily dose of ceftibuten is about 200 mg. In some embodiments, the daily dose of ceftibuten is about 400 mg.

In some embodiments, the pharmaceutical composition comprises about 100 to about 1000 mg of cefixime. In some embodiments, the pharmaceutical composition comprises about 100 to about 500 mg of cefixime. In some embodiments, the pharmaceutical composition comprises about 100, about 200, about 250, about 300, about 350, about 400, about 450, about 500, about 550, about 600, about 650, about 700, about 750, about 800, about 850, about 900, about 950, or about 1000 mg of cefixime. In some embodiments, the pharmaceutical composition comprises about 100 mg of cefixime. In some embodiments, the pharmaceutical composition comprises about 200 mg of cefixime. In some embodiments, the pharmaceutical composition comprises about 400 mg of cefixime.

In some embodiments, the daily dose of cefixime is about 100 mg to about 1000 mg. In some embodiments, the daily dose of cefixime is about 100, about 200, about 250, about 300, about 350, about 400, about 450, about 500, about 550, about 600, about 650, about 700, about 750, about 800, about 850, about 900, about 950, or about 1000 mg. In some embodiments, the daily dose of cefixime is about 100 mg. In some embodiments, the daily dose of cefixime is about 200 mg. In some embodiments, the daily dose of cefixime is about 400 mg.

In some embodiments, the pharmaceutical composition comprises between about 4:1 and about 1:4 weight ratio of the compound of formula (I) or (II), a pharmaceutically acceptable salt, a solvate, or a pharmaceutically acceptable salt and solvate thereof to cefixime.

In some embodiments, the pharmaceutical composition comprises about 100 to about 1000 mg of cefpodoxime proxetil. In some embodiments, the pharmaceutical composition comprises about 100 to about 500 mg of cefpodoxime proxetil. In some embodiments, the pharmaceutical composition comprises about 100, about 200, about 250, about 300, about 350, about 400, about 450, about 500, about 550, about 600, about 650, about 700, about 750, about 800, about 850, about 900, about 950, or about 1000 mg of cefpodoxime proxetil. In some embodiments, the pharmaceutical composition comprises about 100 mg of cefpodoxime proxetil. In some embodiments, the pharmaceutical composition comprises about 200 mg of cefpodoxime proxetil. In some embodiments, the pharmaceutical composition comprises about 400 mg of cefpodoxime proxetil.

In some embodiments, the pharmaceutical composition comprises between about 4:1 and about 1:4 weight ratio of the compound of formula (I) or (II), a pharmaceutically acceptable salt, a solvate, or a pharmaceutically acceptable salt and solvate thereof to cefpodoxime proxetil.

In some embodiments, the daily dose of cefpodoxime proxetil is about 100 mg to about 1000 mg. In some embodiments, the daily dose of cefpodoxime proxetil is about 100, about 200, about 250, about 300, about 350, about 400, about 450, about 500, about 550, about 600, about 650, about 700, about 750, about 800, about 850, about 900, about 950, or about 1000 mg. In some embodiments, the daily dose of cefpodoxime proxetil is about 200 mg.

In some embodiments, the pharmaceutical composition comprises about 100 to about 1000 mg of cefditoren pivoxil. In some embodiments, the pharmaceutical composition comprises about 100 to about 500 mg of cefditoren pivoxil. In some embodiments, the pharmaceutical composition comprises about 100, about 200, about 250, about 300, about 350, about 400, about 450, about 500, about 550, about 600, about 650, about 700, about 750, about 800, about 850, about 900, about 950, or about 1000 mg of cefditoren pivoxil. In some embodiments, the pharmaceutical composition comprises about 100 mg of cefditoren pivoxil. In some embodiments, the pharmaceutical composition comprises about 200 mg of cefditoren pivoxil. In some embodiments, the pharmaceutical composition comprises about 400 mg of cefditoren pivoxil.

In some embodiments, the pharmaceutical composition comprises between about 4:1 and about 1:4 weight ratio of the compound of formula (I) or (II), a pharmaceutically acceptable salt, a solvate, or a pharmaceutically acceptable salt and solvate thereof to cefditoren pivoxil.

In some embodiments, the daily dose of cefditoren pivoxil is about 100 mg to about 1000 mg. In some embodiments, the daily dose of cefditoren pivoxil is about 100, about 200, about 250, about 300, about 350, about 400, about 450, about 500, about 550, about 600, about 650, about 700, about 750, about 800, about 850, about 900, about 950, or about 1000 mg. In some embodiments, the daily dose of cefditoren pivoxil is about 200 mg. In some embodiments, the daily dose of cefditoren pivoxil is about 400 mg. In some embodiments, the daily dose of cefditoren pivoxil is about 800 mg.

Methods of Treatment

The present disclosure also provides methods for inhibiting bacterial growth, by, e.g., reducing bacterial resistance to a beta-lactam antibiotic, such methods comprising contacting a bacterial cell culture, or a bacterially infected cell culture, tissue, or organism, with a compound disclosed herein, a pharmaceutically acceptable salt, a solvate, or a pharmaceutically acceptable salt and solvate thereof. In some embodiments, the bacteria to be inhibited by administration of a compound disclosed herein, a pharmaceutically acceptable salt, a solvate thereof, or a pharmaceutically acceptable salt and solvate thereof are bacteria that are resistant to beta-lactam antibiotics. The term "resistant" is well-understood by those of ordinary skill in the art (see, e g Payne et al., *Antimicrobial Agents and Chemotherapy* 38 767-772 (1994), Hanaki et al., *Antimicrobial Agents and Chemotherapy* 30 1120-1126 (1995)).

These methods are useful for inhibiting bacterial growth in a variety of contexts. In certain other embodiments, a compound of formula (I) or (II), a pharmaceutically acceptable salt, a solvate, or a pharmaceutically acceptable salt and solvate thereof is administered to a mammal, including a human to prevent the growth of beta-lactam resistant bacteria in vivo. The method according to this embodiment comprises administering a therapeutically effective amount of a beta-lactamase inhibitor for a therapeutically effective period of time to a mammal, including a human. Preferably, the beta-lactamase inhibitor is administered in the form of a pharmaceutical composition as described herein. In some embodiments, an antibiotic is co-administered with the beta-lactamase inhibitor. In some embodiments, the antibiotic is a beta-lactam antibiotic. In some embodiments, the beta-lactam antibiotic is ceftibuten. In some embodiments, the beta-lactam antibiotic is cefixime. In some embodiments, the beta-lactam antibiotic is cefpodoxime proxetil. In some embodiments, the beta-lactam antibiotic is cefditoren pivoxil.

In some embodiments, the beta-lactam antibiotic is amoxicillin. In some embodiments, the beta-lactam antibiotic is cefaclor. In some embodiments, the beta-lactam antibiotic is cephalexin. In some embodiments, the beta-lactam antibiotic is cefdinir. In some embodiments, the beta-lactam antibiotic is cefuroxime.

Disclosed herein is a method of treating a bacterial infection in a subject in need thereof, the method comprising administering to the subject:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof; and
(ii) ceftibuten.

Disclosed herein is a method of treating a bacterial infection in a subject in need thereof, the method comprising delivering to the subject:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; and
(ii) ceftibuten.

In some embodiments of a method of treating a bacterial infection, the method comprises administering to the subject in need thereof:
(i) a compound of formula (I) or (II); a pharmaceutically acceptable salt, a solvate, or a pharmaceutically acceptable salt and solvate thereof:
wherein:

formula (I)

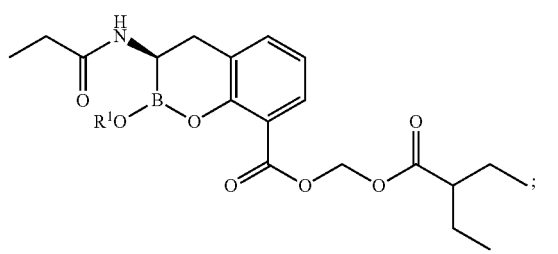

-continued

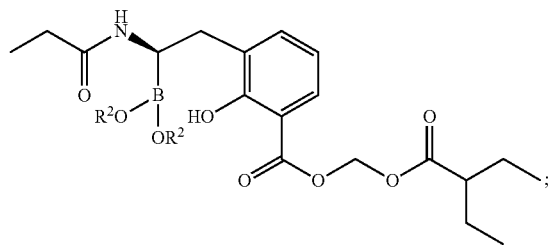
formula (II)

each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) ceftibuten.

Disclosed herein is a method of treating a bacterial infection in a subject in need thereof, the method comprising administering to the subject:

(i) a compound of formula (I) or (II); a pharmaceutically acceptable salt, a solvate, or a pharmaceutically acceptable salt and solvate thereof:

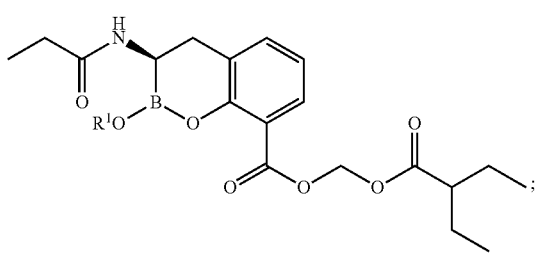
formula (I)

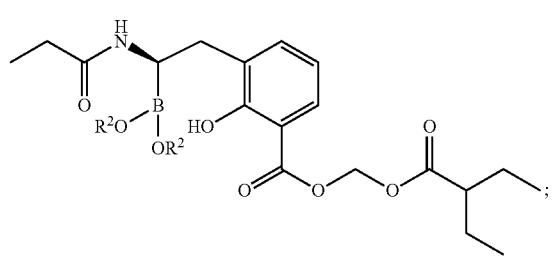
formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) ceftibuten.

Disclosed herein is a method of treating a bacterial infection in a subject in need thereof, the method comprising administering to the subject:

(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof; and (ii) cefixime.

Disclosed herein is a method of treating a bacterial infection in a subject in need thereof, the method comprising delivering to the subject:

(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; and (ii) cefixime.

In some embodiments of a method of treating a bacterial infection, the method comprises administering to the subject in need thereof:

(i) a compound of formula (I) or (II); a pharmaceutically acceptable salt, a solvate, or a pharmaceutically acceptable salt and solvate thereof:

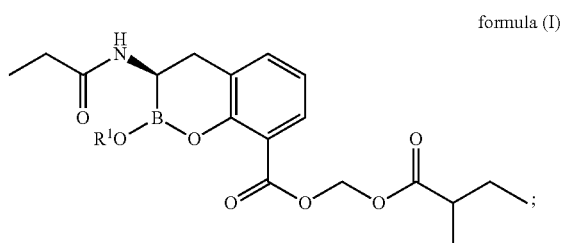
formula (I)

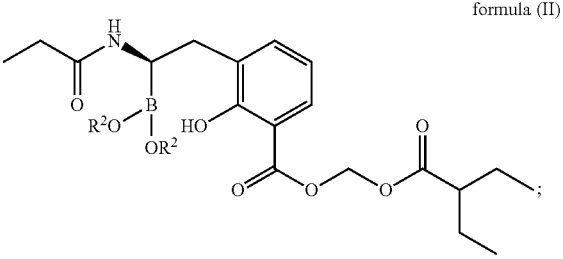
formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) cefixime.

Disclosed herein is a method of treating a bacterial infection in a subject in need thereof, the method comprising administering to the subject:

(i) a compound of formula (I) or (II); a pharmaceutically acceptable salt, a solvate, or a pharmaceutically acceptable salt and solvate thereof:

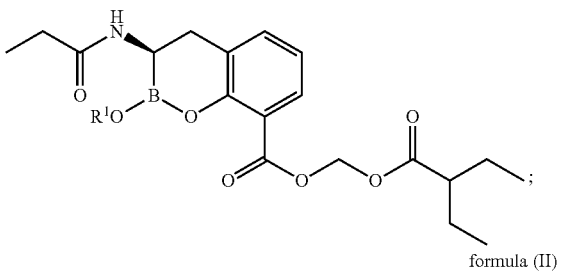

formula (I)

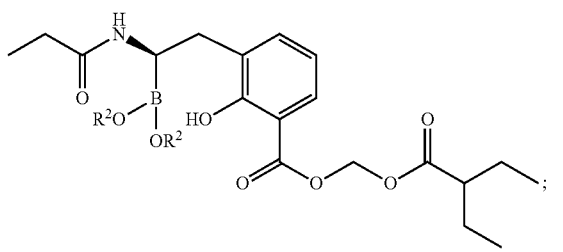

formula (II)

wherein:
  each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-$C_6$ alkyl, —N($C_1$-$C_6$ alkyl)$_2$, —COOH, or —COO($C_1$-$C_6$ alkyl);
  or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
(ii) cefixime.

Disclosed herein is a method of treating a bacterial infection in a subject in need thereof, the method comprising administering to the subject:
  (i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
  (ii) cefpodoxime proxetil.

Disclosed herein is a method of treating a bacterial infection in a subject in need thereof, the method comprising delivering to the subject:
  (i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; and
  (ii) cefpodoxime proxetil.

In some embodiments of a method of treating a bacterial infection, the method comprises administering to the subject in need thereof:
  (i) a compound of formula (I) or (II); a pharmaceutically acceptable salt, a solvate, or a pharmaceutically acceptable salt and solvate thereof:

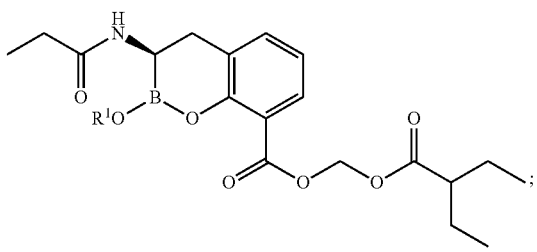

formula (I)

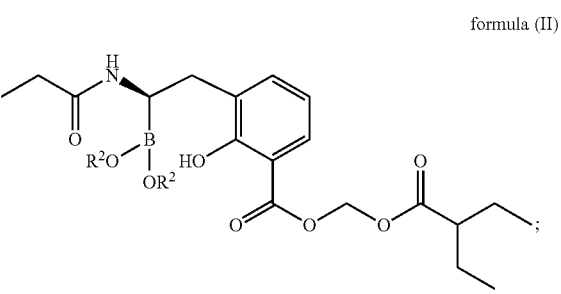

formula (II)

wherein:
  each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —NH$_2$, —NHC$_1$-$C_6$ alkyl, —N($C_1$-$C_6$ alkyl)$_2$, —COOH, or —COO($C_1$-$C_6$ alkyl);
  or two $R^2$ are taken together to form a 4- to 8-membered heterocycloalkyl optionally substituted with oxo, halogen, —OH, $C_1$-$C_6$ alkyl, —O($C_1$-$C_6$ alkyl), —NH$_2$, —NHC$_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
(ii) cefpodoxime proxetil.

Disclosed herein is a method of treating a bacterial infection in a subject in need thereof, the method comprising administering to the subject:
  (i) a compound of formula (I) or (II); a pharmaceutically acceptable salt, a solvate, or a pharmaceutically acceptable salt and solvate thereof:

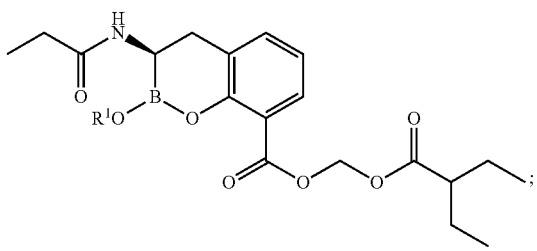

formula (I)

-continued

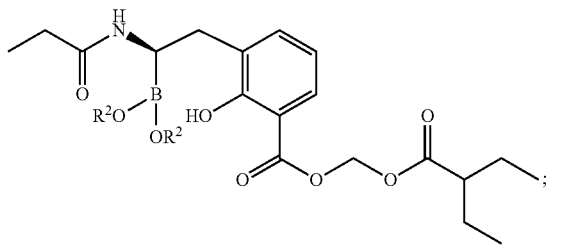

formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) cefpodoxime proxetil.

Disclosed herein is a method of treating a bacterial infection in a subject in need thereof, the method comprising administering to the subject:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, or a pharmaceutically acceptable salt, a solvate, or a pharmaceutically acceptable salt and solvate thereof, and
(ii) cefditoren pivoxil.

Disclosed herein is a method of treating a bacterial infection in a subject in need thereof, the method comprising delivering to the subject:
(i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; and
(ii) cefditoren pivoxil.

In some embodiments of a method of treating a bacterial infection, the method comprises administering to the subject in need thereof:
(i) a compound of formula (I) or (II); a pharmaceutically acceptable salt, a solvate, or a pharmaceutically acceptable salt and solvate thereof:

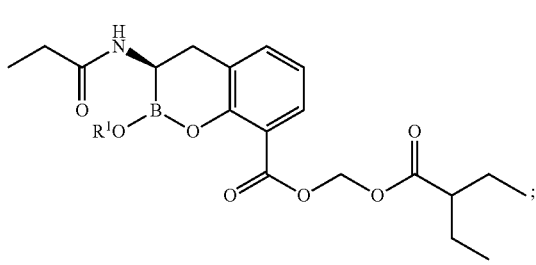

formula (I)

-continued

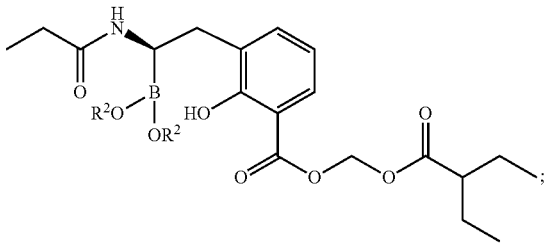

formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and (ii) cefditoren pivoxil.

Disclosed herein is a method of treating a bacterial infection in a subject in need thereof, the method comprising administering to the subject:
(i) a compound of formula (I) or (II); a pharmaceutically acceptable salt, a solvate, or a pharmaceutically acceptable salt and solvate thereof:

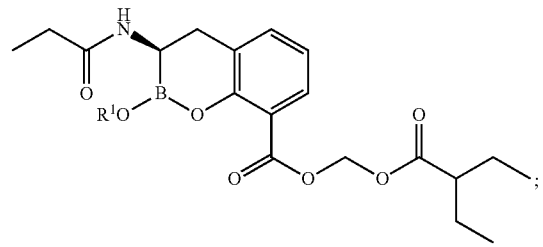

formula (I)

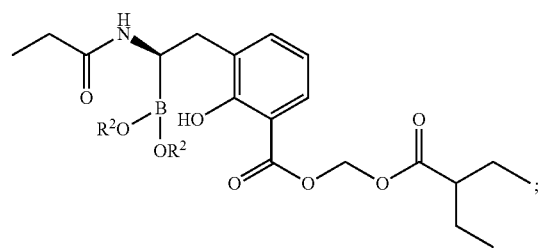

formula (II)

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —$NHC_1$-$C_6$ alkyl, —N($C_1$-$C_6$ alkyl)$_2$, —COOH, or —COO($C_1$-$C_6$ alkyl);

or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —$NHC_1$-$C_6$ alkyl, —N($C_1$-$C_6$ alkyl)$_2$, —COOH, —COO(C$_1$-C$_6$ alkyl), —(C$_1$-C$_6$ alkylene)COOH, or —(C$_1$-C$_6$ alkylene)COO(C$_1$-C$_6$ alkyl); and (ii) cefditoren pivoxil.

In some embodiments of a method of treating a bacterial infection, the compound of formula (I) or (II), or a pharmaceutically acceptable salt, a solvate, or a pharmaceutically acceptable salt and solvate thereof is:

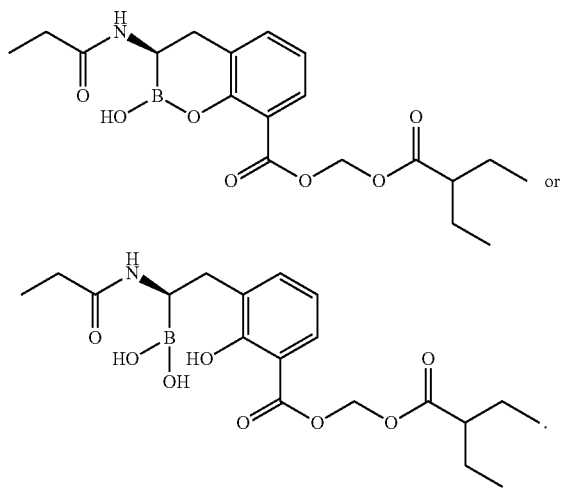

In some embodiments of a method of treating a bacterial infection, the compound of formula (I), or a pharmaceutically acceptable salt, a solvate, or a pharmaceutically acceptable salt and solvate thereof is:

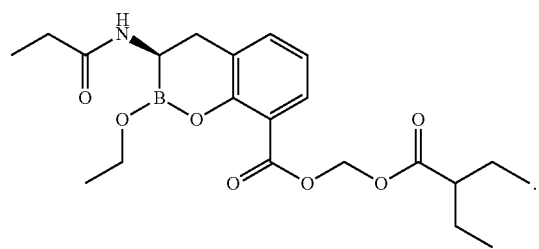 [SMILES: CCOB1Oc2c(cccc2C(=O)OCOC(=O)C(CC)CC)C[C@@H]1NC(=O)CC]

In some embodiments, the bacterial infection is caused by carbapenem-resistant Enterobacteriaceae (CRE) or extended-spectrum beta-lactamase (ESBL) producing gram-negative bacteria.

In some embodiments, the infection that is treated or prevented comprises a bacteria that includes *Achromobacter xylosoxidans*, *Bacillus cereus*, *Bacillus anthrasis*, *Elizabethkingia meningoseptica*, *Pseudomonas aeruginosa*, *Pseudomonas fluorescens*, *Pseudomonas acidovorans*, *Pseudomonas alcaligenes*, *Pseudomonas putida*, *Stenotrophomonas maltophilia*, *Burkholderia cepacia*, *Aeromonas hydrophilia*, *Escherichia coli*, *Citrobacter freundii*, *Salmonella typhimurium*, *Salmonella typhi*, *Salmonella paratyphi*, *Salmonella enteritidis*, *Shigella dysenteriae*, *Shigella flexneri*, *Shigella sonnei*, *Enterobacter cloacae*, *Enterobacter aerogenes*, *Klebsiella pneumoniae*, *Klebsiella oxytoca*, *Serratia marcescens*, *Francisella tularensis*, *Morganella morganii*, *Proteus mirabilis*, *Proteus vulgaris*, *Providencia alcalifaciens*, *Providencia rettgeri*, *Providencia stuartii*, *Acinetobacter baumannii*, *Acinetobacter calcoaceticus*, *Acinetobacter haemolyticus*, *Yersinia enterocolitica*, *Yersinia pestis*, *Yersinia pseudotuberculosis*, *Yersinia intermedia*, *Bordetella pertussis*, *Bordetella parapertussis*, *Bordetella bronchiseptica*, *Haemophilus influenzae*, *Haemophilus parainfluenzae*, *Haemophilus haemolyticus*, *Haemophilus parahaemolyticus*, *Haemophilus ducreyi*, *Pasteurella multocida*, *Pasteurella haemolytica*, *Branhamella catarrhalis*, *Helicobacter pylori*, *Campylobacter fetus*, *Campylobacter jejuni*, *Campylobacter coli*, *Borrelia burgdorferi*, *Vibrio cholerae*, *Vibrio parahaemolyticus*, *Legionella pneumophila*, *Listeria monocytogenes*, *Neisseria gonorrhoeae*, *Neisseria meningitidis*, *Kingella*, *Moraxella*, *Gardnerella vaginalis*, *Bacteroides fragilis*, *Bacteroides distasonis*, *Bacteroides* 3452A homology group, *Bacteroides vulgatus*, *Bacteroides ovalus*, *Bacteroides thetaiotaomicron*, *Bacteroides uniformis*, *Bacteroides eggerthii*, *Bacteroides splanchnicus*, *Clostridium difficile*, *Mycobacterium tuberculosis*, *Mycobacterium avium*, *Mycobacterium intracellulare*, *Mycobacterium leprae*, *Corynebacterium diphtheriae*, *Corynebacterium ulcerans*, *Streptococcus pneumoniae*, *Streptococcus agalactiae*, *Streptococcus pyogenes*, *Enterococcus faecalis*, *Enterococcus faecium*, *Staphylococcus aureus*, *Staphylococcus epidermidis*, *Staphylococcus saprophyticus*, *Staphylococcus intermedius*, *Staphylococcus hyicus* subsp. *hyicus*, *Staphylococcus haemolyticus*, *Staphylococcus hominis*, or *Staphylococcus saccharolyticus*.

In some embodiments, the infection that is treated or prevented comprises a bacteria that includes *Elizabethkingia meningoseptica*, *Pseudomonas aeruginosa*, *Pseudomonas fluorescens*, *Stenotrophomonas maltophilia*, *Escherichia coli*, *Citrobacter freundii*, *Salmonella typhimurium*, *Salmonella typhi*, *Salmonella paratyphi*, *Salmonella enteritidis*, *Shigella dysenteriae*, *Shigella flexneri*, *Shigella sonnei*, *Enterobacter cloacae*, *Enterobacter aerogenes*, *Klebsiella pneumoniae*, *Klebsiella oxytoca*, *Serratia marcescens*, *Acinetobacter calcoaceticus*, *Acinetobacter haemolyticus*, *Yersinia enterocolitica*, *Yersinia pestis*, *Yersinia pseudotuberculosis*, *Yersinia intermedia*, *Haemophilus influenzae*, *Haemophilus parainfluenzae*, *Haemophilus haemolyticus*, *Haemophilus parahaemolyticus*, *Helicobacter pylori*, *Campylobacter fetus*, *Campylobacter jejuni*, *Campylobacter coli*, *Vibrio cholerae*, *Vibrio parahaemolyticus*, *Legionella pneumophila*, *Listeria monocytogenes*, *Neisseria gonorrhoeae*, *Neisseria meningitidis*, *Moraxella*, *Bacteroides fragilis*, *Bacteroides vulgatus*, *Bacteroides ovalus*, *Bacteroides thetaiotaomicron*, *Bacteroides uniformis*, *Bacteroides eggerthii*, or *Bacteroides splanchnicus*.

In certain embodiments, the combinations described herein are useful in the treatment of bacterial infections.

In certain embodiments, the combinations described herein are useful in the treatment of acute bacterial exacerbations of chronic bronchitis (ABECB), acute bacterial otitis media, pharyngitis, or tonsillitis. In certain embodiments, the combinations described herein are useful in the treatment of pneumonia, urinary tract infections, enteritis, or gastroenteritis.

In certain embodiments, the combinations described herein are useful in the treatment of otitis media, strep throat, pneumonia, urinary tract infections, gonorrhea, or Lyme disease.

In some embodiments, the compound of formula (I) or (II), a pharmaceutically acceptable salt, a solvate, or a pharmaceutically acceptable salt and solvate thereof and ceftibuten are administered sequentially. In some embodiments, the compound of formula (I) or (II), a pharmaceutically acceptable salt, a solvate, or a pharmaceutically acceptable salt and solvate thereof and ceftibuten are administered concurrently. In some embodiments, the compound of formula (I) or (II), a pharmaceutically acceptable salt, a solvate, or a pharmaceutically acceptable salt and solvate thereof and ceftibuten are administered in the same pharmaceutical composition. In some embodiments, the compound of formula (I) or (II), a pharmaceutically acceptable salt, a solvate, or a pharmaceutically acceptable salt and solvate thereof and ceftibuten are administered in separate pharmaceutical composition. In some embodiments, the compound of formula (I) or (II), a pharmaceutically acceptable salt, a solvate, or a pharmaceutically acceptable salt and solvate thereof and ceftibuten are provided in separate containers. In some embodiments, the compound of formula (I) or (II), a pharmaceutically acceptable salt, a solvate, or a pharmaceutically acceptable salt and solvate thereof and ceftibuten are provided in a single container. In some embodiments, the container is a bottle.

In some embodiments, the method comprises administering about 400 mg ceftibuten and about 100 mg to about 1600 mg of a compound of formula (I) or (II); a pharmaceutically acceptable salt, a solvate, or a pharmaceutically acceptable salt and solvate thereof, both administered every 24 hours.

In some embodiments, the method comprises administering about 600 mg ceftibuten and about 150 mg to about 2400 mg of a compound of formula (I) or (II); a pharmaceutically acceptable salt, a solvate, or a pharmaceutically acceptable salt and solvate thereof, both administered every 24 hours.

In some embodiments, the method comprises administering about 800 mg ceftibuten and about 200 mg to about 3200 mg of a compound of formula (I) or (II); a pharmaceutically acceptable salt, a solvate, or a pharmaceutically acceptable salt and solvate thereof, both administered every 24 hours.

In some embodiments, the method comprises administering about 200 mg ceftibuten and about 50 mg to about 800 mg of a compound of formula (I) or (II); a pharmaceutically acceptable salt, a solvate, or a pharmaceutically acceptable salt and solvate thereof, both administered every 12 hours.

In some embodiments, the method comprises administering about 300 mg ceftibuten and about 75 mg to about 1200 mg of a compound of formula (I) or (II); a pharmaceutically acceptable salt, a solvate, or a pharmaceutically acceptable salt and solvate thereof, both administered every 12 hours.

In some embodiments, the method comprises administering about 400 mg ceftibuten and about 100 mg to about 1600 mg of a compound of formula (I) or (II); a pharmaceutically acceptable salt, a solvate, or a pharmaceutically acceptable salt and solvate thereof, both administered every 12 hours.

In some embodiments, the method comprises administering about 600 mg ceftibuten and about 150 mg to about 2400 mg of a compound of formula (I) or (II); a pharmaceutically acceptable salt, a solvate, or a pharmaceutically acceptable salt and solvate thereof, both administered every 12 hours.

In some embodiments, the method comprises administering about 800 mg ceftibuten and about 200 mg to about 3200 mg of a compound of formula (I) or (II); a pharmaceutically acceptable salt, a solvate, or a pharmaceutically acceptable salt and solvate thereof, both administered every 12 hours.

In some embodiments, the method comprises administering about 200 mg ceftibuten and about 50 mg to about 800 mg of a compound of formula (I) or (II); a pharmaceutically acceptable salt, a solvate, or a pharmaceutically acceptable salt and solvate thereof, both administered every 8 hours.

In some embodiments, the method comprises administering about 300 mg ceftibuten and about 75 mg to about 1200 mg of a compound of formula (I) or (II); a pharmaceutically acceptable salt, a solvate, or a pharmaceutically acceptable salt and solvate thereof, both administered every 8 hours.

In some embodiments, the method comprises administering about 400 mg ceftibuten and about 100 mg to about 1600 mg of a compound of formula (I) or (II); a pharmaceutically acceptable salt, a solvate, or a pharmaceutically acceptable salt and solvate thereof, both administered every 8 hours.

In some embodiments, the method comprises administering about 600 mg ceftibuten and about 150 mg to about 2400 mg of a compound of formula (I) or (II); a pharmaceutically acceptable salt, a solvate, or a pharmaceutically acceptable salt and solvate thereof, both administered every 8 hours.

In some embodiments, the compound of formula (I) or (II), a pharmaceutically acceptable salt, a solvate, or a pharmaceutically acceptable salt and solvate thereof and cefixime are administered sequentially. In some embodiments, the compound of formula (I) or (II), a pharmaceutically acceptable salt, a solvate, or a pharmaceutically acceptable salt and solvate thereof and cefixime are administered concurrently. In some embodiments, the compound of formula (I) or (II), a pharmaceutically acceptable salt, a solvate, or a pharmaceutically acceptable salt and solvate thereof and cefixime are administered in the same pharmaceutical composition. In some embodiments, the compound of formula (I) or (II), a pharmaceutically acceptable salt, a solvate, or a pharmaceutically acceptable salt and solvate thereof and cefixime are administered in separate pharmaceutical composition. In some embodiments, the compound of formula (I) or (II), a pharmaceutically acceptable salt, a solvate, or a pharmaceutically acceptable salt and solvate thereof and cefixime are provided in separate containers. In some embodiments, the compound of formula (I) or (II), a pharmaceutically acceptable salt, a solvate, or a pharmaceutically acceptable salt and solvate thereof and cefixime are provided in a single container. In some embodiments, the container is a bottle.

In some embodiments, the method comprises administering about 400 mg cefixime and about 100 mg to about 1600 mg of a compound of formula (I) or (II); a pharmaceutically acceptable salt, a solvate, or a pharmaceutically acceptable salt and solvate thereof, both administered every 24 hours.

In some embodiments, the method comprises administering about 600 mg cefixime and about 150 mg to about 2400 mg of a compound of formula (I) or (II); a pharmaceutically acceptable salt, a solvate, or a pharmaceutically acceptable salt and solvate thereof, both administered every 24 hours.

In some embodiments, the method comprises administering about 800 mg cefixime and about 200 mg to about 3200 mg of a compound of formula (I) or (II); a pharmaceutically acceptable salt, a solvate, or a pharmaceutically acceptable salt and solvate thereof, both administered every 24 hours.

In some embodiments, the method comprises administering about 200 mg cefixime and about 50 mg to about 800 mg of a compound of formula (I) or (II); a pharmaceutically acceptable salt, a solvate, or a pharmaceutically acceptable salt and solvate thereof, both administered every 12 hours.

In some embodiments, the method comprises administering about 300 mg cefixime and about 75 mg to about 1200 mg of a compound of formula (I) or (II); a pharmaceutically acceptable salt, a solvate, or a pharmaceutically acceptable salt and solvate thereof, both administered every 12 hours.

In some embodiments, the method comprises administering about 400 mg cefixime and about 100 mg to about 1600 mg of a compound of formula (I) or (II); a pharmaceutically acceptable salt, a solvate, or a pharmaceutically acceptable salt and solvate thereof, both administered every 12 hours.

In some embodiments, the method comprises administering about 600 mg cefixime and about 150 mg to about 2400 mg of a compound of formula (I) or (II); a pharmaceutically acceptable salt, a solvate, or a pharmaceutically acceptable salt and solvate thereof, both administered every 12 hours.

In some embodiments, the method comprises administering about 800 mg cefixime and about 200 mg to about 3200 mg of a compound of formula (I) or (II); a pharmaceutically acceptable salt, a solvate, or a pharmaceutically acceptable salt and solvate thereof, both administered every 12 hours.

In some embodiments, the method comprises administering about 200 mg cefixime and about 50 mg to about 800 mg of a compound of formula (I) or (II); a pharmaceutically acceptable salt, a solvate, or a pharmaceutically acceptable salt and solvate thereof, both administered every 8 hours.

In some embodiments, the method comprises administering about 300 mg cefixime and about 75 mg to about 1200 mg of a compound of formula (I) or (II); a pharmaceutically acceptable salt, a solvate, or a pharmaceutically acceptable salt and solvate thereof, both administered every 8 hours.

In some embodiments, the method comprises administering about 400 mg cefixime and about 100 mg to about 1600 mg of a compound of formula (I) or (II); a pharmaceutically acceptable salt, a solvate, or a pharmaceutically acceptable salt and solvate thereof, both administered every 8 hours.

In some embodiments, the method comprises administering about 600 mg cefixime and about 150 mg to about 2400 mg of a compound of formula (I) or (II); a pharmaceutically acceptable salt, a solvate, or a pharmaceutically acceptable salt and solvate thereof, both administered every 8 hours.

In some embodiments, the compound of formula (I) or (II), a pharmaceutically acceptable salt, a solvate, or a pharmaceutically acceptable salt and solvate thereof and cefpodoxime proxetil are administered sequentially. In some embodiments, the compound of formula (I) or (II), a pharmaceutically acceptable salt, a solvate, or a pharmaceutically acceptable salt and solvate thereof and cefpodoxime proxetil are administered concurrently. In some embodiments, the compound of formula (I) or (II), a pharmaceutically acceptable salt, a solvate, or a pharmaceutically acceptable salt and solvate thereof and cefpodoxime proxetil are administered in the same pharmaceutical composition. In some embodiments, the compound of formula (I) or (II), a pharmaceutically acceptable salt, a solvate, or a pharmaceutically acceptable salt and solvate thereof and cefpodoxime proxetil are administered in separate pharmaceutical composition. In some embodiments, the compound of formula (I) or (II), a pharmaceutically acceptable salt, a solvate, or a pharmaceutically acceptable salt and solvate thereof and cefpodoxime proxetil are provided in separate containers. In some embodiments, the compound of formula (I) or (II), a pharmaceutically acceptable salt, a solvate, or a pharmaceutically acceptable salt and solvate thereof and cefpodoxime proxetil are provided in a single container. In some embodiments, the container is a bottle.

In some embodiments, the method comprises administering about 400 mg cefpodoxime proxetil and about 100 mg to about 1600 mg of a compound of formula (I) or (II); a pharmaceutically acceptable salt, a solvate, or a pharmaceutically acceptable salt and solvate thereof, both administered every 24 hours.

In some embodiments, the method comprises administering about 600 mg cefpodoxime proxetil and about 150 mg to about 2400 mg of a compound of formula (I) or (II); a pharmaceutically acceptable salt, a solvate, or a pharmaceutically acceptable salt and solvate thereof, both administered every 24 hours.

In some embodiments, the method comprises administering about 800 mg cefpodoxime proxetil and about 200 mg to about 3200 mg of a compound of formula (I) or (II); a pharmaceutically acceptable salt, a solvate, or a pharmaceutically acceptable salt and solvate thereof, both administered every 24 hours.

In some embodiments, the method comprises administering about 200 mg cefpodoxime proxetil and about 50 mg to about 800 mg of a compound of formula (I) or (II); a pharmaceutically acceptable salt, a solvate, or a pharmaceutically acceptable salt and solvate thereof, both administered every 12 hours.

In some embodiments, the method comprises administering about 300 mg cefpodoxime proxetil and about 75 mg to about 1200 mg of a compound of formula (I) or (II); a pharmaceutically acceptable salt, a solvate, or a pharmaceutically acceptable salt and solvate thereof, both administered every 12 hours.

In some embodiments, the method comprises administering about 400 mg cefpodoxime proxetil and about 100 mg to about 1600 mg of a compound of formula (I) or (II); a pharmaceutically acceptable salt, a solvate, or a pharmaceutically acceptable salt and solvate thereof, both administered every 12 hours.

In some embodiments, the method comprises administering about 600 mg cefpodoxime proxetil and about 150 mg to about 2400 mg of a compound of formula (I) or (II); a pharmaceutically acceptable salt, a solvate, or a pharmaceutically acceptable salt and solvate thereof, both administered every 12 hours.

In some embodiments, the method comprises administering about 800 mg cefpodoxime proxetil and about 200 mg to about 3200 mg of a compound of formula (I) or (II); a pharmaceutically acceptable salt, a solvate, or a pharmaceutically acceptable salt and solvate thereof, both administered every 12 hours.

In some embodiments, the method comprises administering about 200 mg cefpodoxime proxetil and about 50 mg to about 800 mg of a compound of formula (I) or (II); a pharmaceutically acceptable salt, a solvate, or a pharmaceutically acceptable salt and solvate thereof, both administered every 8 hours.

In some embodiments, the method comprises administering about 300 mg cefpodoxime proxetil and about 75 mg to about 1200 mg of a compound of formula (I) or (II); a pharmaceutically acceptable salt, a solvate, or a pharmaceutically acceptable salt and solvate thereof, both administered every 8 hours.

In some embodiments, the method comprises administering about 400 mg cefpodoxime proxetil and about 100 mg to about 1600 mg of a compound of formula (I) or (II); a pharmaceutically acceptable salt, a solvate, or a pharmaceutically acceptable salt and solvate thereof, both administered every 8 hours.

In some embodiments, the method comprises administering about 600 mg cefpodoxime proxetil and about 150 mg to about 2400 mg of a compound of formula (I) or (II); a pharmaceutically acceptable salt, a solvate, or a pharmaceutically acceptable salt and solvate thereof, both administered every 8 hours.

In some embodiments, the compound of formula (I) or (II), a pharmaceutically acceptable salt, a solvate, or a pharmaceutically acceptable salt and solvate thereof and cefditoren pivoxil are administered sequentially. In some embodiments, the compound of formula (I) or (II), a pharmaceutically acceptable salt, a solvate, or a pharmaceutically acceptable salt and solvate thereof and cefditoren pivoxil are administered concurrently. In some embodiments, the compound of formula (I) or (II), a pharmaceutically acceptable salt, a solvate, or a pharmaceutically acceptable salt and solvate thereof and cefditoren pivoxil are administered in the same pharmaceutical composition. In some embodiments, the compound of formula (I) or (II), a pharmaceutically acceptable salt, a solvate, or a pharmaceutically acceptable salt and solvate thereof and cefditoren pivoxil are administered in separate pharmaceutical composition. In some embodiments, the compound of formula (I) or (II), a pharmaceutically acceptable salt, a solvate, or a pharmaceutically acceptable salt and solvate thereof and cefditoren pivoxil are provided in separate containers. In some embodiments, the compound of formula (I) or (II), a pharmaceutically acceptable salt, a solvate, or a pharmaceutically acceptable salt and solvate thereof and cefditoren pivoxil are provided in a single container. In some embodiments, the container is a bottle.

In some embodiments, the method comprises administering about 400 mg cefditoren pivoxil and about 100 mg to about 1600 mg of a compound of formula (I) or (II); a pharmaceutically acceptable salt, a solvate, or a pharmaceutically acceptable salt and solvate thereof, both administered every 24 hours.

In some embodiments, the method comprises administering about 600 mg cefditoren pivoxil and about 150 mg to about 2400 mg of a compound of formula (I) or (II); a pharmaceutically acceptable salt, a solvate, or a pharmaceutically acceptable salt and solvate thereof, both administered every 24 hours.

In some embodiments, the method comprises administering about 800 mg cefditoren pivoxil and about 200 mg to about 3200 mg of a compound of formula (I) or (II); a pharmaceutically acceptable salt, a solvate, or a pharmaceutically acceptable salt and solvate thereof, both administered every 24 hours.

In some embodiments, the method comprises administering about 200 mg cefditoren pivoxil and about 50 mg to about 800 mg of a compound of formula (I) or (II); a pharmaceutically acceptable salt, a solvate, or a pharmaceutically acceptable salt and solvate thereof, both administered every 12 hours.

In some embodiments, the method comprises administering about 300 mg cefditoren pivoxil and about 75 mg to about 1200 mg of a compound of formula (I) or (II); a pharmaceutically acceptable salt, a solvate, or a pharmaceutically acceptable salt and solvate thereof, both administered every 12 hours.

In some embodiments, the method comprises administering about 400 mg cefditoren pivoxil and about 100 mg to about 1600 mg of a compound of formula (I) or (II); a pharmaceutically acceptable salt, a solvate, or a pharmaceutically acceptable salt and solvate thereof, both administered every 12 hours.

In some embodiments, the method comprises administering about 600 mg cefditoren pivoxil and about 150 mg to about 2400 mg of a compound of formula (I) or (II); a pharmaceutically acceptable salt, a solvate, or a pharmaceutically acceptable salt and solvate thereof, both administered every 12 hours.

In some embodiments, the method comprises administering about 800 mg cefditoren pivoxil and about 200 mg to about 3200 mg of a compound of formula (I) or (II); a pharmaceutically acceptable salt, a solvate, or a pharmaceutically acceptable salt and solvate thereof, both administered every 12 hours.

In some embodiments, the method comprises administering about 200 mg cefditoren pivoxil and about 50 mg to about 800 mg of a compound of formula (I) or (II); a pharmaceutically acceptable salt, a solvate, or a pharmaceutically acceptable salt and solvate thereof, both administered every 8 hours.

In some embodiments, the method comprises administering about 300 mg cefditoren pivoxil and about 75 mg to about 1200 mg of a compound of formula (I) or (II); a pharmaceutically acceptable salt, a solvate, or a pharmaceutically acceptable salt and solvate thereof, both administered every 8 hours.

In some embodiments, the method comprises administering about 400 mg cefditoren pivoxil and about 100 mg to about 1600 mg of a compound of formula (I) or (II); a pharmaceutically acceptable salt, a solvate, or a pharmaceutically acceptable salt and solvate thereof, both administered every 8 hours.

In some embodiments, the method comprises administering about 600 mg cefditoren pivoxil and about 150 mg to about 2400 mg of a compound of formula (I) or (II); a pharmaceutically acceptable salt, a solvate, or a pharmaceutically acceptable salt and solvate thereof, both administered every 8 hours.

In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and ceftibuten are administered sequentially. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and ceftibuten are administered concurrently. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid a pharmaceutically acceptable salt, a solvate, or a pharmaceutically acceptable salt and solvate thereof and ceftibuten are administered in the same pharmaceutical composition. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and ceftibuten are administered in separate pharmaceutical composition. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and ceftibuten are provided in separate containers. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and ceftibuten are provided in a single container. In some embodiments, the container is bottle.

In some embodiments, the method comprises administering about 400 mg ceftibuten and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 600 mg ceftibuten and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 800 mg ceftibuten and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 200 mg ceftibuten and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 300 mg ceftibuten and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 400 mg ceftibuten and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 600 mg ceftibuten and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 800 mg ceftibuten and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 200 mg ceftibuten and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 300 mg ceftibuten and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 400 mg ceftibuten and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 600 mg ceftibuten and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefixime are administered sequentially. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefixime are administered concurrently. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid a pharmaceutically acceptable salt, a solvate, or a pharmaceutically acceptable salt and solvate thereof and cefixime are administered in the same pharmaceutical composition. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefixime are administered in separate pharmaceutical composition. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefixime are provided in separate containers. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefixime are provided in a single container. In some embodiments, the container is bottle.

In some embodiments, the method comprises administering about 400 mg cefixime and In some embodiments, the method comprises administering about 400 mg cefixime and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 600 mg cefixime and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 800 mg cefixime and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 200 mg cefixime and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 300 mg cefixime and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 400 mg cefixime and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 600 mg cefixime and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 800 mg cefixime and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 200 mg cefixime and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 300 mg cefixime and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 400 mg cefixime and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 600 mg cefixime and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefpodoxime proxetil are administered sequentially. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefpodoxime proxetil are administered concurrently. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid a pharmaceutically acceptable salt, a solvate, or a pharmaceutically acceptable salt and solvate thereof and cefpodoxime proxetil are administered in the same pharmaceutical composition. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefpodoxime proxetil are administered in separate pharmaceutical composition. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefpodoxime proxetil are provided in separate containers. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefpodoxime proxetil are provided in a single container. In some embodiments, the container is bottle.

In some embodiments, the method comprises administering about 400 mg cefpodoxime proxetil and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 600 mg cefpodoxime proxetil and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 800 mg cefpodoxime proxetil and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 200 mg cefpodoxime proxetil and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 300 mg cefpodoxime proxetil and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 400 mg cefpodoxime proxetil and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 600 mg cefpodoxime proxetil and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 800 mg cefpodoxime proxetil and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 200 mg cefpodoxime proxetil and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 300 mg cefpodoxime proxetil and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 400 mg cefpodoxime proxetil and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 600 mg cefpodoxime proxetil and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefditoren pivoxil are administered sequentially. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefditoren pivoxil are administered concurrently. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid a pharmaceutically acceptable salt, a solvate, or a pharmaceutically acceptable salt and solvate thereof and cefditoren pivoxil are administered in the same pharmaceutical composition. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefditoren pivoxil are administered in separate pharmaceutical composition. In some embodiments, (R)-2-hydroxy-3-propionamido-3,4-dihydro-2H-benzo[e][1,2] oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefditoren pivoxil are provided in separate containers. In some embodiments, (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid, a pharmaceutically acceptable salt, a solvate, or a pharmaceutically acceptable salt and solvate thereof and cefditoren pivoxil are provided in a single container. In some embodiments, the container is bottle.

In some embodiments, the method comprises administering about 400 mg cefditoren pivoxil and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 600 mg cefditoren pivoxil and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 800 mg cefditoren pivoxil and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 24 hours.

In some embodiments, the method comprises administering about 200 mg cefditoren pivoxil and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 300 mg cefditoren pivoxil and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 400 mg cefditoren pivoxil and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 600 mg cefditoren pivoxil and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 800 mg cefditoren pivoxil and about 200 mg to about 3200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 12 hours.

In some embodiments, the method comprises administering about 200 mg cefditoren pivoxil and about 50 mg to about 800 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 300 mg cefditoren pivoxil and about 75 mg to about 1200 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 400 mg cefditoren pivoxil and about 100 mg to about 1600 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

In some embodiments, the method comprises administering about 600 mg cefditoren pivoxil and about 150 mg to about 2400 mg of (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; a pharmaceutically acceptable salt, a solvate, or a pharmaceutically acceptable salt and solvate thereof, both administered every 8 hours.

Certain Definitions

Unless defined otherwise, all technical and scientific terms used herein have the same meanings as commonly understood by one of ordinary skill in the art. Although any methods and materials similar or equivalent to those described herein can be used in the practice or testing of embodiments described herein, certain preferred methods, devices, and materials are now described.

As used herein and in the appended claims, the singular forms "a," "an," and "the" include plural reference unless the context clearly dictates otherwise. Thus, for example, reference to "an excipient" is a reference to one or more excipients and equivalents thereof known to those skilled in the art, and so forth.

The term "about" is used to indicate that a value includes the standard level of error for the device or method being employed to determine the value.

The use of the term "or" is used to mean "and/or" unless explicitly indicated to refer to alternatives only or the alternatives are mutually exclusive, although the disclosure supports a definition that refers to only alternatives and to "and/or."

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

"Optional" or "optionally" may be taken to mean that the subsequently described structure, event or circumstance may or may not occur, and that the description includes instances where the events occurs and instances where it does not.

As used herein, the term "therapeutic" means an agent utilized to treat, combat, ameliorate, prevent or improve an unwanted condition or disease of a patient.

"Administering" when used in conjunction with a therapeutic means to administer a therapeutic systemically or locally, as directly into or onto a target tissue, or to administer a therapeutic to a patient whereby the therapeutic positively impacts the tissue to which it is targeted. "Administering" a pharmaceutical composition may be accomplished by injection, topical administration, and oral administration or by other methods alone or in combination with other known techniques.

The term "animal" as used herein includes, but is not limited to, humans and non-human vertebrates such as wild, domestic and farm animals. As used herein, the terms "patient," "subject" and "individual" are intended to include living organisms in which certain conditions as described herein can occur. Examples include humans, monkeys, cows, sheep, goats, dogs, cats, mice, rats, and transgenic species thereof. In a preferred embodiment, the patient is a primate. In certain embodiments, the primate or subject is a human. In certain instances, the human is an adult. In certain instances, the human is child. In further instances, the human is 12 years of age or younger. In certain instances, the human is elderly. In other instances, the human is 60 years of age or older. Other examples of subjects include experimental animals such as mice, rats, dogs, cats, goats, sheep, pigs, and cows.

By "pharmaceutically acceptable," it is meant the carrier, diluent or excipient must be compatible with the other ingredients of the composition and not deleterious to the recipient thereof.

The term "pharmaceutical composition" means a composition comprising at least one active ingredient, whereby the composition is amenable to investigation for a specified, efficacious outcome in a mammal (for example, without limitation, a human). Those of ordinary skill in the art will understand and appreciate the techniques appropriate for determining whether an active ingredient has a desired efficacious outcome based upon the needs of the artisan.

A "therapeutically effective amount" or "effective amount" as used herein refers to the amount of active compound or pharmaceutical agent that elicits a biological or medicinal response in a tissue, system, animal, individual or human that is being sought by a researcher, veterinarian, medical doctor or other clinician, which includes one or more of the following: (1) preventing the disease; for example, preventing a disease, condition or disorder in an individual that may be predisposed to the disease, condition or disorder but does not yet experience or display the pathology or symptomatology of the disease, (2) inhibiting the disease; for example, inhibiting a disease, condition or disorder in an individual that is experiencing or displaying the pathology or symptomatology of the disease, condition or disorder (i.e., arresting further development of the pathology and/or symptomatology), and (3) ameliorating the disease; for example, ameliorating a disease, condition or disorder in an individual that is experiencing or displaying the pathology or symptomatology of the disease, condition or disorder (i.e., reversing the pathology and/or symptomatology).

The terms "treat," "treated," "treatment," or "treating" as used herein refers to both therapeutic treatment in some embodiments and prophylactic or preventative measures in other embodiments, wherein the object is to prevent or slow (lessen) an undesired physiological condition, disorder or disease, or to obtain beneficial or desired clinical results. For the purposes described herein, beneficial or desired clinical results include, but are not limited to, alleviation of symptoms; diminishment of the extent of the condition, disorder or disease; stabilization (i.e., not worsening) of the state of the condition, disorder or disease; delay in onset or slowing of the progression of the condition, disorder or disease; amelioration of the condition, disorder or disease state; and remission (whether partial or total), whether detectable or undetectable, or enhancement or improvement of the condition, disorder or disease. Treatment includes eliciting a clinically significant response without excessive levels of side effects. Treatment also includes prolonging survival as compared to expected survival if not receiving treatment. A prophylactic benefit of treatment includes prevention of a condition, retarding the progress of a condition, stabilization of a condition, or decreasing the likelihood of occurrence of a condition. As used herein, "treat," "treated," "treatment," or "treating" includes prophylaxis in some embodiments. As used herein, "treat," "treated," "treatment," or "treating" does not include prophylaxis in some embodiments.

The term "emulsion" as used herein refers to a colloidal dispersion comprising water and organic components including hydrophobic (lipophilic) organic components. Generally, a traditional emulsion is comprised of oil droplets (>about 200 nm) dispersed in water, resulting in a milky white liquid which is not stable.

The term "microemulsion," as used herein, refers to a dispersion comprising water and organic components including hydrophobic (lipophilic) organic components, wherein the droplets or particles formed from the organic components have an average maximum dimension of less than about 200 nm.

"Alkyl" refers to a substituted straight-chain, or branched-chain saturated hydrocarbon monoradical having from one to about ten carbon atoms, from one to six carbon atoms, or from one to four carbon atoms. Examples include, but are not limited to, methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, n-butyl, isobutyl, sec-butyl, t-butyl, n-pentyl, isopentyl, neopentyl, tert-amyl and hexyl, and longer alkyl groups, such as heptyl, octyl, and the like. Whenever it appears herein, a numerical range such as "$C_1$-$C_6$ alkyl" means that the alkyl group consists of 1 carbon atom, 2 carbon atoms, 3 carbon atoms, 4 carbon atoms, 5 carbon atoms or 6 carbon atoms, although the present definition also covers the occurrence of the term "alkyl" where no numerical range is designated. In some embodiments, the alkyl is a $C_1$-$C_{10}$ alkyl, a $C_1$-$C_9$ alkyl, a $C_1$-$C_8$ alkyl, a $C_1$-$C_7$ alkyl, a $C_1$-$C_6$ alkyl, a $C_1$-$C_5$ alkyl, a $C_1$-$C_4$ alkyl, a $C_1$-$C_3$ alkyl, a $C_1$-$C_2$ alkyl, or a $C_1$ alkyl.

"Heterocycloalkyl" refers to a stable 3- to 24-membered partially or fully saturated ring radical comprising 2 to 23 carbon atoms and from one to 8 heteroatoms selected from the group consisting of boron, nitrogen, oxygen, phosphorous, and sulfur. In some embodiments, the heterocycloalkyl comprises 1 to 4 heteroatoms selected from boron and oxygen. Unless stated otherwise specifically in the specification, the heterocycloalkyl radical may be a monocyclic, bicyclic, tricyclic or tetracyclic ring system, which may include fused (when fused with an aryl or a heteroaryl ring, the heterocycloalkyl is bonded through a non-aromatic ring atom) or bridged ring systems; and the nitrogen, carbon or sulfur atoms in the heterocycloalkyl radical may be optionally oxidized; the nitrogen atom may be optionally quaternized. Representative heterocycloalkyls include, but are not limited to, heterocycloalkyls having from two to fifteen carbon atoms ($C_2$-$C_{15}$ heterocycloalkyl), from two to ten carbon atoms ($C_2$-$C_{10}$ heterocycloalkyl), from two to eight carbon atoms ($C_2$-$C_8$ heterocycloalkyl), from two to six carbon atoms ($C_2$-$C_6$ heterocycloalkyl), from two to five carbon atoms ($C_2$-$C_5$ heterocycloalkyl), or two to four carbon atoms ($C_2$-$C_4$ heterocycloalkyl). In some embodiments, the heterocycloalkyl is a 3- to 6-membered heterocycloalkyl. In some embodiments, the heterocycloalkyl is a 5- to 6-membered heterocycloalkyl. In some embodiments, the heterocycloalkyl is a 4- to 8-membered heterocycloalkyl. Examples of such heterocycloalkyl radicals include, but are not limited to, aziridinyl, azetidinyl, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxothiomorpholinyl, 1,1-dioxo-thiomorpholinyl, 1,3-dihydroisobenzofuran-1-yl, 3-oxo-1,3-dihydroisobenzofuran-1-yl, methyl-2-oxo-1,3-dioxol-4-yl, and 2-oxo-1,3-dioxol-4-yl. In some embodiments, the heterocycloalkyl is 1,3,2-dioxaborolane, 1,3,2-dioxaborinane, or 1,3,2-dioxaborocane.

EXAMPLES

Example 1. Experimental Method for Beta-Lactamase Enzyme Assays

Part 1. Isolation of Beta-Lactamases.

E. coli BL21(DE3) bacterial cells carrying expression plasmids for the individual beta-lactamases (SHV-5, KPC-2, p99AmpC, CTX-M-15, CMY-2, IMP-1, NDM-1, VIM-2, OXA-1, and OXA 48; expressed as native untagged proteins), were grown in 1 L of Superbroth (Teknova Inc. Hollister, CA) supplemented with 100 µg/mL kanamycin selection and 1×5052 (0.5% glycerol, 0.05% glucose and 0.2% α-lactose) at 35° C. for 18-20 hours. Cells were harvested by centrifugation (4,000×g, 4° C., 20 min) and resuspended in 50 mL of 10 mM HEPES pH 7.5 (1/20 of the initial volume). The cells were lysed by sonication (5 pulses of 45 seconds) at 45 W on ice. The lysates were clarified by centrifugation at 10,000×g for 40 minutes at 4° C. Samples were diluted 5-fold in 50 mM sodium acetate pH 5.0, stored overnight at 4° C., after which they were centrifuged at 10,000×g for 30 minutes to clarify, and filtered through 0.45 µm filters. The samples were loaded onto a 5 mL Capto S sepharose cation exchange column (GE Healthcare) pre-equilibrated with 50 mM sodium acetate pH 5.0. The column was washed with 5 column volumes of 50 mM sodium acetate pH 5.0 to wash out unbound protein and a linear gradient of NaCl (0 to 500 mM) was used to elute the protein (over 16 CV) from the column. Fractions were assayed for beta-lactamase activity using Centa (Calbiochem, Gibbstown, NJ) or Nitrocefin (EMD Millipore chemicals, Darmstadt, Germany) as a reporter beta-lactamase substrate for activity in the isolated fractions. Active fractions were pooled, concentrated and further purified by gel filtration chromatography on a Superdex 75 prep grade gel filtration column (GE Healthcare, Piscataway, NJ) pre-equilibrated in 50 mM Hepes pH 7.5, 150 mM NaCl. Active fractions were pooled, concentrated, quantitated by BCA protein determination (Thermo Scientific, Rockford, IL), dialyzed into PBS and frozen at −80° C. in 20% glycerol until use.

For VIM-2 metallo beta-lactamase, the procedure was identical with the following exceptions, first the protein was not pH adjusted to pH 5 with 50 mM sodium acetate, second, the chromatography step was changed to a 5 ml Q sepharose anion exchange column pre-equilibrated with 50 mM Hepes pH 7.5, and elution of the protein was achieved by a linear gradient of NaCl (0-600 mM). Finally, the VIM-2 purification required a second run ($3^{rd}$ step) on the Q sepharose anion exchange column to achieve acceptable purity (>90%).

Part 2. Inhibition of Diverse Beta-Lactamases.

To determine the level of inhibition of beta-lactamase enzymes, Compound 2 was diluted in PBS at pH 7.4 to yield concentrations ranging from 100 to 0.00005 µM in 96-well microtiter plates. An equal volume of diluted enzyme stock was added, and the plates were incubated at 37° C. for 15 min. Nitrocefin was used as substrate for p99 AmpC, CMY-2, IMP-1, VIM-2 and OXA-1 and OXA-48, and dispensed into each well at a final concentration of 100 µM. Absorbance at 486 nm was immediately monitored for 10 min using a Biotek Powerwave XS2 microplate spectrophotometer using the GEN5 software package (Biotek Instruments, Winooski VT). In an analogous fashion, imipenem was used as substrate for KPC-2, and Cefotaxime was used for CTX-M-15 and SHV-5, while changes in absorbance upon hydrolysis of the beta-lactam ring were monitored at 300 nm and 260 nm respectively in UV-transparent 96-well microtiter assay plates. Maximum rates of hydrolysis were compared to those in control wells (without inhibitors), and percentages of enzyme inhibition were calculated for each concentration of inhibitor. The concentration of inhibitor needed to reduce the initial rate of hydrolysis of substrate by 50% ($IC_{50}$) was calculated as the residual activity of beta-lactamase at 486 nm using GraFit version 7 kinetics software package (Erithacus Software, Surrey, UK).

Using the methodology described above, Compound 2 was evaluated for the ability to inhibit beta-lactamase enzymes from all four Ambler classifications (A through D). The results of these assays are summarized in Table 1 for representative enzymes across different subtypes (note SHV-5 represents an Ambler Class A Extended Spectrum beta-Lactamases, KPC-2 exemplifies a Class A carbapenemase, AmpC represents a chromosomal Class C, OXA-1 and OXA-48 represent Class D oxacillinases, and VIM-2, NDM-1, and IMP-1 represent Class B zinc-dependent metallo-beta-lactamases also possessing carbapenemase activity).

Steady state kinetic parameters for reversible inhibition of beta-lactam hydrolysis by Compound 2 were determined with a subset of enzymes (Table 2). The onset of inhibition, or rate of covalent complex formation ($k_2/K_i$), was determined by monitoring the progress of beta-lactam hydrolysis by the respective enzymes in the presence of increasing concentrations of Compound 2. Assays (200 µl final volume) were performed in PBS in triplicate using 96-well microtiter plates. Cephalothin was used as the substrate for p99 AmpC and CTX-M-15 (50 µM for p99 AmpC; 75 µM for CTX-M-15) and reactions were initiated by addition of enzyme (0.2 nM p99 AmpC; 3 nM CTX-M-15). The decrease in the absorbance at λ260 nm was recorded continuously on a BioTek Powerwave XS2 microplate reader. The concentrations of Compound 2 tested were: 20 µM, 10 µM, 5 µM, 2.5 µM, 1.25 µM, 0.625 µM, 0.313 µM, 0.156 µM, 0.0781 µM, 0.0391 µM, 0.0195 µM and 0 µM. SHV-5 reactions were initiated with 40 nM enzyme, using cefotaxime (100 µM) as the substrate. The concentrations of Compound 2 were as above, and the reaction progress monitored continuously by measuring the reduction in absorbance at λ260 nm. For KPC-2, imipenem (75 µM) was used as the substrate, and reactions initiated with 3 nM enzyme. Reaction progress was monitored by measuring the reduction in absorbance at λ300 nm in continuous fashion. The concentrations of Compound 2 tested were: 10 µM, 5 µM, 2.5 µM, 1.25 µM, 0.625 µM, 0.313 µM, 0.156 µM, 0.0781 µM, 0.0391 µM, 0.0195 µM, 0.0098 and 0 µM. Time courses for reaction progress were fit to the following equation, using Prism 7.04 (GraphPad Software, LaJolla, USA) to obtain $k_{obs}$:

$$A_i = A_0 + v_s t + (v_0 - v_s)\left[\frac{1 - e^{-k_{obs}t}}{k_{obs}}\right]$$

In the above equation, $A_i$ is the observed absorbance, $A_0$ the initial absorbance, $v_0$ the initial velocity, $v_s$ the steady state velocity and t, is time. $k_2/K_i$ was subsequently derived using the following equation, where [I] is the concentration of Compound 2, [S] the substrate concentration and $K_m$ the Michaelis constant for the substrate:

$$k_{obs} = k_{-2} + \frac{k_2}{K_i}\left[\frac{[I]}{1 + \frac{[S]}{K_m}}\right]$$

Off-rates for Compound 2 with the various beta-lactamases were determined by jump dilution experiments, performed in triplicate. Enzyme and inhibitor were incubated at room temperature for 10 minutes. Enzyme:inhibitor complexes were then diluted 800-fold into reaction buffer (50 mM Hepes, pH 7.0, 0.1 mg/ml BSA), and 20 µL of the diluted reaction immediately added to 180 µl of 110 µM nitrocefin in a 96-well microtiter plate, and the absorbance at λ 486 nm measured continuously on a BioTek Powerwave XS2 microplate reader. The resulting progress curves were fit to a single exponential, from which $k_{off}$ was derived. Half-life was determined using:

$$t_{1/2} = \frac{0.693}{k_{off}}$$

To determine $K_i$, plots of the inhibitor concentration versus inverse the initial velocity were fit to a linear equation, and the observed $K_i$ corrected for substrate concentration and affinity by:

$$K_i = \frac{K_{i\ observed}}{1 + \frac{[S]}{K_m}}$$

TABLE 1

Enzyme inhibition of Compound 2 against representative beta-lactamase enzymes from Ambler Classes A, B, C and D.

| Amber Class | Enzyme | IC$_{50}$ (µM) |
|---|---|---|
| Class A (serine-based) | CTX-M-15 | 0.018 |
| | KPC-2 | 0.08 |
| | SHV-5 | 0.368 |
| Class C (serine-based) | p99 AmpC | 0.014 |
| | CMY-2 | 0.014 |
| Class D (serine-based) | OXA-1 | 0.066 |
| | OXA-48 | 0.317 |
| Class B (metallo-based) | VIM-2 | 9.04 |
| | NDM-1 | 38.1 |
| | IMP-1 | >100 |

TABLE 2

Kinetic parameters of beta-lactamase inhibition by Compound 2.

| Enzyme | $k_2/K_i$ ($10^4$ M$^{-1}$ s$^{-1}$) | $k_{-2}$ ($10^{-4}$ s$^{-1}$) | $t_{1/2}$ (min) | $K_i$ (µM) |
|---|---|---|---|---|
| KPC-2 | 2.9 ± 0.07 | 2.5 ± 0.1 | 46 ± 2.0 | 0.11 |
| CTX-M-15 | 4.8 ± 0.9 | 4.5 ± 0.1 | 26 ± 0.6 | 0.01 |
| SHV-5 | 1.1 ± 0.16 | 12.7 ± 0.07 | 6.5 ± 0.04 | 0.041 |
| p99 AmpC | 6.0 ± 0.6 | 24 ± 0.5 | 5.0 ± 0.1 | 0.02 |

Example 2: In Vitro Antibacterial Assays Demonstrating Potentiation of Beta-Lactam Antibiotics by Beta-Lactamase Inhibition To determine the ability of test compounds to potentiate the antibacterial activity of various oral cephalosporins against beta-lactamase expressing Enterobacteriaceae, classic cell-based broth microdilution MIC assays were employed. A panel of 40 E. coli and K. pneumoniae with elevated cephalosporin MICs were used. These isolates were molecularly characterized and known to produce various Ambler Class A, Extended Spectrum beta-lactamase (ESBL). The assay was conducted in Cation Adjusted Mueller Hinton Broth (CAMHB, BD #212322, BD Diagnostic Systems, Sparks, MD). Bacteria strains were grown for 3-5 hours in CAMBH broth. Ceftibuten (#SML0037-50MG, Sigma, St Louis, MO), cefixime (#1097658, USP, Rockville, MD), cefdinir (#C7118-1G, Sigma, St Louis, MO), cephalexin (#15085, MP Biomedicals, Solon, OH), cefpodoxime (#1098027, Rockville, MD) were added either alone to a microtiter plate in 2-fold serial dilutions in CAMHB or in combination with beta-lactamase inhibitors (BLI) at fixed concentration. Compound 2 was added to each test cephalosporin at fixed concentrations of 1 µg/mL, 2 µg/mL, and 4 µg/mL and clavulanic acid was added at 4 µg/mL. Once the test articles are added, the plates can be inoculated according to CLSI broth microdilution method. After inoculation, the plates are incubated for 16-20 hours at 37° C. then the Minimal Inhibitory Concentration (MIC) of the test compound is determined visually. Comparison of the MIC data from antibiotic alone with the BLI-cephalosporin combination serves as a measure of the potentiation.

Table 3 lists the MIC data for ceftibuten titrated against a set of forty ESBL-producing strains of Enterobacteriaceae, alone and in combination with Compound 2 or clavulanic acid at the fixed concentrations listed. Table 4 provides the beta-lactamase content for this set of strains.

TABLE 3

Minimum Inhibitory Concentrations of ceftibuten (CTB) in combination with Compound 2 (fixed at 1, 2, or 4 µg/mL) or clavulanic acid (4 µg/mL) in a panel of ESBL-producing Enterobacteriaceae.

| Species | Strain | Compound 2 (Fixed Concentration) | | | Clavulanic acid | CTB |
| | | 1 µg/mL | 2 µg/mL | 4 µg/mL | 4 µg/mL | alone |
|---|---|---|---|---|---|---|
| E. coli | 1924 | 0.125 | 0.25 | 0.125 | 0.5 | 0.5 |
| E. coli | 2150 | 0.125 | 0.125 | 0.06 | 0.5 | 0.5 |
| E. coli | 2806 | 0.06 | 0.125 | 0.125 | 0.25 | 2 |
| E. coli | 3174 | 0.125 | 0.25 | 0.25 | 0.5 | 0.5 |
| E. coli | 3327 | 0.25 | 0.25 | 0.25 | 1 | 8 |
| E. coli | BAS 1 | 1 | 1 | 0.5 | >32 | >32 |
| E. coli | ESBL 2 | 0.125 | 0.125 | 0.125 | 4 | 8 |

TABLE 3-continued

Minimum Inhibitory Concentrations of ceftibuten (CTB) in combination with Compound 2 (fixed at 1, 2, or 4 µg/mL) or clavulanic acid (4 µg/mL) in a panel of ESBL-producing *Enterobacteriaceae*.

| Species | Strain | Compound 2 (Fixed Concentration) | | | Clavulanic acid | CTB |
|---|---|---|---|---|---|---|
| | | 1 µg/mL | 2 µg/mL | 4 µg/mL | 4 µg/mL | alone |
| E. coli | ESBL 4 | 0.25 | 0.125 | 0.25 | 0.5 | >32 |
| E. coli | ESBL 5 | 0.25 | 0.125 | 0.125 | 0.5 | >32 |
| E. coli | SI-AIRT-4 | 0.06 | 0.06 | 0.06 | 0.5 | 0.5 |
| E. coli | Si-FDL-GES | 0.125 | 0.125 | 0.125 | 0.25 | 0.5 |
| E. coli | SI-LP377 | 0.125 | 0.125 | 0.125 | 0.125 | 4 |
| E. coli | SI-M004 | 0.25 | 0.125 | 0.125 | 0.5 | 32 |
| E. coli | SI-NO36 | 0.06 | 0.125 | 0.06 | 0.25 | 0.5 |
| E. coli | SI-PBLII | 0.125 | 0.125 | 0.125 | 0.5 | 0.5 |
| E. coli | SI-V502 | 0.25 | 0.25 | 0.125 | 0.5 | 0.5 |
| E. coli | 25922 | 0.125 | 0.06 | 0.06 | 0.5 | 0.25 |
| K. oxytoca | 169219 | 0.03 | 0.0149 | 0.0149 | 0.0149 | 4 |
| K. oxytoca | 176877 | 0.5 | 0.125 | 0.25 | 0.125 | 4 |
| K. oxytoca | 496 #2 | 0.125 | 0.125 | 0.125 | 0.125 | 8 |
| K. pneumoniae | 3151 | 1 | 0.25 | 0.25 | 0.06 | >32 |
| K. pneumoniae | 115468 | 0.06 | 0.06 | 0.06 | 0.25 | 8 |
| K. pneumoniae | 153239 | 0.06 | 0.125 | 0.06 | 0.06 | 0.25 |
| K. pneumoniae | 170375 | 0.06 | 0.06 | 0.06 | 0.06 | 32 |
| K. pneumoniae | 304487 | 0.25 | 0.25 | 0.25 | 0.125 | 8 |
| K. pneumoniae | 319478 | 0.125 | 0.25 | 0.125 | 0.06 | >32 |
| K. pneumoniae | 329633 | 0.06 | 0.06 | 0.06 | 0.03 | 16 |
| K. pneumoniae | 11/23 LF#2 | 0.25 | 0.25 | 0.125 | 0.25 | 2 |
| K. pneumoniae | ESBL 10 | 0.25 | 0.25 | 0.25 | 0.125 | 16 |
| K. pneumoniae | ESBL 7 #1 | 0.25 | 0.25 | 0.125 | 0.125 | 32 |
| K. pneumoniae | ESBL 8 #1 | 0.25 | 0.125 | 0.06 | 0.03 | 16 |
| K. pneumoniae | ESBL 8 #2 | 0.125 | 0.125 | 0.06 | 0.06 | 16 |
| K. pneumoniae | ESBL 7 #2 | 4 | 2 | 1 | >32 | >32 |
| K. pneumoniae | KI (KCl) | 0.125 | 0.06 | 0.125 | 0.06 | 1 |
| K. pneumoniae | KP 3 | 0.25 | 0.25 | 0.125 | 0.125 | 2 |
| K. pneumoniae | KP 4 | 0.25 | 0.125 | 0.125 | 2 | 32 |
| K. pneumoniae | KP 8 | 0.06 | 0.03 | 0.03 | 0.06 | 0.25 |
| K. pneumoniae | KPN 508 | 0.125 | 0.125 | 0.06 | 0.06 | 32 |
| K. pneumoniae | SI-KP NO30 | 0.06 | 0.06 | 0.06 | 0.06 | 0.25 |
| K. pneumoniae | BAA 1705 | 0.5 | 0.5 | 0.25 | 8 | 32 |

TABLE 4

Beta-Lactamases expressed in test set of Enterobacteriaceae strains.

| Species | Strain | Enzyme |
|---|---|---|
| E. coli | 1924 | TEM-12 |
| E. coli | 2150 | SHV-3, TEM-1 |
| E. coli | 2806 | SHV-12, TEM-1 |
| E. coli | 3174 | TEM-1, CTXM-15 |
| E. coli | 3327 | TEM-1, SHV-12 |
| E. coli | BAS 1 | none detected |
| E. coli | ESBL 2 | TEM-1 |
| E. coli | ESBL4 | CTX-M15, TEM-1 |
| E. coli | ESBL5 | CTX-M15, TEM-1 |
| E. coli | SI-AIRT-4 | TEM-1 |
| E. coli | Si-FDL-GES | GES-5 |
| E. coli | SI-LP377 | CTX-M2 |
| E. coli | SI-M004 | SHV-2, GES-12 |
| E. coli | SI-NO36 | SHV-11, TEM-1 |
| E. coli | SI-PBLII | CTX-M2, TEM-1 |
| E. coli | SI-V502 | TEM-29, CTX-M15 |
| E. coli | 25922 | None detected |
| K. oxytoca | 169219 | TEM-1, CTXM-15 |
| K. oxytoca | 176877 | SHV-105 |
| K. oxytoca | 496 #2 | SHV-105, TEM-1 |
| K. pneumoniae | 3151 | SHV-12, TEM-1 |
| K. pneumoniae | 115468 | TEM-1 |
| K. pneumoniae | 153239 | SHV-11, TEM-1 |
| K. pneumoniae | 170375 | SHV-12, CTX-M15 and TEM-1 |
| K. pneumoniae | 304487 | SHV-12,TEM-1 |
| K. pneumoniae | 319478 | SHV-12, CTX-M3 and TEM-1 |
| K. pneumoniae | 329633 | SHV-5, TEM-1 |
| K. pneumoniae | 11/23 LF#2 | SHV-11, GES-5 |
| K. pneumoniae | ESBL 10 | SHV-12, TEM-1 |
| K. pneumoniae | ESBL 7 #1 | SHV-12, TEM-1 |
| K. pneumoniae | ESBL 8 #1 | TEM-1, SHV-12 |
| K. pneumoniae | ESBL 8 #2 | SHV-12, TEM-1 |
| K. pneumoniae | ESBL7 #2 | SHV-12, CTX-M15, TEM-1 |
| K. pneumoniae | KI (KCl) | TEM-10 |
| K. pneumoniae | KP 3 | SHV-1, TEM-1 |
| K. pneumoniae | KP 4 | SHV-2a, SHV-5, TEM-1 |
| K. pneumoniae | KP 8 | TEM-10, TEM-1, CTX-M15 |
| K. pneumoniae | KPN 508 | SHV-7, TEM-1 |
| K. pneumoniae | SI-KP NO30 | TEM-26b, SHV-60, SHV-26 |

Table 5 lists MIC data for cefdinir in combination with Compound 2 or clavulanic acid in this panel of ESBL Enterobacteriaceae.

TABLE 5

Minimum Inhibitory Concentrations of cefdinir (CDR) in combination with Compound 2 (fixed at 1, 2, or 4 µg/mL) or clavulanic acid (4 µg/mL), in a panel of ESBL *Enterobacteriaceae*.

| Species | Strain | Compound 2 (Fixed Concentration) | | | Clavulanic acid | CDR |
|---|---|---|---|---|---|---|
| | | 1 µg/mL | 2 µg/mL | 4 µg/mL | 4 µg/mL | alone |
| E. coli | 1924 | 0.5 | 0.25 | 0.25 | 0.5 | 2 |
| E. coli | 2150 | 1 | 0.5 | 0.5 | 0.5 | >32 |
| E. coli | 2806 | 0.125 | 0.125 | 0.25 | 0.25 | 4 |
| E. coli | 3174 | 0.25 | 0.25 | 0.125 | 0.25 | 1 |
| E. coli | 3327 | 0.5 | 0.5 | 0.5 | 0.5 | 16 |
| E. coli | BAS 1 | 1 | 1 | 2 | 16 | >32 |
| E. coli | ESBL 2 | 0.5 | 0.5 | 0.25 | >32 | >32 |
| E. coli | ESBL 4 | 2 | 1 | 0.5 | 1 | >32 |
| E. coli | ESBL 5 | 8 | 2 | 2 | 1 | >32 |
| E. coli | SI-AIRT-4 | 0.25 | 0.25 | 0.25 | 0.25 | 0.25 |
| E. coli | Si-FDL-GES | 0.5 | 0.5 | 0.5 | 1 | >32 |
| E. coli | SI-LP377 | 4 | 1 | 1 | 1 | >32 |
| E. coli | SI-M004 | 0.5 | 0.5 | 0.5 | 0.5 | 32 |
| E. coli | SI-NO36 | 0.125 | 0.125 | 0.25 | 0.25 | 4 |
| E. coli | SI-PBLII | 0.25 | 0.25 | 0.25 | 0.5 | 2 |

TABLE 5-continued

Minimum Inhibitory Concentrations of cefdinir (CDR) in combination with Compound 2 (fixed at 1, 2, or 4 µg/mL) or clavulanic acid (4 µg/mL), in a panel of ESBL *Enterobacteriaceae*.

| Species | Strain | Compound 2 (Fixed Concentration) | | | Clavulanic acid | CDR |
|---|---|---|---|---|---|---|
| | | 1 µg/mL | 2 µg/mL | 4 µg/mL | 4 µg/mL | alone |
| *E. coli* | SI-V502 | 1 | 0.5 | 0.5 | 1 | 2 |
| *E. coli* | 25922 | 0.125 | 0.125 | 0.125 | 0.25 | 0.5 |
| *K. oxytoca* | 169219 | 1 | 0.5 | 0.5 | 0.25 | >32 |
| *K. oxytoca* | 176877 | 2 | 2 | 1 | 2 | 8 |
| *K. oxytoca* | 496 #2 | 0.25 | 0.25 | 0.06 | 0.06 | 16 |
| *K. pneumoniae* | 3151 | 2 | 1 | 0.5 | 0.125 | >32 |
| *K. pneumoniae* | 115468 | 0.5 | 0.25 | 0.125 | 0.06 | 8 |
| *K. pneumoniae* | 153239 | 0.5 | 0.25 | 0.25 | 0.25 | 2 |
| *K. pneumoniae* | 170375 | 8 | 4 | 2 | 1 | >32 |
| *K. pneumoniae* | 304487 | 1 | 1 | 2 | 0.5 | 8 |
| *K. pneumoniae* | 319478 | 4 | 2 | 2 | 0.5 | >32 |
| *K. pneumoniae* | 329633 | 0.25 | 0.25 | 1 | 0.25 | 16 |
| *K. pneumoniae* | 11/23 LF#2 | 0.25 | 0.5 | 0.25 | 0.5 | 2 |
| *K. pneumoniae* | ESBL 10 | 1 | 1 | 0.5 | 0.5 | 16 |
| *K. pneumoniae* | ESBL 7 #1 | 0.5 | 1 | 0.5 | 0.5 | 32 |
| *K. pneumoniae* | ESBL 8 #1 | 0.25 | 0.125 | 0.25 | 0.06 | 16 |
| *K. pneumoniae* | ESBL 8 #2 | 0.5 | 0.25 | 0.25 | 0.125 | 16 |
| *K. pneumoniae* | ESBL 7 #2 | >32 | 32 | 16 | >32 | >32 |
| *K. pneumoniae* | KI (KCl) | 0.125 | 0.125 | 0.125 | 0.125 | 1 |
| *K. pneumoniae* | KP 3 | 0.5 | 0.25 | 0.5 | 1 | 4 |
| *K. pneumoniae* | KP 4 | 0.5 | 0.5 | 0.125 | 0.125 | 8 |
| *K. pneumoniae* | KP 8 | 0.25 | 0.125 | 0.125 | 0.125 | 0.5 |
| *K. pneumoniae* | KPN 508 | 0.5 | 0.25 | 0.5 | 0.125 | 32 |
| *K. pneumoniae* | SI-KP NO30 | 0.125 | 0.25 | 0.125 | 0.125 | 0.5 |
| *K. pneumoniae* | BAA 1705 | 4 | 2 | 1 | >32 | >32 |

Table 6 lists MIC data for cefalexin in combination with Compound 2 or clavulanic acid in this panel of ESBL Enterobacteriaceae.

TABLE 6

Minimum Inhibitory Concentrations of cefalexin (LEX) in combination with Compound 2 (fixed at 1, 2, or 4 µg/mL) or clavulanic acid (4 µg/mL), in a panel of ESBL *Enterobacteriaceae*.

| Species | Strain | Compound 2 (Fixed Concentration) | | | Clavulanic acid | LEX |
|---|---|---|---|---|---|---|
| | | 1 µg/mL | 2 µg/mL | 4 µg/mL | 4 µg/mL | alone |
| *E. coli* | 1924 | 0.5 | 0.25 | 0.25 | 0.5 | 2 |
| *E. coli* | 2150 | 1 | 0.5 | 0.5 | 0.5 | >32 |
| *E. coli* | 2806 | 0.125 | 0.125 | 0.25 | 0.25 | 4 |
| *E. coli* | 3174 | 0.25 | 0.25 | 0.125 | 0.25 | 1 |
| *E. coli* | 3327 | 0.5 | 0.5 | 0.5 | 0.5 | 16 |
| *E. coli* | BAS 1 | 1 | 1 | 2 | 16 | >32 |
| *E. coli* | ESBL 2 | 0.5 | 0.5 | 0.25 | >32 | >32 |
| *E. coli* | ESBL 4 | 2 | 1 | 0.5 | 1 | >32 |
| *E. coli* | ESBL 5 | 8 | 2 | 2 | 1 | >32 |
| *E. coli* | SI-AIRT-4 | 0.25 | 0.25 | 0.25 | 0.25 | 0.25 |
| *E. coli* | Si-FDL-GES | 0.5 | 0.5 | 0.5 | 1 | >32 |
| *E. coli* | SI-LP377 | 4 | 1 | 1 | 1 | >32 |
| *E. coli* | SI-M004 | 0.5 | 0.5 | 0.5 | 0.5 | 32 |
| *E. coli* | SI-NO36 | 0.125 | 0.125 | 0.25 | 0.25 | 4 |
| *E. coli* | SI-PBLII | 0.25 | 0.25 | 0.25 | 0.5 | 2 |
| *E. coli* | SI-V502 | 1 | 0.5 | 0.5 | 1 | 2 |
| *E. coli* | 25922 | 0.125 | 0.125 | 0.125 | 0.25 | 0.5 |
| *K. oxytoca* | 169219 | 1 | 0.5 | 0.5 | 0.25 | >32 |
| *K. oxytoca* | 176877 | 2 | 2 | 1 | 2 | 8 |
| *K. oxytoca* | 496 #2 | 0.25 | 0.25 | 0.06 | 0.06 | 16 |
| *K. pneumoniae* | 3151 | 2 | 1 | 0.5 | 0.125 | >32 |
| *K. pneumoniae* | 115468 | 0.5 | 0.25 | 0.125 | 0.06 | 8 |
| *K. pneumoniae* | 153239 | 0.5 | 0.25 | 0.25 | 0.25 | 2 |
| *K. pneumoniae* | 170375 | 8 | 4 | 2 | 1 | >32 |
| *K. pneumoniae* | 304487 | 1 | 1 | 2 | 0.5 | 8 |
| *K. pneumoniae* | 319478 | 4 | 2 | 2 | 0.5 | >32 |
| *K. pneumoniae* | 329633 | 0.25 | 0.25 | 1 | 0.25 | 16 |
| *K. pneumoniae* | 11/23 LF#2 | 0.25 | 0.5 | 0.25 | 0.5 | 2 |
| *K. pneumoniae* | ESBL 10 | 1 | 1 | 0.5 | 0.5 | 16 |
| *K. pneumoniae* | ESBL 7 #1 | 0.5 | 1 | 0.5 | 0.5 | 32 |
| *K. pneumoniae* | ESBL 8 #1 | 0.25 | 0.125 | 0.25 | 0.06 | 16 |
| *K. pneumoniae* | ESBL 8 #2 | 0.5 | 0.25 | 0.25 | 0.125 | 16 |
| *K. pneumoniae* | ESBL 7 #2 | >32 | 32 | 16 | >32 | >32 |
| *K. pneumoniae* | KI (KCl) | 0.125 | 0.125 | 0.125 | 0.125 | 1 |
| *K. pneumoniae* | KP 3 | 0.5 | 0.25 | 0.5 | 1 | 4 |
| *K. pneumoniae* | KP 4 | 0.5 | 0.5 | 0.125 | 0.125 | 8 |
| *K. pneumoniae* | KP 8 | 0.25 | 0.125 | 0.125 | 0.125 | 0.5 |
| *K. pneumoniae* | KPN 508 | 0.5 | 0.25 | 0.5 | 0.125 | 32 |
| *K. pneumoniae* | SI-KP NO30 | 0.125 | 0.25 | 0.125 | 0.125 | 0.5 |
| *K. pneumoniae* | BAA 1705 | 4 | 2 | 1 | >32 | >32 |

Table 7 lists MIC data for cefixime in combination with Compound 2 or clavulanic acid in this panel of ESBL Enterobacteriaceae.

TABLE 7

Minimum Inhibitory Concentrations of cefixime (CFM) in combination with Compound 2 (fixed at 1, 2, or 4 µg/mL) or clavulanic acid (4 µg/mL), in a panel of ESBL Enterobacteriaceae.

| Species | Strain | Compound 2 (Fixed Concentration) 1 µg/mL | 2 µg/mL | 4 µg/mL | Clavulanic acid 4 µg/mL | CFM alone |
|---|---|---|---|---|---|---|
| E. coli | 1924 | 0.5 | 0.5 | 0.25 | 1 | 2 |
| E. coli | 2150 | 0.5 | 0.5 | 0.25 | 1 | >32 |
| E. coli | 2806 | 0.25 | 0.125 | 0.125 | 1 | 32 |
| E. coli | 3174 | 0.06 | 0.125 | 0.06 | 0.5 | 0.5 |
| E. coli | 3327 | 1 | 0.5 | 0.5 | 2 | >32 |
| E. coli | BAS 1 | 8 | 2 | 1 | >32 | >32 |
| E. coli | ESBL 2 | 0.25 | 0.25 | 0.125 | 32 | >32 |
| E. coli | ESBL 4 | 0.5 | 0.25 | 0.25 | 1 | >32 |
| E. coli | ESBL 5 | 1 | 1 | 0.5 | 1 | >32 |
| E. coli | SI-AIRT-4 | 0.125 | 0.125 | 0.06 | 0.25 | 0.5 |
| E. coli | Si-FDL-GES | 0.25 | 0.125 | 0.125 | 0.5 | 2 |
| E. coli | SI-LP377 | 0.5 | 0.25 | 0.125 | 0.5 | >32 |
| E. coli | SI-M004 | 4 | 4 | 1 | 1 | >32 |
| E. coli | SI-NO36 | 0.5 | 0.25 | 0.5 | 0.5 | 1 |
| E. coli | SI-PBLII | 0.25 | 0.25 | 0.25 | 1 | 1 |
| E. coli | SI-V502 | 0.25 | 0.5 | 0.25 | 1 | 2 |
| E. coli | 25922 | 0.125 | 0.06 | 0.06 | 0.5 | 1 |
| K. oxytoca | 169219 | 0.25 | 0.125 | 0.125 | 0.125 | >32 |
| K. oxytoca | 176877 | 1 | 0.5 | 0.5 | 0.25 | >32 |
| K. oxytoca | 496 #2 | 0.25 | 0.125 | 0.06 | 0.03 | 32 |
| K. pneumoniae | 3151 | 16 | 8 | 2 | 0.125 | >32 |
| K. pneumoniae | 115468 | 2 | 0.5 | 0.5 | 0.125 | >32 |
| K. pneumoniae | 153239 | 0.125 | 0.5 | 0.25 | 0.25 | 0.5 |
| K. pneumoniae | 170375 | 1 | 1 | 1 | 0.5 | >32 |
| K. pneumoniae | 304487 | 1 | 1 | 0.5 | 0.25 | >32 |
| K. pneumoniae | 319478 | 2 | 2 | 1 | 0.5 | >32 |
| K. pneumoniae | 329633 | 1 | 0.5 | 0.5 | 0.03 | >32 |
| K. pneumoniae | 11/23 LF#2 | 4 | 2 | 1 | 2 | >32 |
| K. pneumoniae | ESBL 10 | 2 | 1 | 0.5 | 0.125 | >32 |
| K. pneumoniae | ESBL 7 #1 | 4 | 4 | 1 | 0.25 | >32 |
| K. pneumoniae | ESBL 8 #1 | 2 | 0.5 | 0.25 | 0.06 | >32 |
| K. pneumoniae | ESBL 8 #2 | 2 | 1 | 0.5 | 0.03 | >32 |
| K. pneumoniae | ESBL 7 #2 | 8 | 8 | 1 | >32 | >32 |
| K. pneumoniae | KI (KCl) | 1 | 1 | 0.25 | 0.125 | 32 |
| K. pneumoniae | KP 3 | 4 | 4 | 2 | 0.5 | >32 |
| K. pneumoniae | KP 4 | 2 | 0.5 | 0.25 | 0.125 | >32 |
| K. pneumoniae | KP 8 | 0.25 | 0.125 | 0.125 | 0.06 | >32 |
| K. pneumoniae | KPN 508 | 4 | 1 | 0.5 | 0.25 | >32 |
| K. pneumoniae | SI-KP NO30 | 0.5 | 0.25 | 0.25 | 0.06 | >32 |
| K. pneumoniae | BAA 1705 | 0.5 | 0.5 | 0.25 | >32 | >32 |

Summary MIC data ($MIC_{50}$, the concentration inhibiting growth of 50% of the strains in the panel, and $MIC_{90}$, the concentration inhibiting growth of 90% of the strains) are shown in Table 8. This data indicates that Compound 2, in combination with Ceftibuten, provides superior antibacterial activities across the range of ESBL-producing Enterobacteriaceae.

TABLE 8

Summary of Minimum Inhibitory Concentrations of cephalosporins in combinations with Compound 2 (fixed at 1, 2, or 4 µg/mL) or clavulanic acid (4 µg/mL) for 50% ($MIC_{50}$, µg/mL) and 90% ($MIC_{90}$, µg/mL) of tested strains of Enterobacteriaceae.

| Antibiotic | | Compd 2 (1 µg/mL) | Compd 2 (2 µg/mL) | Compd 2 (4 µg/mL) | Clavulanic Acid (4 µg/mL) | No BLI |
|---|---|---|---|---|---|---|
| Ceftibuten | $MIC_{50}$ | 0.125 | 0.125 | 0.125 | 0.25 | 8 |
| | $MIC_{90}$ | 0.5 | 0.25 | 0.25 | 2 | >32 |
| Cefixime | $MIC_{50}$ | 1 | 0.5 | 0.25 | 0.5 | >32 |
| | $MIC_{90}$ | 4 | 4 | 1 | 2 | >32 |
| Cefdinir | $MIC_{50}$ | 0.5 | 0.5 | 0.5 | 0.5 | 16 |
| | $MIC_{90}$ | 4 | 2 | 2 | 2 | >32 |
| Cephalexin | $MIC_{50}$ | 8 | 8 | 8 | 16 | >32 |
| | $MIC_{90}$ | 32 | 32 | 16 | 32 | >32 |
| Cefpodoxime | $MIC_{50}$ | 1 | 1 | 1 | 0.5 | >32 |
| | $MIC_{90}$ | 8 | 2 | 2 | 4 | >32 |

Example 3. In Vivo Efficacy in a Murine Septicemia Infection Model

In vivo efficacy studies with Compound 1 were conducted (Dr. W. Weiss, U. North Texas Health Sciences Center) in the lethal murine model of septicemia, using a K. pneumoniae strain (UNT-023) expressing KPC-2 (in analogy to the procedure described in Endimiani, A., et al., Antimicrob. Agents Chemother. 2011, 55(1), pp 82-85). The inoculum for the strain was titrated to produce 100% mortality in five days after intraperitoneal inoculation. Mice were administered compounds 1 h post-inoculation. Dosing groups (five animals per group) compared ceftibuten alone administered by oral gavage at 8-128 mg/kg versus ceftibuten plus Compound 1 given by oral gavage in a 1:1 ratio (2-32 mg/kg). Table 9 shows that Compound 1 demonstrated striking rescue of ceftibuten in this lethal septicemia model, with the 50% effective dose ($EC_{50}$) values shown. The results confirm that Compound 1, orally-delivered in combination with ceftibuten, is efficacious against Class A beta-lactamase producing Enterobacteriaceae.

TABLE 9

Proof of Concept - In vivo rescue of Ceftibuten by Compound 1 in a lethal murine septicemia model of infection - K. pneumoniae (UNT-023, KPC-2 producing).

| Dosing Group (Oral) | MIC (µg/mL) vs. K. pneumoniae UNT-023 (KPC-2) | $ED_{50}$ (mg/kg PO) | 95% Confidence Interval |
|---|---|---|---|
| CTB alone | >128 | >128 | — |
| CTB + Compound 1 | 0.5 | 12.9 | 9.8-17.2 |

Example 4: In Vivo Efficacy in a Murine Urinary Tract Infection Model

In vivo efficacy studies with Compound 2 were conducted (Dr. W. Weiss, U. North Texas Health Sciences Center) in a murine model of pyelonephritis, using an E. coli strain (UNT-204-1) expressing TEM-1 and CTX-M-15 beta-lactamases (performed according to the procedure described in Weiss, W. J., et al., *Antimicrob. Agents Chemother.* 2018, 62(1), e01439-17). To establish the ascending UTI model, female C3H/HeJ mice were placed on 5% glucose water for 6 days and then transurethrally infected with approximately 9 $\log_{10}$ CFU of each bacterial isolate to establish kidney infection. Treatment was initiated on day 5 following inoculation, and dosing groups (five animals per group) compared ceftibuten alone (3-300 mg/kg), ceftibuten plus Compound 2 in a 1:1 ratio (3-300 mg/kg), and amoxicillin-clavulanate in a 2:1 ratio (10-300 mg/kg amoxicillin, 5-150 mg/kg clavulanate), administered by subcutaneous injection twice daily for 3 days. Animals were euthanized 2 h following the last dose of test article on post-inoculation day 7, and bacterial counts was determined in kidneys, bladder, and urine, and compared across dosing groups and untreated controls. Table 10 shows that Compound 2 demonstrated striking rescue of ceftibuten in this model. In the kidneys, ceftibuten (100 mg/kg) plus Compound 2 (100 mg/kg) reduced the bacterial load by an average of 3.17 $\log_{10}$ CFU, compared with a reduction of 2.11 $\log_{10}$ CFU for ceftibuten alone (100 mg/kg), or 1.55 $\log_{10}$ CFU reduction for amoxicillin-clavulanate (100 mg/kg+50 mg/kg, respectively). Similar improvements in reduction of bacterial counts in bladder and urine were observed for the combination of Compound 2 with ceftibuten. The results show that Compound 2, delivered in combination with ceftibuten, is efficacious against Class A beta-lactamase producing Enterobacteriaceae in a model of urinary tract infections.

In vivo efficacy study of ceftibuten with and without Compound 2 was conducted (Dr. W. Weiss, U. North Texas Health Sciences Center) in the murine ascending UTI model with three strains of *E. coli* expressing TEM-1+CTX-M-15, CTX-M-15, and KPC-2+SHV-12. In the first part of the study, the MICs of ceftibuten and ceftibuten with Compound 2 at a fixed concentration of 4 µg/mL were determined against the test strains. Ceftibuten MICs were reduced from 8-64 µg/mL to <0.06-0.12 µg/mL with Compound 2.

The animals were prepared according to the procedure described in Weiss, W. J., et al., *Antimicrob. Agents Chemother.* 2018, 62(1), e01439-17. Treatments of ceftibuten alone, ceftibuten with Compound 2 at various dose ratios, and amoxicillin-clavulanate (2:1) (used as a comparator) were initiated four days post-infection and administered subcutaneously, every 12 hours for 3 days. Bacterial burdens in kidneys, bladders, and urine 18 hours after the final dose were quantitated by serial dilution plating and compared to those of untreated controls.

At Day 7 post-infection, mean bacterial titers for the three bacterial strains were 6.5 to 7.1 $\log_{10}$ CFU/g in kidney, 5.7 to 6.8 $\log_{10}$ CFU/g in bladder, and 5.9 to 7.2 $\log_{10}$ CFU/mL in urine for the untreated controls. Administration of ceftibuten alone from 1 to 300 mg/kg resulted in a dose response. There were minimal CFU reductions in the kidneys observed and up to 2 $\log_{10}$ CFU lower titers in the bladder and urine at ceftibuten doses of 100 and 300 mg/kg. The addition of Compound 2 to ceftibuten treatment resulted in increased efficacy, with bacterial titers that were up to 2 $\log_{10}$ CFU/g lower in kidneys (FIG. 5A, FIG. 5B, and FIG. 5C), 3.2 $\log_{10}$ CFU/g lower in bladders (FIG. 6A, FIG. 6B, and FIG. 6C), and up to 4 $\log_{10}$ CFU/mL lower in urine (FIG. 7A, FIG. 7B, and FIG. 7C) than ceftibuten alone at doses of 3, 10, 30, 100, and 300 mg/kg.

In this UTI study with *E. coli* isolates expressing ESBLs or a combination of ESBLs and KPC carbapenemase, co-administration of Compound 2 (1:1) further reduced the bacterial titers in kidneys, bladders, and urine when compared to ceftibuten alone. The results demonstrate that Compound 2 rescues ceftibuten activity in a UTI model against uropathogenic strains of *E. coli* expressing TEM-1+CTX-M-15, CTX-M-15, or KPC-2+SHV-12.

TABLE 10

In vivo rescue of Ceftibuten (CTB) by Compound 2 in a murine model of pyelonephritis infection - *E. coli* (UNT-204-1, TEM-1 plus CTX-M-15 producing).

| Test Article | Dose Group (mg/kg, SC, BID, 3 days) | $\log_{10}$ Change in CFU/Sample vs. untreated controls, Day 7 | | |
|---|---|---|---|---|
| | | Kidneys | Bladder | Urine |
| CTB alone | 300 | −2.14 | −1.83 | −3.37 |
| | 100 | −2.11 | −2.26 | −2.54 |
| | 30 | −1.57 | −2.08 | −2.28 |
| | 10 | −1.55 | −1.51 | −0.59 |
| | 3 | −0.44 | −0.03 | −1.24 |
| CTB + Compound 2 | 300:300 | −2.99 | −1.93 | −3.99 |
| | 100:100 | −3.17 | −2.75 | −3.53 |
| | 30:30 | −2.93 | −2.65 | −3.67 |
| | 10:10 | −2.59 | −2.12 | −3.71 |
| | 3:3 | −2.37 | −1.77 | −3.42 |
| Amoxicillin-Clavulanate | 300:150 | −3.01 | −1.62 | −2.41 |
| | 100:50 | −1.55 | −1.17 | −1.34 |
| | 30:15 | −1.48 | −0.96 | −0.28 |
| | 10:5 | −0.77 | −0.87 | −0.46 |

Example 5. Time-Kill Kinetic Analyses for Compound 2

Compound 2 was assessed for its ability to rescue ceftibuten to cidality (≤3 $\log_{10}$ killing) using time-kill experiments. Activity was determined against four beta-lactamase expressing Enterobacteriaceae (1 KPC, 1 p99, 1 CTX-M-15, and 1 OXA-48). Ceftibuten was diluted in macrodilution format either alone or with Compound 2 fixed at 4 µg/mL over a concentration range dictated by its MIC in that particular strain. Macrodilution tubes were incubated with shaking and bacterial amounts were quantified at 0, 2, 4, 6, 8, and 24 hours by limiting dilutions. Amoxicillin/clavulanic acid (2:1) was used as a comparator oral antibacterial. The data for all 4 strains are depicted in FIG. 1A, FIG. 1B, FIG. 1C, and FIG. 1D, and show that Compound 2 was able to rescue ceftibuten to a cidal endpoint through 24 hours. Similar responses were observed in all strains tested, even in those resistant to carbapenems. The results demonstrate that Compound 2 returns the beta-lactam ceftibuten to full cidality in time-kill experiments.

Example 6. Synergy and Antagonism of Compound 2 Plus Ceftibuten

The potential for synergy or antagonism between Compound 2 and a range of antibacterial agents was evaluated by measuring fractional inhibitory concentration (FIC) values in vitro using a broth microdilution "checkerboard" panel, in which the combination agents were tested both alone and together at varying concentration ratios. In this study, ceftibuten was titrated in the presence and absence of Compound 2 (fixed at 4 µg/mL) and compared to linezolid, rifampin, levofloxacin, nitrofurantoin and trimethoprim-sulfamethoxazole against six Enterobacteriaceae strains (5 expressing beta-lactamases and 1 wild-type). In addition, ceftibuten/Compound 2 was tested in combination with metronidazole against three representative anaerobic strains of bacteria, and in combination with fluconazole in three representative strains of yeast. Results are shown in Tables 11-13, wherein FICI ≤0.5=Synergy; >0.5-4=additive/indifferent; >4=antagonism. Importantly, antagonism was not observed between ceftibuten/Compound 2 and other agents tested.

TABLE 11

Fractional Inhibitory Concentration Index (FICI) for Ceftibuten/Compound 2 Combined with Antibacterial Agents Linezolid (LZD), Levofloxacin (LVX), Rifampin (RIF), Nitrofurantoin (NIT), or Trimethoprim-Sulfamethoxazole (SXT).

| Species | Strain ID | Enzyme Content | LZD | RIF | LVX | NIT | SXT |
|---|---|---|---|---|---|---|---|
| E. coli | ATCC 25922 | None | 0.48 | 1.34 | 1.33 | 1.03 | 1.22 |
| K. pneumoniae | ATCC BAA 1705 | KPC-2 | 1.00 | 1.15 | 0.71 | 1.00 | 1.00 |
| K. pneumoniae | ATCC 700603 | SHV-18 | 2.00 | 0.74 | 1.12 | 1.03 | 1.03 |
| E. coli | VER | OXA-48 | 0.50 | 1.12 | 1.21 | 1.08 | 1.47 |
| E. coli | ESBL 4 | CTX-M-15 | 0.50 | 0.86 | 1.10 | 0.72 | 1.33 |
| E. cloacae | SI-ECL01 | p99 | 0.42 | 0.58 | 0.98 | 0.96 | 1.05 |

TABLE 12

Fractional Inhibitory Concentration Index (FICI) for Ceftibuten/Compound 2 Combined with Metronidazole in Anaerobes.

| Species | Strain ID | Enzyme Content | FICI of Ceftibuten/Compound 2 with metronidazole |
|---|---|---|---|
| B. fragilis | ATCC 25285 | None | 0.55 |
| C. difficile | ATCC 700057 | None | 1.00 |
| B. thetaiotaomicron | ATCC 29741 | None | 1.00 |

TABLE 13

Fractional Inhibitory Concentration Index (FICI) for Ceftibuten/Compound 2 Combined with Fluconazole in Representative Strains of Yeast.

| Species | Strain ID | FICI of Ceftibuten/Compound 2 with Fluconazole |
|---|---|---|
| Candida albicans | ATCC 90028 | 0.88 |
| Candida tropicalis | ATCC 750 | 0.85 |
| Candida krusei | ATCC 6258 | 0.75 |

Example 7. Impact of Concentration on the Ability of Compound 2 to Rescue Ceftibuten in Enterobacteriaceae Expressing Class A, C, and D Beta-Lactamase Enzymes Minimum inhibitory concentrations (MICs) were determined by broth microdilution method following CLSI guidelines. Tested strains were ceftibuten-resistant Enterobacteriaceae expressing ESBL (n=20), KPC (n=20), OXA-48 (n=20) and/or Class C (n=20) beta-lactamases. For each isolate, one microtiter plate was prepared and formatted as a checkerboard with the BLI (Compound 2 or clavulanic acid) titrated down the plate and ceftibuten titrated across the plate. Each agent was also tested alone. MICs were determined as the well with the lowest concentration of ceftibuten without visible growth at each concentration of BLI.

TABLE 14

Ceftibuten MIC (μg/mL) summary for each enzyme-expressing subset of isolates with Compound 2 or clavulanic Acid (CLA) at 4 μg/mL.

| | | BLI | ESBL | KPC | OXA-48 | Class C | All |
|---|---|---|---|---|---|---|---|
| CTB MIC$_{50}$ | Compound 2 | 0.25 | 0.25 | 0.125 | 0.25 | 0.25 |
| | CLA | 0.5 | 8 | 8 | 2 | 4 |
| CTB MIC$_{90}$ | Compound 2 | 0.5 | 1 | 0.5 | 1 | 1 |
| | CLA | 2 | 32 | >32 | >32 | 32 |

Example 8. Pharmacokinetic Studies of Compound 1 in Rats

The single dose plasma pharmacokinetic parameters were evaluated for Compound 2 following oral gavage dosing of Compound 1 in fasted and non-fasted Sprague-Dawley rats, as well as following intravenous bolus dosing of Compound 2. The results are summarized in Table 15.

TABLE 15

Mean plasma pharmacokinetic parameters for Compound 2 following intravenous administration of Compound 2, or oral administration of Compound 1, in Male Sprague-Dawley Rats.

| Group | Number of rats (n) | $C_{max}$ (ng/mL) | AUC$_\infty$ (ng*h/mL) | F (%) |
|---|---|---|---|---|
| Compound 2 5 mg/kg IV | 10 | 7,095 | 3,711 | NA |
| Compound 1 5 mg/kg PO, fasted | 10 | 1,441 | 1,735 | 70 |
| Compound 1 5 mg/kg PO, non-fasted | 10 | 574 | 2,263 | 91 |

Abbreviations: $C_{max}$ = maximum plasma concentration;
AUC$_\infty$ = area under the plasma concentration time curve from time 0 to infinity;
F = oral bioavailability corrected for the molecular weight difference between Compound 1 and Compound 2;
NA = not applicable.

Example 9. Pharmacokinetic Studies of Compound 1 in Dogs

The single dose plasma pharmacokinetic parameters were evaluated for Compound 2 following oral gavage dosing of Compound 1 in fasted and non-fasted male Beagle dogs, as well as following intravenous bolus dosing of Compound 2. The results are summarized in Table 16.

TABLE 16

Mean plasma pharmacokinetic parameters for Compound 2 following intravenous administration of Compound 2, or oral administration of Compound 1, in male Beagle dogs.

| Group | Number of dogs (n) | $C_{max}$ (ng/mL) | AUC$_\infty$ (ng*h/mL) | F (%) |
|---|---|---|---|---|
| Compound 2 5 mg/kg IV | 10 | 22,404 | 25,467 | NA |
| Compound 1 5 mg/kg PO, fasted | 5 | 3,540 | 9,875 | 58 |
| Compound 1 5 mg/kg PO, non-fasted | 15 | 3,960 | 10,939 | 64 |

Abbreviations: $C_{max}$ = maximum plasma concentration;
AUC$_\infty$ = area under the plasma concentration time curve from time 0 to infinity;
F = oral bioavailability corrected for the molecular weight difference between Compound 1 and Compound 2;
NA = not applicable.

Example 10. Pharmacokinetic Studies of Compound 1 in Monkeys

The single dose plasma pharmacokinetic parameters were evaluated for Compound 2 following oral gavage dosing of Compound 1 in fasted and non-fasted male Cynomolgus monkeys, as well as following intravenous bolus dosing of Compound 2. The results are summarized in Table 17.

TABLE 17

Mean plasma pharmacokinetic parameters for Compound 2 following intravenous administration of Compound 2, or oral administration of Compound 1, in male Cynomolgus monkeys.

| Group | Number of monkeys (n) | $C_{max}$ (ng/mL) | $AUC_\infty$ (ng*h/mL) | F (%) |
|---|---|---|---|---|
| Compound 2 5 mg/kg IV | 10 | 38,575 | 38,399 | NA |
| Compound 1 5 mg/kg PO, fasted | 10 | 4,794 | 10,224 | 42 |
| Compound 1 5 mg/kg PO, non-fasted | 15 | 6,186 | 15,392 | 63 |

Abbreviations: $C_{max}$ = maximum plasma concentration;
$AUC_\infty$ = area under the plasma concentration time curve from time 0 to infinity;
F = oral bioavailability corrected for the molecular weight difference between Compound 1 and Compound 2;
NA = not applicable.

Example 11. Single Ascending Dose Pharmacokinetics in Rats

The single dose pharmacokinetics and dose proportionality of Compound 2 were evaluated in non-fasted male Sprague-Dawley rats following oral gavage of Compound 1, as well as intravenous bolus administration of Compound 2. The dosing formulation for Compound 1 was prepared in Solutol HS-15:Water (20:80 v/v) for oral dosing (homogeneous and chemically-stable solution up to a concentration of 60 mg/mL; physically- and chemically-stable emulsion at concentrations ranging from 61-200 mg/mL). This study included dose concentrations ranging from 2-120 mg/mL. The data are shown in Table 18.

TABLE 18

Mean plasma pharmacokinetic parameters for Compound 2 following intravenous administration of Compound 2, or oral administration of Compound 1, in male Sprague-Dawley rats (n = 5/group), using Solutol HS-15:Water (20:80) Formulation.

| Group | Calculated dose of Compound 2 (mg/kg) | $C_{max}$ (µg/mL) | $AUC_\infty$ (µg*h/mL) | F (%) |
|---|---|---|---|---|
| Compound 2 10 mg/kg IV | 10 | 23.7 | 6.7 | NA |
| Compound 1 10 mg/kg PO[a] | 6.7 | 1.25 | 2.42 | 53 |
| Compound 1 100 mg/kg PO[a] | 67.1 | 8.90 | 36.1 | 80 |
| Compound 1 300 mg/kg PO[a] | 201 | 19.2 | 90.3 | 67 |
| Compound 1 600 mg/kg PO[a] | 403 | 17.7 | 129 | 58 |
| Compound 1 1000 mg/kg PO[b] | 671 | 19.6 | 240 | 64 |

Abbreviations: $C_{max}$ = maximum plasma concentration;
$AUC_\infty$ = area under the plasma concentration time curve from time 0 to infinity;
F = oral bioavailability corrected for the molecular weight difference between Compound 1 and Compound 2;
NA = not applicable;
[a]Dose volume = 5 mL/kg;
[b]Dose volume = 10 mL/kg

Example 12. Single Ascending Dose Pharmacokinetics in Dogs

The single dose pharmacokinetics and dose proportionality of Compound 2 were evaluated in non-fasted Beagle dogs following oral gavage of Compound 1, as well as intravenous bolus administration of Compound 2. The dosing formulation for Compound 1 was prepared in Solutol HS-15:Water (10:90 v/v) which provided dosing formulations of Compound 1 as a solution (homogeneous and chemically-stable up to a concentration of 30 mg/mL) and as a emulsion (physically- and chemically-stable at concentrations ranging from 31-100 mg/mL) with dose concentrations ranging from 2-60 mg/mL. The data are shown in Table 19.

TABLE 19

Mean plasma pharmacokinetic parameters for Compound 2 following intravenous administration of Compound 2, or oral administration of Compound 1, in male Beagle dogs (n = 4/group), using Solutol HS-15:Water (10:90) Formulation.

| Group | Calculated dose of Compound 2 (mg/kg) | $C_{max}$ (µg/mL) | $AUC_\infty$ (µg*h/mL) | F (%) |
|---|---|---|---|---|
| Compound 2 10 mg/kg IV | 10 | 54.5 | 39.3 | NA |
| Compound 1 10 mg/kg PO, non-fasted | 6.7 | 6.40 | 26.4 | 100 |
| Compound 1 30 mg/kg PO, non-fasted | 20.1 | 19.2 | 68.2 | 86 |
| Compound 1 100 mg/kg PO, non-fasted | 67.1 | 58.4 | 228 | 86 |
| Compound 1 300 mg/kg PO, non-fasted | 201 | 57.1 | 298 | 38[a] |
| Compound 1 100 mg/kg PO, fasted | 67.1 | 74.4 | 199 | 75 |

Abbreviations: $C_{max}$ = maximum plasma concentration;
$AUC_\infty$ = area under the plasma concentration time curve from time 0 to infinity;
F = oral bioavailability corrected for the molecular weight difference between Compound 1 and Compound 2;
NA = not applicable;
[a]Value lower due to 3 of 4 dogs exhibiting emesis, single dog without emesis exhibited F = 79%.

Example 13. Single Ascending Dose Pharmacokinetics in Cynomolgus Monkeys

The single dose pharmacokinetics and dose proportionality of Compound 2 were evaluated in non-fasted Cynomolgus monkeys following oral gavage of Compound 1, as well as intravenous bolus administration of Compound 2. The dosing formulation for Compound 1 was prepared in Solutol HS-15:Water (20:80 v/v) for oral dosing (homogeneous and chemically-stable solution up to a concentration of 60 mg/mL; physically- and chemically-stable emulsion at concentrations ranging from 61-200 mg/mL). This study included dose concentrations ranging from 2-120 mg/mL. The data are shown in Table 20.

TABLE 20

Mean plasma pharmacokinetic parameters for Compound 2 following intravenous administration of Compound 2, or oral administration of Compound 1, in male cynomolgus monkeys (n = 4/group), using Solutol HS-15:Water (20:80) Formulation.

| Group | Calculated dose of Compound 2 (mg/kg) | $C_{max}$ (µg/mL) | $AUC_\infty$ (µg*h/mL) | F (%) |
|---|---|---|---|---|
| Compound 2 1 mg/kg IV | 1 | 26.0 | 10.0 | NA |

TABLE 20-continued

Mean plasma pharmacokinetic parameters for Compound 2 following intravenous administration of Compound 2, or oral administration of Compound 1, in male cynomolgus monkeys (n = 4/group), using Solutol HS-15:Water (20:80) Formulation.

| Group | Calculated dose of Compound 2 (mg/kg) | $C_{max}$ (μg/mL) | $AUC_\infty$ (μg*h/mL) | F (%) |
|---|---|---|---|---|
| Compound 1 10 mg/kg PO, non-fasted | 6.7 | 12.4 | 64.0 | 95 |
| Compound 1 30 mg/kg PO, non-fasted | 20.1 | 20.3 | 131 | 65 |
| Compound 1 100 mg/kg PO, non-fasted | 67.1 | 61.4 | 445 | 66 |
| Compound 1 300 mg/kg PO, non-fasted | 201 | 86.9 | 1107 | 55 |
| Compound 1 600 mg/kg PO, non-fasted | 403 | 90.9 | 1667 | 41 |
| Compound 1 1000 mg/kg PO, non-fasted | 671 | 97.3 | 1555 | 23 |
| Compound 1 100 mg/kg PO, fasted | 67.1 | 62.3 | 461 | 69 |

Abbreviations: $C_{max}$ = maximum plasma concentration;
$AUC_\infty$ = area under the plasma concentration time curve from time 0 to infinity;
F = oral bioavailability corrected for the molecular weight difference between Compound 1 and Compound 2;
NA = not applicable;

Example 14: Assessment of Metabolic Stability of Compounds 1 and 2 in Liver S9, Intestinal S9, and Plasma Across Species The stability of both Compound 1 and Compound 2 in intestinal S9, liver S9 and plasma was determined for five species: human, cynomolgus monkey, beagle dog, Sprague-Dawley® rat and CD-1® mouse, using UPLC/MS-MS methods. Based on the disappearance rate of Compound 1, the half-life was determined in each matrix. Cleavage rates for Compound 1 were compared to those of cefplodoxime proxetil, an orally bioavailable cephalosporin class antibiotic that also undergoes biotransformation in vivo. The data is shown in Table 21.

TABLE 21

Metabolic stability of Compounds 1 and 2 in liver S9, intestinal S9, and plasma from five species.

| Test Article | Test conc. | Species | Plasma Half-life (min) | Liver S9 Half-life (min) | Intestinal S9 Half-life (min) |
|---|---|---|---|---|---|
| Compound 1 | 3 μM | Human | 10.7 | 1.0 | 2.9 |
| | | Monkey | 22.0 | 0.8 | 11.2 |
| | | Dog | 43.9 | 0.5 | 49.0 |
| | | Rat | 1.6 | 2.3 | 3.9 |
| | | Mouse | 4.6 | 1.2 | 1.1 |
| Compound 2 | 3 μM | Human | >120 | >120 | >120 |
| | | Monkey | >120 | >120 | >120 |
| | | Dog | >120 | >120 | >120 |
| | | Rat | >120 | >120 | >120 |
| | | Mouse | >120 | >120 | >120 |
| Cefpodoxime proxetil | 3 μM | Human | 4.8 | 3.4 | 35.6 |
| | | Monkey | 12.4 | 4.3 | 16.9 |
| | | Dog | 26.2 | 4.7 | >120 |
| | | Rat | 0.8 | 10.2 | 7.4 |
| | | Mouse | 0.6 | 2.4 | 2.5 |

Example 15: Proposed Clinical Study of Compound 1 or Compound 1-Ethanolate in Combination with Ceftibuten for the Treatment of ESBL-Producing Enterobacteriaceae Infections For possible combinations of Compound 1 and Ceftibuten, a Phase I drug-drug interaction study (DDI) will be conducted to ensure safety and appropriate pharmacokinetics of the various combinations. Such studies would be conducted in two parts 1) a randomized, crossover drug-drug interaction study (Part 1) and 2) a repeat-dose safety and PK study (Part 2). Part 1 would consist of a single dose of the given combination, and Part 2 would be conducted over 7-10 days of repeat doses of the given combination and dosing regimen. Following completion of these DDI studies, epithelial lung fluid and renal impairment studies would be conducted, using doses and regimens derived from the results from the DDI studies.

A compound of formula (I) or (II) and Ceftibuten will be dosed orally. The repeat dose study will be conducted with dosing every 8, 12, or 24 hours. Proposed drug ratios, doses, and dosing regimens are outlined as follows:

For dosing every 24 hours:

| Ceftibuten | Compound of formula (I) or (II) |
|---|---|
| about 400 mg | about 100 mg to about 1600 mg |
| about 600 mg | about 150 mg to about 2400 mg |
| about 800 mg | about 200 mg to about 3200 mg |

For dosing every 12 hours:

| Ceftibuten | Compound of formula (I) or (II) |
|---|---|
| about 200 mg | about 50 mg to about 800 mg |
| about 300 mg | about 75 mg to about 1200 mg |
| about 400 mg | about 100 mg to about 1600 mg |
| about 600 mg | about 150 mg to about 2400 mg |
| about 800 mg | about 200 mg to about 3200 mg |

For dosing every 8 hours:

| Ceftibuten | Compound of formula (I) or (II) |
|---|---|
| about 200 mg | about 50 mg to about 800 mg |
| about 300 mg | about 75 mg to about 1200 mg |
| about 400 mg | about 100 mg to about 1600 mg |
| about 600 mg | about 150 mg to about 2400 mg |

Example 16. Excipient Screening Study

The solubility of Compound 1-ethanolate was evaluated in a series of pharmaceutically acceptable excipients that are commonly used to prepare self-emulsifying drug delivery systems (SEDDS) for oral drug delivery. This class of formulation results in a solid solution of drug substance and excipients that enable the delivery of the drug substance and prevents precipitation upon contact with aqueous environments (i.e. the stomach).

The indicated quantity of Compound 1-ethanolate was weighed into a 3 mL screw top glass vial outfitted with a magnetic stir bar. The vial was transferred to a controlled temperature heating block and 100 μL aliquots of each excipient was added with stirring. After each addition, the sample was evaluated for dissolution of the drug substance and additional aliquots of excipient were added until a clear, colorless solution was obtained. Table 22 summarizes the solubility screening for 25 excipients.

TABLE 22

Solubility of Compound 1-Ethanolate in SEDDS Excipients

| Vial # | Excipient | Compound 1-ethanolate (mg) | Excipient (µL) | Temp | Solubility |
|---|---|---|---|---|---|
| 1 | Gelucire 44/14 (Lauroyl polyoxyl-32 glycerides) | 113.8 | 400 | 50° C. | >284.5 mg/mL |
| 2 | Polysorbate 80 (Polyoxyethylene (20) sorbitan monooleate) | 95.4 | 400 | 50° C. | >238.5 mg/mL |
| 3 | Myrj 52 (PEG-40 Stearate) | 110.9 | 400 | 50° C. | >277.3 mg/mL |
| 4 | Kolliphor EL (Polyoxyl 35 hydrogenated castor oil) | 112.8 | 300 | 50° C. | >376 mg/mL |
| 5 | Kolliphor RH (PEG-40 Hydrogenated Castor Oil) | 103.1 | 600 | 50° C. | ~171.8 mg/mL |
| 6 | Poloxamer 188 | 112.7 | 500 | 65° C. | >225.4 mg/mL |
| 7 | Span 20 (Sorbitan monolaurate) | 113.6 | 500 | 50° C. | >227.2 mg/mL |
| 8 | TPGS | 68.6 | 300 | 50° C. | >228.7 mg/mL |
| 9 | Labrasol (Caprylocaproyl polyoxyl-8 glycerides) | 117 | 200 | 50° C. | >585 mg/mL |
| 10 | Labrafil M1944CS (Oleoyl polyoxyl-6 glycerides) | 112.1 | 800 | 50° C. | >140.1 mg/mL |
| 11 | Labrafil M2125CS (Linoleoyl polyoxyl-6 glycerides) | 121.2 | 800 | 50° C. | >151.5 mg/mL |
| 12 | Peceol (Glyceryl monooleate) | 124 | 300 | 50° C. | >413.3 mg/mL |
| 13 | Lauroglycol (Propylene Glycol Monolaurate) | 145.9 | 500 | 50° C. | >291.8 mg/mL |
| 14 | Plurol Oleique CC497 (Polyglyceryl-3 dioleate) | 112.4 | 300 | 50° C. | >374.7 mg/mL |
| 15 | Maisine CC (glyceryl monolinoleate) | 110.4 | 300 | 50° C. | >368 mg/mL |
| 16 | Propylene Glycol | 121.4 | 100 | 50° C. | >1214 mg/mL |
| 17 | Glycerol | 111.6 | 2000 | 50° C. | <55.8 mg/mL |
| 18 | PEG-3350 | 111.8 | 400 | 65° C. | >279.5 mg/mL |
| 19 | PEG-1500 | 114.6 | 300 | 50° C. | >382 mg/mL |
| 20 | PEG-400 | 99.7 | 200 | 50° C. | >498.5 mg/mL |
| 21 | Ethanol | 113.6 | 200 | 50° C. | >568 mg/mL |
| 22 | Triacetin (glycerin triacetate) | 92.6 | 1100 | 50° C. | >84.18 mg/mL |
| 23 | Phosal 50 PG (50% PC and propylene glycol) | 83.8 | 200 | 50° C. | >419 mg/mL |
| 24 | Capmul MCM (Caprylic/capric mono- & diglycerides) | 70.2 | 200 | 50° C. | >351 mg/mL |
| 25 | Span 80 | 82.9 | 300 | 50° C. | >276.3 mg/mL |

Example 17: Preparation of a Compound 1-Ethanolate SEDDS Formulation

A 1:1 mixture by weight of PEG 1500 and Myrj 52 was prepared by weighing 5.0 g of Myrj 52 into a clean 50 mL beaker. A magnetic stir bar was added and 5.0 g of molten PEG 1500 was weighed into the beaker. This mixture was stirred on a ~55° C. hot plate until a uniform solution was obtained. A 6.5 mL aliquot of this excipient blend was added to a scintillation vial containing 2.002 g of Compound 1-ethanolate (~280 mg/mL Compound 1-ethanolate). The blend was then stirred at ~55° C. on a hot plate using a magnetic stir bar until a clear, homogeneous solution was obtained.

Figure 2:
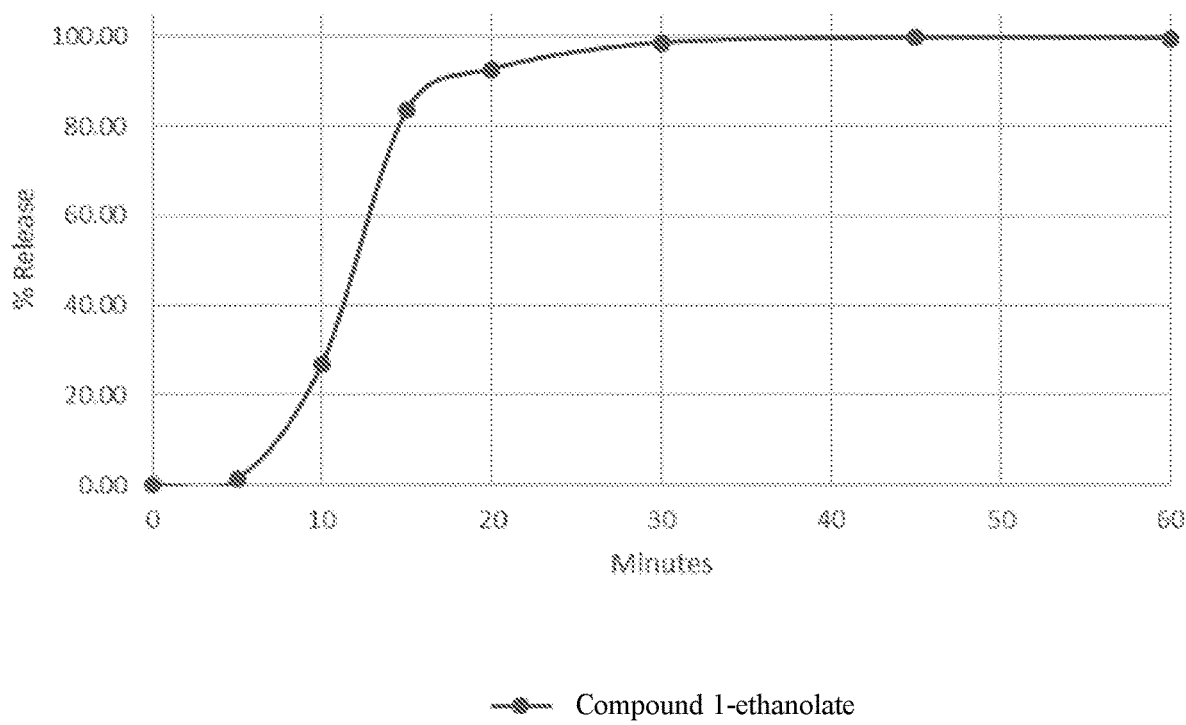
FIG. 2 shows the dissolution of 150 mg Compound 1-ethanolate capsule.

Example 18: Preparation and Dissolution of a Compound 1-Ethanolate HPMC Capsules The 280 mg/mL Compound 1-ethanolate PEG 1500/Myrj 52 stock formulation (from example 17) was re-melted on a ~55° C. hot plate with stirring. The resulting clear solution was filled into a Size 0 white, opaque HPMC capsule by adding 0.55 mL of the liquid to the capsule body using a positive displacement pipette. The capsule was capped and allowed to solidify at room temperature before transferring to 2-8° C. for storage. The dissolution profile was collected for the 150 mg Compound 1-ethanolate capsule by using USP Apparatus II conditions (50 RPM, 450 mL pH 2 water at 38° C.) with manual time pulls. The samples were removed at t=0, 5, 10, 15, 20, 30, 45 and 60 minutes and filtered through a 0.22 µm syringe filter and analyzed using HPLC. The dissolution profile for the 150 mg capsule of Compound 1-ethanolate is shown in FIG. 2.

Figure 3:
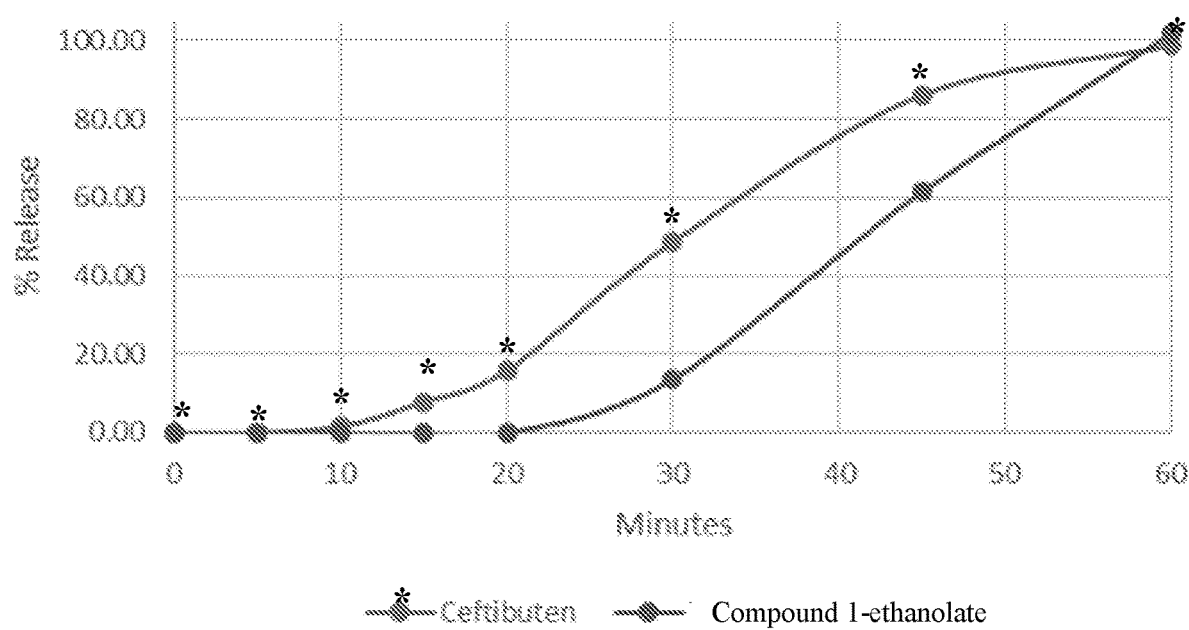
FIG. 3 shows the dissolution of 100 mg Compound 1-ethanolate/100 mg ceftibuten combination capsule.

Example 19: Preparation and Dissolution of a Compound 1-Ethanolate/Ceftibuten Fixed Dose Combination HPMC Capsules The 280 mg/mL Compound 1-ethanolate PEG 1500/Myrj 52 stock formulation (from example 17) was re-melted on a ~55° C. hot plate with stirring. The resulting clear solution was filled into a Size 2 white, opaque HPMC capsule by adding 0.353 mL of the liquid to the capsule body using a positive displacement pipette. The capsule was capped and allowed to solidify at room temperature before transferring to 2-8° C. for storage. The Compound 1-ethanolate capsule was placed into the body of a Size 00 white, opaque HPMC capsule and 100 mg of ceftibuten was filled around the smaller capsule and the larger capsule was capped to yield a combination product in a single size 00 capsule. The dissolution profile was collected for the 100 mg Compound 1-ethanolate/100 mg ceftibuten capsule by using USP Apparatus II conditions (50 RPM, 450 mL pH 8 PBS bugger at 38° C.) with manual time pulls. The samples were removed at t=0, 5, 10, 15, 20, 30, 45 and 60 minutes and filtered through a 0.22 μm syringe filter and analyzed using HPLC. The dissolution profile for the combination product is shown in FIG. 3.

Microtiter plates were incubated aerobically at 37° C. for 18-20 hours and MICs were read visually. Table 23a and 23b show the $MIC_{50}$ and $MIC_{90}$ results:

TABLE 23a $MIC_{50}$ and $MIC_{90}$ Summary for combinations of Compound 2 and beta-lactam antibiotics.

| Beta-Lactam | BLI | All $MIC_{50}$ | All $MIC_{90}$ | ESBL $MIC_{50}$ | ESBL $MIC_{90}$ | KPC $MIC_{50}$ | KPC $MIC_{90}$ |
|---|---|---|---|---|---|---|---|
| Ceftibuten | — | 16 | ≥64 | 4 | ≥64 | 16 | ≥64 |
|  | Compound 2 | 0.125 | 1 | 0.125 | 0.25 | 0.125 | 1 |
| Amoxicillin | Clavulanate | 64 | ≥256 | 16 | ≥64 | ≥64 | ≥256 |
| Levofloxacin | — | 16 | ≥64 | 8 | 32 | ≥64 | ≥64 |
| Amoxicillin | — | ≥256 | ≥256 | ≥256 | ≥256 | ≥64 | ≥256 |
|  | Compound 2 | 64 | ≥256 | 64 | ≥256 | ≥64 | ≥256 |
| Cefaclor | — | ≥64 | ≥64 | ≥64 | ≥64 | ≥64 | ≥64 |
|  | Compound 2 | 2 | ≥64 | 1 | 2 | 4 | ≥64 |
| Cefalexin | — | ≥64 | ≥64 | ≥64 | ≥64 | ≥64 | ≥64 |
|  | Compound 2 | 8 | ≥64 | 8 | 16 | 16 | ≥64 |
| Cefdinir | — | ≥64 | ≥64 | 32 | ≥64 | ≥64 | ≥64 |
|  | Compound 2 | 0.5 | 16 | 0.5 | 1 | 0.5 | 16 |
| Cefditoren | — | ≥64 | ≥64 | ≥64 | ≥64 | ≥64 | ≥64 |
|  | Compound 2 | 0.5 | 2 | 0.5 | 1 | 0.5 | 4 |
| Cefexime | — | ≥64 | ≥64 | ≥64 | ≥64 | ≥64 | ≥64 |
|  | Compound 2 | 0.5 | 2 | 0.5 | 2 | 0.5 | 2 |
| Cefpodoxime | — | ≥64 | ≥64 | ≥64 | ≥64 | ≥64 | ≥64 |
|  | Compound 2 | 1 | 8 | 0.5 | 2 | 1 | 8 |
| Cefuroxime | — | ≥64 | ≥64 | ≥64 | ≥64 | ≥64 | ≥64 |
|  | Compound 2 | 8 | ≥64 | 8 | 16 | 16 | ≥64 |

Example 20: In Vitro Antibacterial Assays Demonstrating Potentiation of Beta-Lactam Antibiotics by Beta-Lactamase Inhibition Broth microdilution minimum inhibitory concentration assays were performed according to CLSI methods with amoxicillin, cefaclor, cefalexin, cefdinir, cefditoren, cefixime, cefpodoxime, ceftibuten, and cefuroxime alone or in combination with Compound 2 fixed at 4 mg/L. Levofloxacin and amoxicillin-clavulanate were also tested as comparators.

One hundred representative isolates of Enterobacteriaceae expressing Class A ESBL (n=25), Class A KPC (n=25), Class C (n=25), and Class D OXA-48 (n=25) enzymes were used. beta-lactamase genes were verified using polymerase chain reaction (PCR) while expression of these genes was determined phenotypically.

Commercially available oral beta-lactam antibiotics were titrated (tested range 0.016 to 32 mg/L) across 96-well microtiter plates and were mixed with either cation adjusted Mueller Hinton broth (CAMHB), or Compound 2 supplemented CAMHB at 4 mg/L. Levofloxacin and amoxicillin-clavulanate (2:1 ratio) were also tested (range 0.016 to 32 mg/L and 0.06 to 128 mg/L, respectively). Bacterial inocula at a final concentration of $2\text{-}5\times10^5$ CFU/mL were used.

TABLE 23b $MIC_{50}$ and $MIC_{90}$ Summary for combinations of Compound 2 and beta-lactam antibiotics vs. Class C and Class D beta-lactamase producing strains.

| Beta-lactam | BLI | OXA $MIC_{50}$ | OXA $MIC_{90}$ | Class C $MIC_{50}$ | Class C $MIC_{90}$ |
|---|---|---|---|---|---|
| Ceftibuten | — | 16 | ≥64 | 16 | ≥64 |
|  | Compound 2 | 0.125 | 1 | 0.125 | 1 |
| Amoxicillin | Clavulanate | ≥256 | ≥256 | 32 | ≥256 |
| Levofloxacin | — | 32 | ≥64 | 4 | 32 |
| Amoxicillin | — | ≥256 | ≥256 | ≥256 | ≥256 |
|  | Compound 2 | ≥256 | ≥256 | 64 | ≥256 |
| Cefaclor | — | ≥64 | ≥64 | ≥64 | ≥64 |
|  | Compound 2 | 4 | ≥64 | 2 | 32 |
| Cefaxelin | — | ≥64 | ≥64 | ≥64 | ≥64 |
|  | Compound 2 | 16 | ≥64 | 8 | ≥64 |
| Cefdinir | — | ≥64 | ≥64 | 32 | ≥64 |
|  | Compound 2 | 2 | 32 | 0.25 | 2 |
| Cefditoren | — | ≥64 | ≥64 | ≥64 | ≥64 |
|  | Compound 2 | 1 | 4 | 0.5 | 0.2 |
| Cefexime | — | ≥64 | ≥64 | ≥64 | ≥64 |
|  | Compound 2 | 0.5 | 2 | 0.5 | 4 |
| Cefpodoxime | — | ≥64 | ≥64 | ≥64 | ≥64 |
|  | Compound 2 | 1 | 8 | 0.5 | 8 |
| Cefuroxime | — | ≥64 | ≥64 | ≥64 | ≥64 |
|  | Compound 2 | 8 | ≥64 | 8 | ≥64 |

Figure 4:
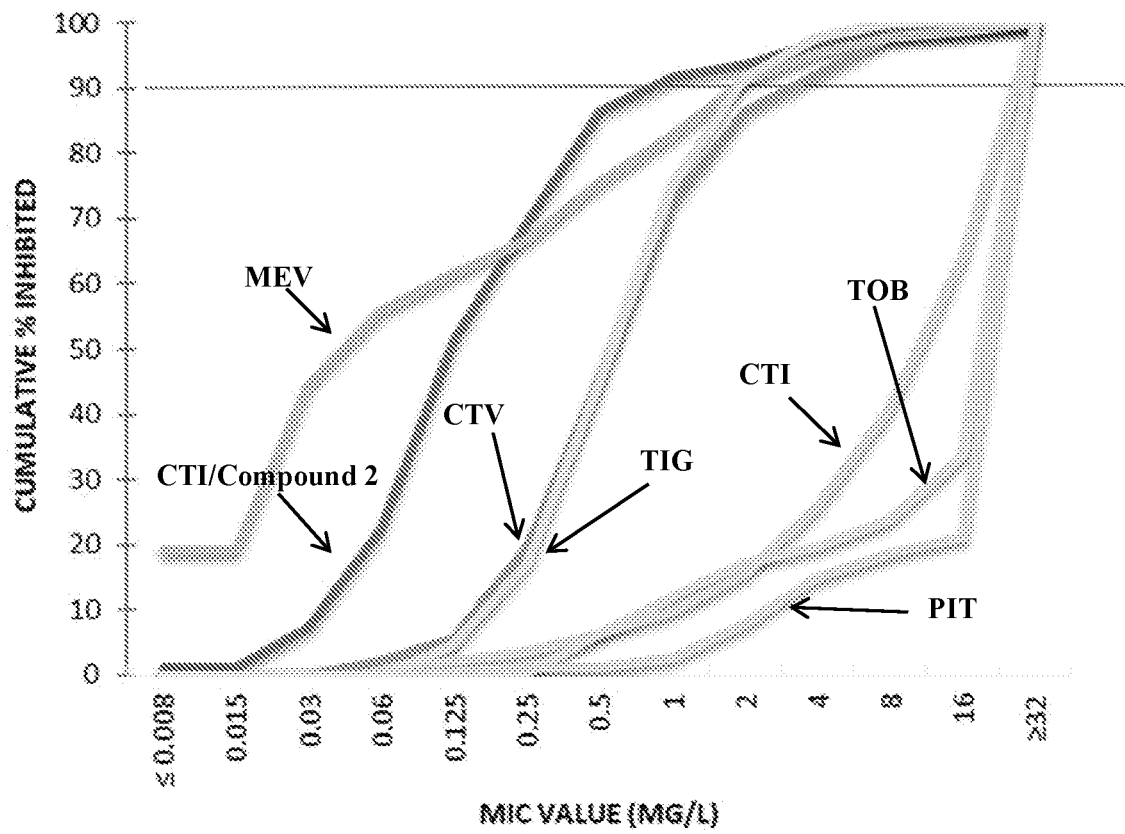
FIG. 4 shows the cumulative % inhibited across 193 isolates of serine-beta-lactamase expressing Enterobacteriaceae.

Example 21: In Vitro Comparison of Oral Ceftibuten/Compound 2 with IV Therapeutics Against MDR Enterobacteriaceae Broth microdilution minimum inhibitory concentration (MIC) assays were carried out according to CLSI guidelines. BLIs were fixed at a concentration of 4 mg/L (Compound 2, tazobactam, and avibactam) or 8 mg/L (vaborbactam). The antibacterial activity of Compound 2 in combination with ceftibuten was compared to ceftibuten alone, meropenem, piperacillin/tazobactam, ceftazidime/avibactam, meropenem/vaborbactam. tobramycin. and tigecycline in 193 strains of Enterobacteriaceae expressing Class A ESBL (N=33), Class A KPC (N=77), Class D OXA-48 (39), and Class C (44) enzymes. Beta-lactamase genes were verified using polymerase chain reaction while gene expression was determined phenotypically. MIC results were interpreted using CLSI M100 Ed. 29 (2019) or EUCAST v9.0 Clinical Breakpoints (2019). Tables 24a-24d and FIG. 4 summarize the results.

TABLE 24a

MICs of Ceftibuten/Compound 2 and comparators in ESBL-expressing *Enterobacteriaceae* (n = 33).

| Test Article | $MIC_{50}$ mg/L | $MIC_{90}$ mg/L | Number of strains at MIC value (mg/L) | | | | | | | | | |
|---|---|---|---|---|---|---|---|---|---|---|---|---|
| | | | ≤0.06 | 0.125 | 0.25 | 0.5 | 1 | 2 | 4 | 8 | 16 | ≥32 |
| Ceftibuten | 4 | ≥32 | 0 | 2 | 3 | 2 | 4 | 2 | 8 | 5 | 1 | 6 |
| Ceftibuten + Compound 2 (4 mg/L) | 0.125 | 0.25 | 12 | 15 | 4 | 1 | 1 | 0 | 0 | 0 | 0 | 0 |
| Ceftazidime + avibactam (4 mg/L) | 0.5 | 0.5 | 2 | 4 | 10 | 15 | 1 | 0 | 0 | 0 | 1 | 0 |
| Meropenem + vaborbactam (8 mg/L) | ≤0.06 | ≤0.06 | 31 | 2 | 0 | 0 | 0 | 0 | 0 | 0 | 0 | 0 |
| Piperacillin + tazobactam (4 mg/mL) | 16 | ≥32 | 0 | 0 | 0 | 0 | 0 | 5 | 7 | 3 | 3 | 15 |
| Tobramycin | ≥32 | ≥32 | 0 | 0 | 0 | 3 | 5 | 2 | 1 | 1 | 4 | 17 |
| Tigecycline | 0.5 | 2 | 0 | 4 | 10 | 11 | 3 | 3 | 2 | 0 | 0 | 0 |
| Meropenem | ≤0.06 | 0.125 | 29 | 1 | 0 | 0 | 1 | 1 | 0 | 1 | 0 | 0 |

Strain set composed of *C. freundii* (1), *E. coli* (11), *K. oxytoca* (3), and *K. pneumoniae* (18)

TABLE 24b

MICs of Ceftibuten/Compound 2 and comparators in KPC-expressing *Enterobacteriaceae* (n = 77).

| Test Article | $MIC_{50}$ mg/L | $MIC_{90}$ mg/L | Number of strains at MIC value (mg/L) | | | | | | | | | |
|---|---|---|---|---|---|---|---|---|---|---|---|---|
| | | | ≤0.06 | 0.125 | 0.25 | 0.5 | 1 | 2 | 4 | 8 | 16 | ≥32 |
| Ceftibuten | 16 | ≥32 | 0 | 0 | 0 | 2 | 2 | 4 | 7 | 13 | 24 | 25 |
| Ceftibuten + Compound 2 (4 mg/L) | 0.25 | 1 | 10 | 20 | 17 | 22 | 4 | 0 | 2 | 1 | 0 | 1 |
| Ceftazidime + avibactam (4 mg/L) | 1 | 8 | 0 | 0 | 2 | 10 | 27 | 19 | 7 | 10 | 1 | 1 |
| Meropenem + vaborbactam (8 mg/L) | ≤0.06 | 2 | 40 | 6 | 6 | 7 | 9 | 5 | 3 | 1 | 0 | 0 |
| Piperacillin + tazobactam (4 mg/mL) | ≥32 | ≥32 | 0 | 0 | 0 | 0 | 0 | 0 | 1 | 0 | 0 | 76 |
| Tobramycin | ≥32 | ≥32 | 0 | 0 | 1 | 3 | 0 | 2 | 0 | 3 | 3 | 65 |
| Tigecycline | 1 | 2 | 0 | 0 | 4 | 19 | 34 | 15 | 5 | 0 | 0 | 0 |
| Meropenem | ≥32 | ≥32 | 1 | 0 | 0 | 1 | 0 | 3 | 4 | 11 | 13 | 44 |

Strain set composed of *E. cloacae* (4), *E. coli* (4), *K. pneumoniae* (67), and *K. oxytoca* (2)

TABLE 24c

MICs of Ceftibuten/Compound 2 and comparators in OXA-48-expressing *Enterobacteriaceae* (n = 39).

| Test Article | $MIC_{50}$ mg/L | $MIC_{90}$ mg/L | Number of strains at MIC value (mg/L) | | | | | | | | | |
|---|---|---|---|---|---|---|---|---|---|---|---|---|
| | | | ≤0.06 | 0.125 | 0.25 | 0.5 | 1 | 2 | 4 | 8 | 16 | ≥32 |
| Ceftibuten | 16 | ≥32 | 1 | 0 | 0 | 1 | 0 | 0 | 2 | 4 | 13 | 18 |
| Ceftibuten + Compound 2 (4 mg/L) | 0.125 | 2 | 8 | 15 | 6 | 2 | 3 | 1 | 1 | 2 | 0 | 1 |

TABLE 24c-continued

MICs of Ceftibuten/Compound 2 and comparators in OXA-48-expressing *Enterobacteriaceae* (n = 39).

| Test Article | MIC$_{50}$ mg/L | MIC$_{90}$ mg/L | Number of strains at MIC value (mg/L) | | | | | | | | |
|---|---|---|---|---|---|---|---|---|---|---|---|
| | | | ≤0.06 | 0.125 | 0.25 | 0.5 | 1 | 2 | 4 | 8 | 16 | ≥32 |
| Ceftazidime + avibactam (4 mg/L) | 0.5 | 2 | 0 | 1 | 9 | 13 | 10 | 4 | 1 | 0 | 0 | 1 |
| Meropenem + vaborbactam (8 mg/L) | 2 | 8 | 0 | 2 | 1 | 9 | 3 | 11 | 5 | 4 | 2 | 2 |
| Piperacillin + tazobactam (4 mg/mL) | ≥32 | ≥32 | 0 | 0 | 0 | 0 | 0 | 0 | 1 | 0 | 1 | 37 |
| Tobramycin | 16 | ≥32 | 0 | 0 | 0 | 3 | 4 | 6 | 1 | 1 | 6 | 18 |
| Tigecycline | 0.5 | 2 | 0 | 1 | 4 | 16 | 11 | 4 | 1 | 2 | 0 | 0 |
| Meropenem | 2 | 8 | 1 | 1 | 4 | 6 | 6 | 10 | 3 | 4 | 2 | 2 |

Strain set composed of *E. cloacae* (1), *E. coli* (15), *K. pneumoniae* (22) and *M. morgannii* (1)

TABLE 24d

MICs of Ceftibuten/Compound 2 and comparators in AmpC/CMY-expressing *Enterobacteriaceae* (n = 44).

| Test Article | MIC$_{50}$ mg/L | MIC$_{90}$ mg/L | Number of strains at MIC value (mg/L) | | | | | | | | |
|---|---|---|---|---|---|---|---|---|---|---|---|
| | | | ≤0.06 | 0.125 | 0.25 | 0.5 | 1 | 2 | 4 | 8 | 16 | ≥32 |
| Ceftibuten | ≥32 | ≥32 | 1 | 0 | 0 | 0 | 1 | 5 | 3 | 7 | 7 | 20 |
| Ceftibuten + Compound 2 (4 mg/L) | 0.25 | 2 | 13 | 6 | 8 | 8 | 2 | 3 | 3 | 0 | 1 | 0 |
| Ceftazidime + avibactam (4 mg/L) | 0.5 | 2 | 2 | 2 | 6 | 12 | 14 | 4 | 3 | 1 | 0 | 0 |
| Meropenem + vaborbactam (8 mg/L) | ≤0.06 | 0.25 | 37 | 1 | 3 | 1 | 2 | 0 | 0 | 0 | 0 | 0 |
| Piperacillin + tazobactam (4 mg/mL) | ≥32 | ≥32 | 0 | 1 | 1 | 0 | 3 | 5 | 5 | 4 | 1 | 24 |
| Tobramycin | ≥32 | ≥32 | 0 | 0 | 0 | 2 | 2 | 0 | 3 | 3 | 6 | 28 |
| Tigecycline | 1 | 4 | 0 | 4 | 6 | 8 | 10 | 10 | 4 | 2 | 0 | 0 |
| Meropenem | ≤0.06 | 0.5 | 34 | 2 | 2 | 2 | 1 | 0 | 3 | 0 | 0 | 0 |

Strain set composed of *C. freundii* (2), *E. aerogenes* (5), *E. cloacae* (5), *E. coli* (8), *K. oxytoca* (2), *K. pneumoniae* (10), *P. mirabilis* (1), *Salmonella* spp. (2), and *S. marcescens* (9)

Example 22: In Vivo PK/PD in Neutropenic Mouse Thigh Infection Model

The in vivo efficacy study of ceftibuten with and without Compound 2 was conducted in the neutropenic mouse thigh infection model (Dr. David Nicolau, Hartford Hospital, Hartford, CT) utilizing a total of 21 strains of Enterobacteriaceae expressing various beta-lactamases (11 ESBL, 1 ESBL+OXA, 5 KPC, 3 OXA-48 and 1 AmpC). In MIC testing, Compound 2 fixed at 4 mg/L reduced ceftibuten MICs from ≥32 μg/mL to ≤2 μg/mL. All strains were demonstrated to grow in neutropenic mouse thigh in the presence of a humanized dosing regimen of ceftibuten administered three times at 300 mg over 24 hrs.

Dose fractionation studies were conducted to determine the PK/PD index for Compound 2 that best described its efficacy in combination with ceftibuten. Six strains were examined. Mice were administered a human simulated regimen (HSR) of ceftibuten 300 mg q8h with Compound 2 at 1.2, 4 or 12 mg/kg/day (2 strains) or 4, 12 or 38 mg/kg/day (4 strains). The principle behind these assays is shown in Table 25 below. If a minimally efficacious dose of Compound 2 given as a single dose demonstrates maximal efficacy, then Cmax is the predominant driver of efficacy. If 4 divided doses demonstrate maximal efficacy, then time above threshold is favored. If all dose fractionations give similar efficacy, then exposure (AUC) is the likely driver of BLI efficacy.

TABLE 25

Interpretative efficacy criteria for dose fractionation studies.

| | Efficacy Outcome | | |
|---|---|---|---|
| | Cmax | Time above threshold | AUC |
| Single dose | +++ | + | +++ |
| Two divided doses | ++ | ++ | +++ |
| Four divided doses | + | +++ | +++ |

+++, maximum efficacy;
++, intermediate efficacy;
+, minimum efficacy

Figure 8:
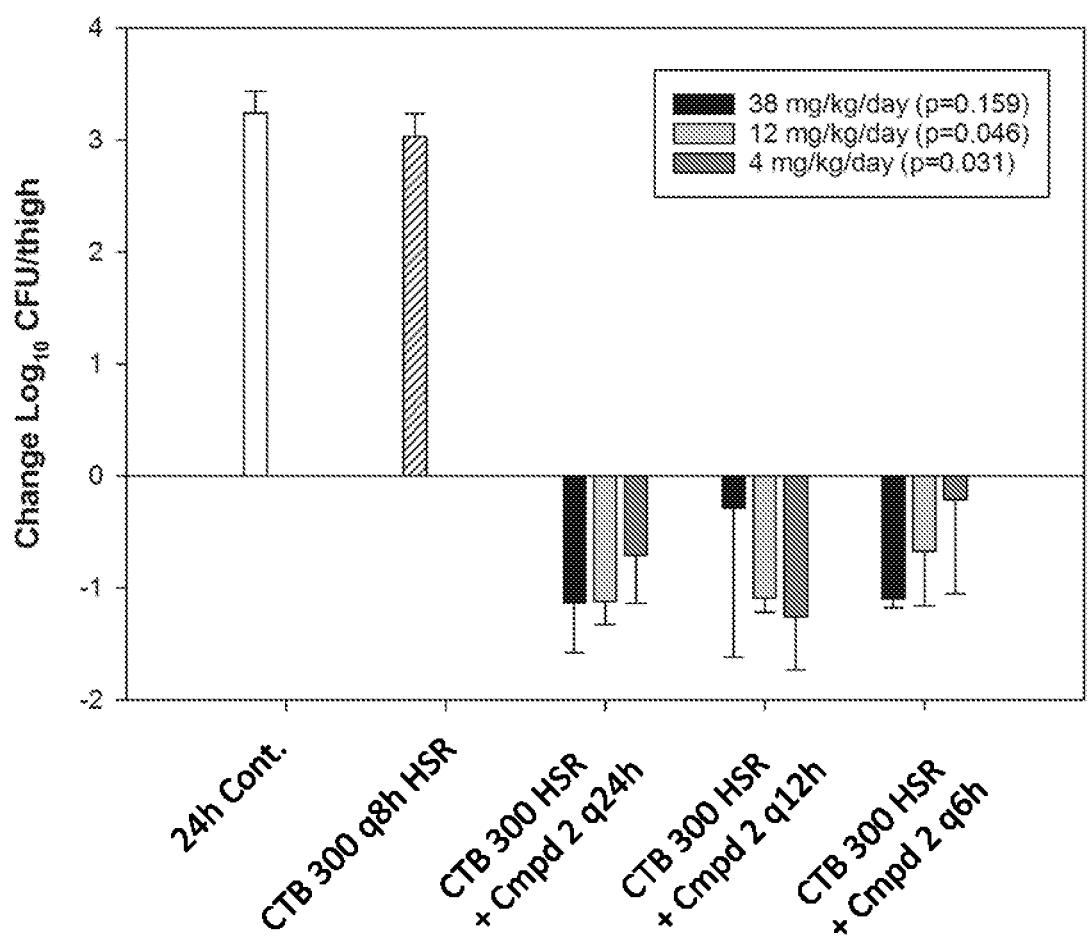
FIG. 8 Log CFU of Bacteria in Murine Thighs Following Administration of Ceftibuten and Ceftibuten/Compound 2 in a dose fractionation study of Compound 2—E. coli expressing AmpC+CTX-M-15+SHV+TEM.
Figure 9:
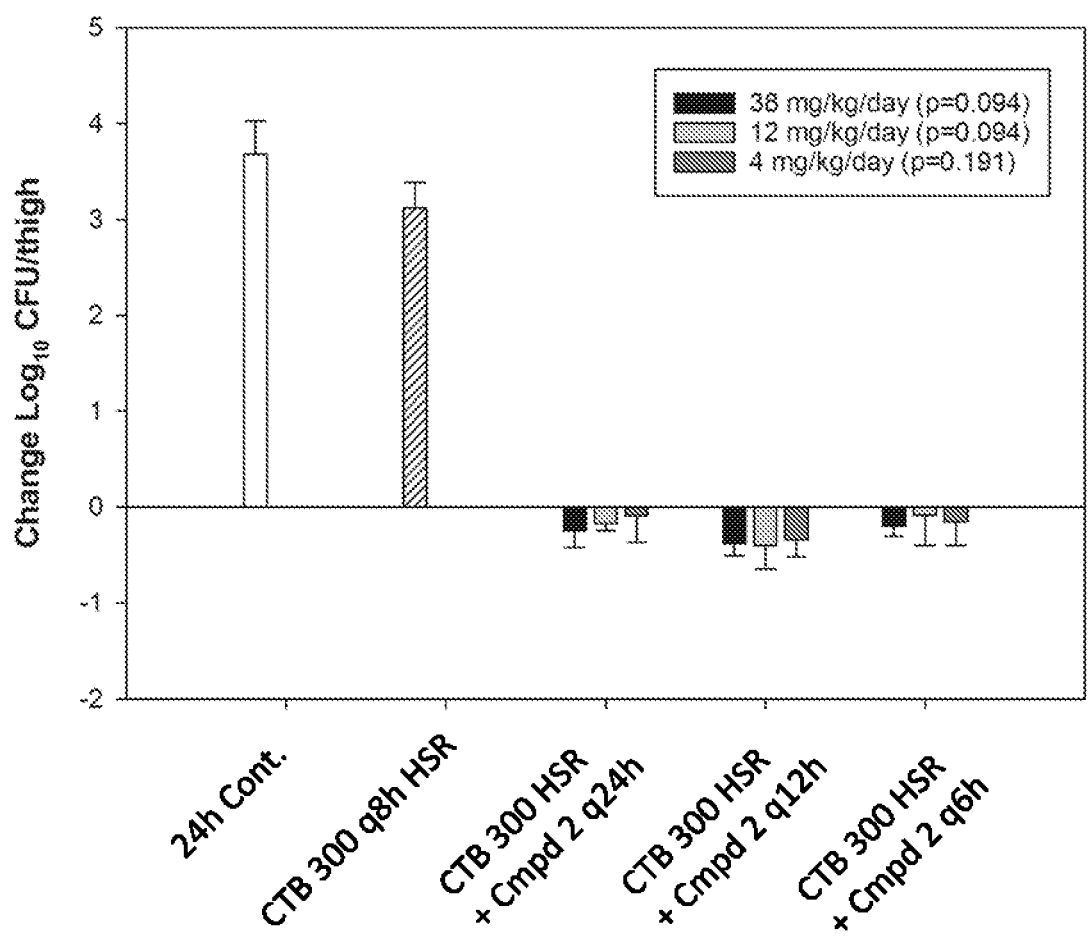
FIG. 9 Log CFU of Bacteria in Murine Thighs Following Administration of Ceftibuten and Ceftibuten/Compound 2 in a dose fractionation study of Compound 2—E. coli expressing AmpC+CTX-M-15+TEM.

As shown in FIG. 8 and FIG. 9 with *E. coli* 617 expressing AmpC, TEM-1, CTXM-15, SHV-5 and SHV-1, and *E. coli* C11-23 expressing AmpC, TEM-1 and CTXM-15, respectively, rescue of ceftibuten activity by Compound 2 was similar regardless of the manner in which the Compound 2 dose was fractionated. The results thus support AUC as the PK/PD driver for BLI efficacy.

Dose ranging studies were conducted to assess the ability of various doses of Compound 2 to potentiate the in vivo bactericidal activity of humanized ceftibuten exposures against these 21 beta-lactamase-producing Enterobacteriaceae strains and 1 wild-type Enterobacteriaceae strain. All treatment groups were administered the ceftibuten 300 mg q8h human-simulated regimen alone, or in combination with Compound 2 q8h at a ceftibuten:Compound 2 ratio of 10:1, 3.16:1, 1:1, 1:3.16 or 1:10 (approximately corresponding to ceftibuten 300:Compound 2@30, 95, 300, 950 or 3,000 mg, respectively). Compound 2 rescued ceftibuten activity in all 21 beta-lactamase-expressing strains. Net bacterial stasis was achieved at a Compound 2 median exposure of 8.98 mg*h/L with an interquartile range of 3.06-18.56 mg*h/L.

TABLE 26

Free Compound 2 exposure indexed to combination MIC ($fAUC_{0-24}$/MIC) required to achieve net bacterial stasis for ceftibuten 300 mg q8h. $fAUC_{0-24}$ units of mg*h/L.

| Isolate (MIC, mg/L)[a] | Enzyme(s) | Compound 2 Exposure Required to Achieve Stasis $fAUC_{0-24}$/MIC (mg · h/L)[a] | $R^2$ |
|---|---|---|---|
| EC 614 (1) | OXA-48 | 0.72 | 0.816 |
| EC 617 (0.5) | AmpC, CTX-M-15, SHV-5, SHV-1, TEM-1 | 7.61 | 0.825 |
| EC 636 (0.125) | CTX-M-15 | 18.89 | 0.972 |
| EC 639 (0.125) | CTX-M-15, TEM-1 | 18.23 | 0.961 |
| EC C11-23 (0.5) | AmpC, CTX-M-15, TEM-1 | 0.13 | 0.915 |
| ECL 138 (1) | KPC | 5.92 | 0.810 |
| ECL 139 (1) | AmpC (p99), CTX-M-3, TEM-1 | 193.55 | 0.851 |
| ECL 150 (0.25) | CTX-M-15 | 43.22 | 0.586 |
| KP 630 (0.5) | CTX-M-15, SHV-WT, TEM-WT | 1.53 | 0.929 |
| KP 631 (0.5) | CTX-M-15, SHV-WT, TEM-WT | 14.91 | 0.831 |
| KP 774 (1) | KPC | 0.55 | 0.921 |
| KP 776 (1) | KPC | 30.90 | 0.816 |
| KP 780 (2) | KPC | 8.98 | 0.843 |
| KP 783 (2) | CMY-2, TEM-1 | 4.59 | 0.872 |
| KP 785 (0.25) | OXA-204 | 0.10 | 0.843 |
| KP 786 (0.5) | OXA-48 | 17.10 | 0.949 |
| KP 787 (1) | KPC | 6.43 | 0.634 |
| KP 813 (0.125) | CTX-M-15, OXA-48, SHV-12, TEM-1 | 8.95 | 0.913 |
| KP 814 (0.125) | SHV-12, TEM-1 | 15.82 | 0.950 |
| KP 816 (0.125) | CTX-M-3, SHV-12, TEM-1 | 28.63 | 0.930 |
| KP 819 (0.25) | SHV-12 | 13.78 | 0.930 |
| Median (interquartile range) | | 8.98 (3.06-18.56) | |

[a]Based on the MICs of ceftibuten/Compound 2 combination at a fixed Compound 2 concentration of 4 mg/L.

Example 23. Preparation of 560 mg/mL Compound 1 Propylene Glycol/Peg 400/Imwitor® 742/TPGS SEDDS Formulation A 20/45/10/25 volume % stock solution of propylene glycol (PG), PEG 400, Imwitor® 742 and TPGS was prepared by pipetting 2.0 mL of propylene glycol and 4.5 mL of PEG 400 into a clean 20 mL scintillation vial using a positive displacement pipette. A magnetic stir bar was added and the vial was stirred at ~60° C. on a stir plate. The Imwitor® 742 and TPGS were melted in a ~60° C. oven and thoroughly mixed per the manufacturer's instructions before addition to the PG/PEG 400 solution. The Imwitor® 742 was added by pipetting 1.0 mL of molten excipient using a positive displacement pipette. Once a uniform solution was obtained, the TPGS was added by pipetting 2.5 mL using a positive displacement pipette. This mixture was stirred on a ~60° C. hot plate until a uniform solution was obtained. A 0.5 mL aliquot of this stock solution was added to a glass vial containing 700 mg of Compound 1-ethanolate and blend was then stirred at ~60° C. on a hot plate using a magnetic stir bar until a clear, homogeneous solution was obtained. The final solution was assayed by HPLC against a Compound 1 standard and found to be 563.2 mg/mL. A 50 mg capsule dose of this formulation was prepared by pipetting 89 μL into a Size 2 HPMC white, opaque capsule.

Example 24. Preparation of 350 mg/mL Compound 1 Peg 3350/Imwitor® 742/TPGS SEDDS Formulation A 55/20/25 volume % stock solution of PEG 3350, Imwitor® 742 and TPGS was prepared by pipetting 5.5 mL of PEG 3350 into a clean 20 mL scintillation vial using a positive displacement pipette. A magnetic stir bar was added and the vial was stirred at ~60° C. on a stir plate. The Imwitor® 742 and TPGS were melted in a ~60° C. oven and thoroughly mixed per the manufacturer's instructions before addition to the PEG 3350. The Imwitor® 742 was added by pipetting 2.0 mL of molten excipient using a positive displacement pipette. Once a uniform solution was obtained, the TPGS was added by pipetting 2.5 mL using a positive displacement pipette. This mixture was stirred on a ~60° C. hot plate until a uniform solution was obtained. A 0.5 mL aliquot of this stock solution was added to a glass vial containing 700 mg of Compound 1-ethanolate and blend was then stirred at ~60° C. on a hot plate using a magnetic stir bar. After ~30 minutes the formulation was filtered through a 0.45 μm PTFE syringe filter to remove undissolved VNR-7145. The resulting clear, homogeneous solution was assayed by HPLC against a Compound 1 standard and found to be 355.1 mg/mL. A 50 mg capsule dose of this formulation was prepared by pipetting 141 μL into a Size 2 HPMC white, opaque capsule.

Example 25. Preparation of 400 mg/mL Compound 1 Propylene Glycol/Peg 400/TPGS SEDDS Formulation A 20/20/60 volume % stock solution of PEG 3350, Imwitor® 742 and TPGS was prepared by pipetting 5.5 mL of PEG 3350 into a clean 20 mL scintillation vial using a positive displacement pipette. A magnetic stir bar was added and the vial was stirred at ~60° C. on a stir plate. The Imwitor® 742 and TPGS were melted in a ~60° C. oven and thoroughly mixed per the manufacturer's instructions before addition to the PEG 3350. The Imwitor® 742 was added by pipetting 2.0 mL of molten excipient using a positive displacement pipette. Once a uniform solution was obtained, the TPGS was added by pipetting 2.5 mL using a positive displacement pipette. This mixture was stirred on a ~60° C. hot plate until a uniform solution was obtained. A 0.5 mL aliquot of this stock solution was added to a glass vial containing 700 mg of Compound 1-ethanolate and blend was then stirred at ~60° C. on a hot plate using a magnetic stir bar. After ~30 minutes the formulation was filtered through a 0.45 μm PTFE syringe filter to remove undissolved Compound 1-ethanolate. The resulting clear, homogeneous solution was assayed by HPLC against a Compound 1 standard and found to be 355.1 mg/mL. A 50 mg capsule dose of this formulation was prepared by pipetting 141 μL into a Size 2 HPMC white, opaque capsule.

Example 26. Preparation of 350 mg/mL Compound 1 Peg 1500/TPGS SEDDS Formulation

Figure 10:
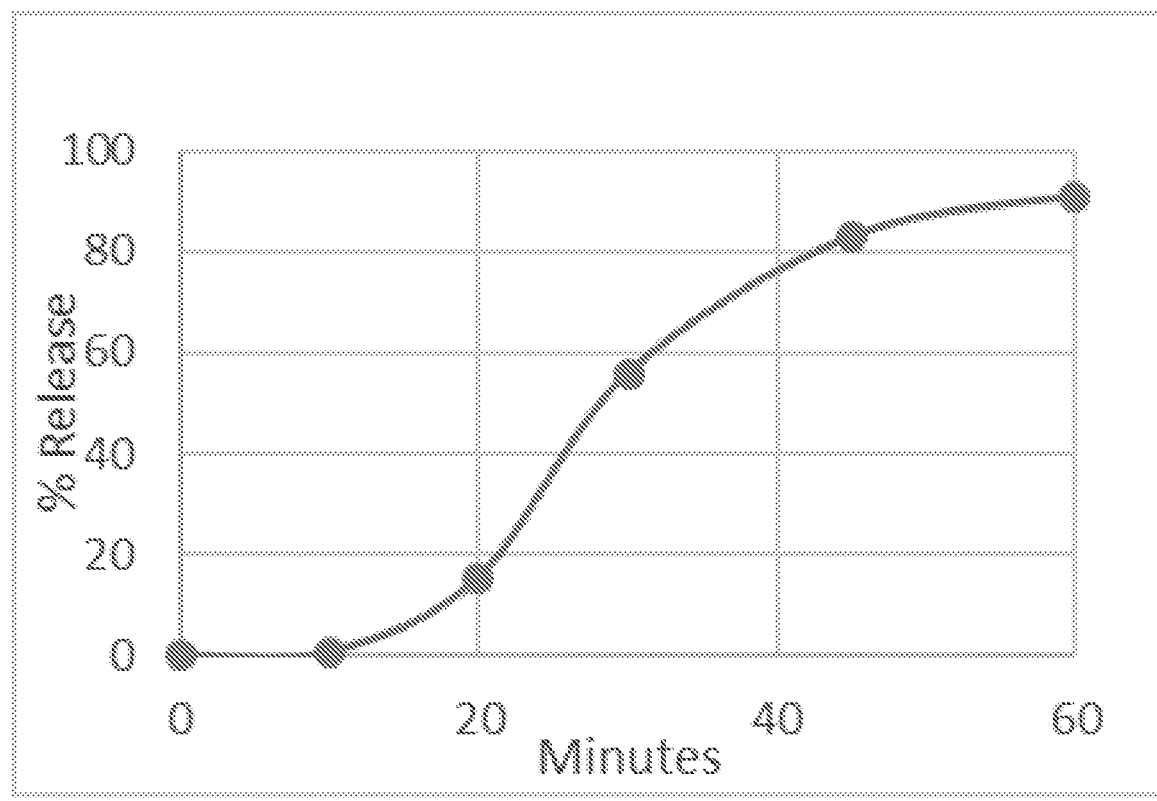
FIG. 10 shows the dissolution of 25/75 PEG1500/TPGS 250 mg Compound 1 Capsule.

A 25/75 volume % stock solution of PEG 1500 and TPGS was prepared by first melting the excipients in a ~60° C. oven and thoroughly mixed per the manufacturer's instructions. The vehicle stock was prepared by pipetting 5.0 mL of PEG 1500 and 15.0 mL of PEG 1500 into a clean 20 mL scintillation vial using a positive displacement pipette. This mixture was stirred on a ~60° C. hot plate until a uniform solution was obtained. A ~5 mL batch of 350 mg/mL Compound 1 was prepared by combining 2.1 g of Compound 1-ethanolate and 2.6 g of the vehicle stock into a glass vial outfitted with a magnetic stir bar and mixing at ~60° C. on a hot plate until a clear, homogeneous solution was obtained. The final solution was assayed by HPLC against a Compound 1 standard and found to be 346.6 mg/mL. A 250 mg capsule dose of this formulation was prepared by pipetting 622 μL into a Size 00 HPMC white, opaque capsule. The capsules were capped and allowed to solidify at room temperature before transferring to 2-8° C. for storage. The dissolution profile was collected for the 250 mg Compound 1 capsule by using USP Apparatus II conditions (50 RPM, 450 mL pH 2 water at 38° C.) with manual time pulls. The samples were removed at t=0, 5, 10, 15, 20, 30, 45 and 60 minutes and filtered through a 0.22 μm syringe filter and analyzed using HPLC. The dissolution profile for the 250 mg capsule of Compound 1 is shown in FIG. 10.

Example 27. Preparation and Dissolution of 250 mg Compound 1 HPMC Capsules

Figure 11:
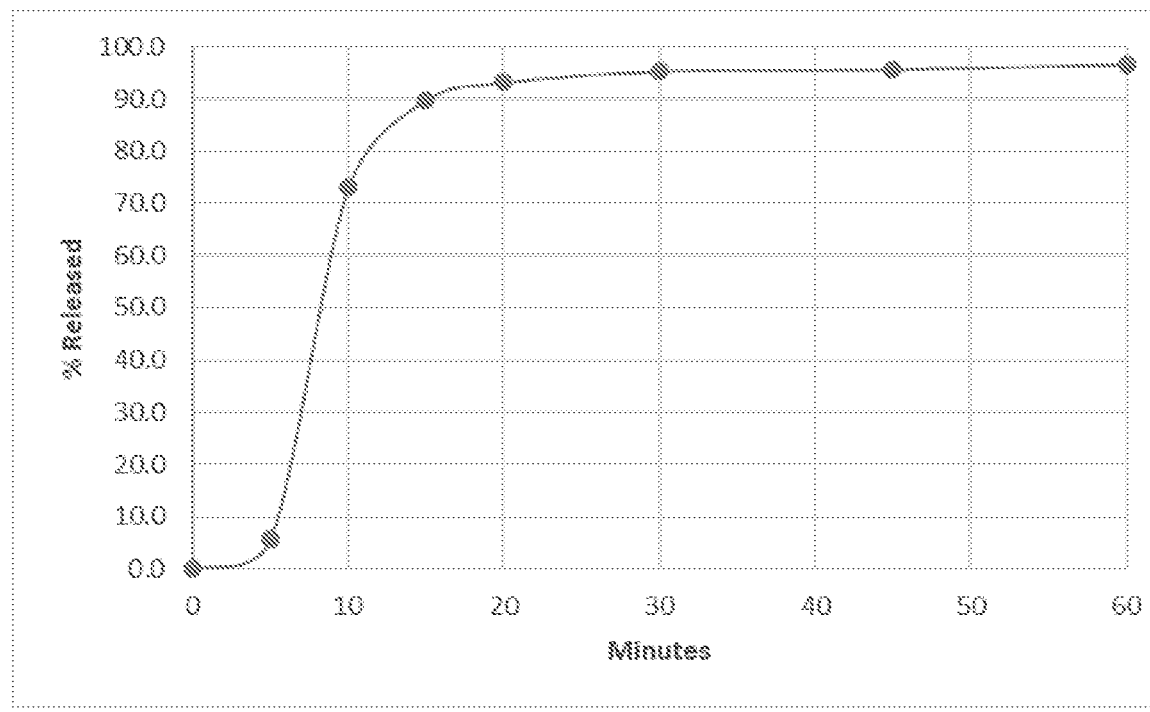
FIG. 11 shows dissolution of 20/20/60 PG/PEG400/TPGS 250 mg Compound 1 Capsule.

A 20/20/60 volume % stock solution of propylene glycol (PG), PEG 400, and TPGS was prepared by pipetting 4.0 mL of propylene glycol and 4.4 mL of PEG 400 into a clean 50 mL beaker using a positive displacement pipette. A magnetic stir bar was added and the beaker was stirred at ~60° C. on a stir plate. The TPGS was melted in a ~60° C. oven and thoroughly mixed per the manufacturer's instructions before addition to the PG/PEG 400 solution. The TPGS was added by pipetting 12.0 mL using a positive displacement pipette. This vehicle stock was stirred on a ~60° C. hot plate until a uniform solution was obtained. A ~20 mL batch of 400 mg/mL Compound 1 was prepared by combining 8.71 g of Compound 1-ethanolate and 12.3 g of the vehicle stock into a 100 mL round bottom flask outfitted with a magnetic stir bar and mixing at ~60° C. on a hot plate until a clear, homogeneous solution was obtained. The final solution was assayed by HPLC against a Compound 1 standard and found to be 401.7 mg/mL. A 250 mg capsule dose of this formulation was prepared by pipetting 622 μL into a Size 0 HPMC white, opaque capsule. The capsules were capped and allowed to solidify at room temperature before transferring to 2-8° C. for storage. The dissolution profile was collected for the 250 mg Compound 1 capsule by using USP Apparatus II conditions (75 RPM, 900 mL pH 2 water at 38° C.) with manual time pulls. The samples were removed at t=0, 5, 10, 15, 20, 30, 45 and 60 minutes and filtered through a 0.22 μm syringe filter and analyzed using HPLC. The dissolution profile for the 250 mg capsule of Compound 1 is shown in FIG. 11.

What is claimed:

1. A pharmaceutical composition comprising:
(i) a compound of formula (I) or (II); a pharmaceutically acceptable salt, a solvate, or a pharmaceutically acceptable salt and solvate thereof:

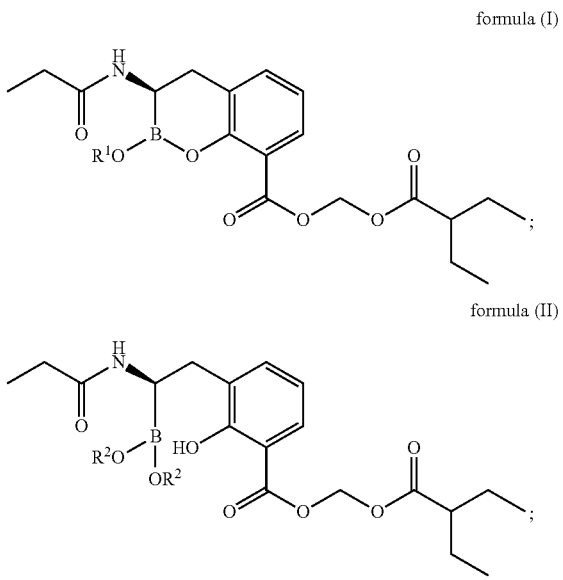

wherein:
each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —NH$C_1$-$C_6$ alkyl, —N($C_1$-$C_6$ alkyl)$_2$, —COOH, or —COO($C_1$-$C_6$ alkyl);
or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —NH$C_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
(ii) ceftibuten.

2. The pharmaceutical composition of claim 1, wherein the compound of formula (I) or (II), or a pharmaceutically acceptable salt, a solvate, or a pharmaceutically acceptable salt and solvate thereof is:

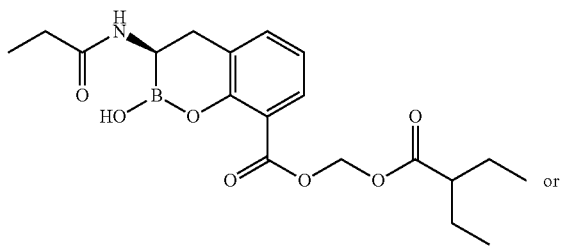

-continued

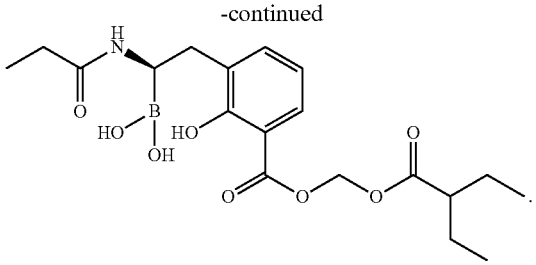

3. The pharmaceutical composition of claim 1, wherein the compound of formula (I), or a pharmaceutically acceptable salt, a solvate, or a pharmaceutically acceptable salt and solvate thereof is:

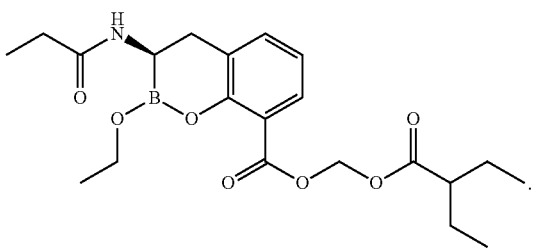 [SMILES: CCOB1Oc2c(cccc2C(=O)OCOC(=O)C(CC)CC)C[C@@H]1NC(=O)CC]

4. The pharmaceutical composition of claim 1, wherein the pharmaceutical composition is formulated for oral administration.

5. The pharmaceutical composition of claim 1, wherein the pharmaceutical composition is formulated as a Self-Emulsifying Drug Delivery System (SEDDS).

6. The pharmaceutical composition of claim 5, further comprising a hydrophilic solubilizer.

7. The pharmaceutical composition of claim 6, wherein the hydrophilic solubilizer is a hydrophilic polymer that is polyethylene glycol.

8. The pharmaceutical composition of claim 6, further comprising a surfactant.

9. The pharmaceutical composition of claim 8, wherein the surfactant is a polyoxyethylene stearate.

10. The pharmaceutical composition of claim 1, wherein the pharmaceutical composition is formulated as a capsule.

11. The pharmaceutical composition of claim 1, wherein the pharmaceutical composition is formulated as a tablet.

12. The pharmaceutical composition of claim 1, wherein the pharmaceutical composition comprises about 100 mg to about 500 mg of ceftibuten.

13. The pharmaceutical composition of claim 1, wherein the pharmaceutical composition comprises about 200 mg to about 250 mg of ceftibuten.

14. The pharmaceutical composition of claim 1, wherein the pharmaceutical composition comprises about 100 mg to about 1600 mg of the compound of formula (I) or (II), a pharmaceutically acceptable salt, a solvate, or a pharmaceutically acceptable salt and solvate thereof.

15. The pharmaceutical composition of claim 1, wherein the pharmaceutical composition comprises about 200 mg to about 250 mg of the compound of formula (I) or (II), a pharmaceutically acceptable salt, a solvate, or a pharmaceutically acceptable salt and solvate thereof, or wherein the pharmaceutical composition comprises about 250 mg to about 300 mg of the compound of formula (I) or (II), a pharmaceutically acceptable salt, a solvate, or a pharmaceutically acceptable salt and solvate thereof.

16. A method of treating a bacterial infection in a subject in need thereof, the method comprising delivering to the subject:
 (i) (R)-2-hydroxy-3-propionamido-3,4-dihydro-2H-benzo[e][1,2]oxaborinine-8-carboxylic acid or (R)-3-(2-borono-2-propionamidoethyl)-2-hydroxybenzoic acid; and
 (ii) ceftibuten.

17. The method of claim 16 wherein the bacterial infection is caused by carbapenem-resistant Enterobacteriaceae (CRE) or extended-spectrum beta-lactamase (ESBL) producing gram-negative bacteria.

18. A method of treating a bacterial infection in a subject in need thereof, the method comprising administering to the subject:
 (i) a compound of formula (I) or (II); a pharmaceutically acceptable salt, a solvate, or a pharmaceutically acceptable salt and solvate thereof:

formula (I)

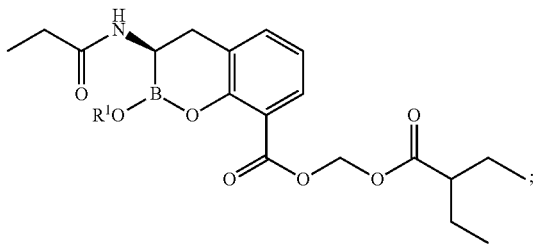

formula (II)

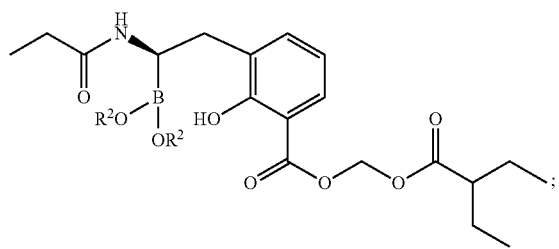

wherein:
 each $R^1$ and $R^2$ is independently hydrogen, $C_1$-$C_6$ alkyl, or —CO($C_1$-$C_6$ alkyl); each alkyl being optionally substituted with halogen, —OH, —O($C_1$-$C_6$ alkyl), —$NH_2$, —NH$C_1$-$C_6$ alkyl, —N($C_1$-$C_6$ alkyl)$_2$, —COOH, or —COO($C_1$-$C_6$ alkyl);
 or two $R^2$ are taken together to form a 4- to 8-membered heterocycloalkyl optionally substituted with oxo, halogen, —OH, $C_1$-$C_6$ alkyl, —O($C_1$-$C_6$ alkyl), —$NH_2$, —NH$C_1$-$C_6$ alkyl, —N($C_1$-$C_6$ alkyl)$_2$, —COOH, —COO($C_1$-$C_6$ alkyl), —($C_1$-$C_6$ alkylene)COOH, or —($C_1$-$C_6$ alkylene)COO($C_1$-$C_6$ alkyl); and
 (ii) ceftibuten.

19. The method of claim 18, wherein the compound of formula (I) or (II), or a pharmaceutically acceptable salt, a solvate, or a pharmaceutically acceptable salt and solvate thereof is:

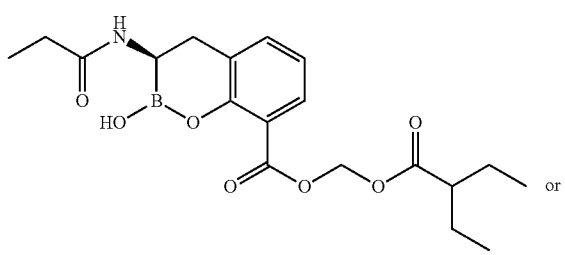

20. The method of claim 18, wherein the compound of formula (I), or a pharmaceutically acceptable salt, a solvate, or a pharmaceutically acceptable salt and solvate thereof is:

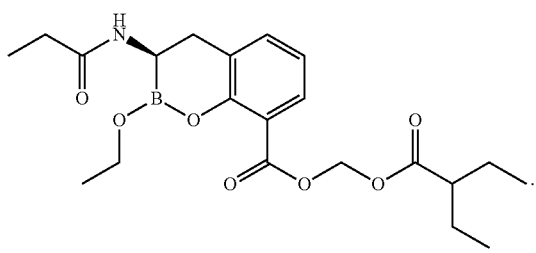 [SMILES: CCOB1Oc2c(cccc2C(=O)OCOC(=O)C(CC)CC)C[C@@H]1NC(=O)CC]

21. The method of claim 18, wherein the bacterial infection is caused by carbapenem-resistant Enterobacteriaceae (CRE) or extended-spectrum beta-lactamase (ESBL) producing gram-negative bacteria.

22. The method of claim 18, wherein the compound of formula (I) or (II) and ceftibuten are formulated for oral administration.

23. The method of claim 16, wherein the bacterial infection is a urinary tract infection.

24. The method of claim 18, wherein the bacterial infection is a urinary tract infection.

25. The method of claim 16, wherein the bacterial infection is caused by carbapenem-resistant Enterobacteriaceae (CRE).

26. The method of claim 18, wherein the bacterial infection is caused by carbapenem-resistant Enterobacteriaceae (CRE).

27. The method of claim 16, wherein the bacterial infection that is treated comprises a bacteria that includes *Escherichia coli, Klebsiella pneumoniae, Klebsiella oxytoca, Proteus mirabilis, Proteus vulgaris, Citrobacter freundii, Enterobacter aerogenes, Enterobacter cloacae, Morganella morganii, Providencia stuartii, Serratia marcescens, Haemophilus influenzae, Moraxella catarrhalis, Streptococcus pneumoniae, Streptococcus pyogenes, Salmonella species, Shigella species, Neisseria gonorrhoea*, or *Neisseria meningitidis*.

28. The method of claim 16, wherein the bacterial infection that is treated comprises a bacteria that includes *Escherichia coli, Klebsiella pneumoniae, Klebsiella oxytoca, Proteus mirabilis, Proteus vulgaris, Citrobacter freundii, Enterobacter aerogenes, Enterobacter cloacae, Morganella morganii, Providencia stuartii*, or *Serratia marcescens*.

29. The method of claim 16, wherein the bacterial infection that is treated comprises a bacteria that includes *Escherichia coli, Klebsiella pneumoniae, Proteus mirabilis*, or *Enterobacter cloacae*.

30. The method of claim 18, wherein the bacterial infection that is treated comprises a bacteria that includes *Escherichia coli, Klebsiella pneumoniae, Klebsiella oxytoca, Proteus mirabilis, Proteus vulgaris, Citrobacter freundii, Enterobacter aerogenes, Enterobacter cloacae, Morganella morganii, Providencia stuartii, Serratia marcescens, Haemophilus influenzae, Moraxella catarrhalis, Streptococcus pneumoniae, Streptococcus pyogenes, Salmonella species, Shigella species, Neisseria gonorrhoea*, or *Neisseria meningitidis*.

31. The method of claim 18, wherein the bacterial infection that is treated comprises a bacteria that includes *Escherichia coli, Klebsiella pneumoniae, Klebsiella oxytoca, Proteus mirabilis, Proteus vulgaris, Citrobacter freundii, Enterobacter aerogenes, Enterobacter cloacae, Morganella morganii, Providencia stuartii*, or *Serratia marcescens*.

32. The method of claim 18, wherein the bacterial infection that is treated comprises a bacteria that includes *Escherichia coli, Klebsiella pneumoniae, Proteus mirabilis*, or *Enterobacter cloacae*.

33. The method of claim 18, wherein the compound of formula (I) or (II), a pharmaceutically acceptable salt, a solvate, or a pharmaceutically acceptable salt and solvate thereof and ceftibuten are administered in the same pharmaceutical composition.

34. The method of claim 18, wherein the method comprises administering about 400 mg ceftibuten and about 100 mg to about 1600 mg of a compound of formula (I) or (II); a pharmaceutically acceptable salt, a solvate, or a pharmaceutically acceptable salt and solvate thereof; both administered every 8 hours.

* * * * *